United States Patent [19]
Mark et al.

[11] Patent Number: 5,850,806
[45] Date of Patent: Dec. 22, 1998

[54] CONTROLLABLE STROBE LIGHT SYSTEM AND METHOD FOR DIRECTING THE MOVEMENTS OF FISH

[75] Inventors: Fred Mark, West Chelmsford, Mass.; Richard Northrup; Larry Ouellette, both of Nashua, N.H.; Roberto Schipp; Ronald Ihrie, both of Nashville, Tenn.; Edward Boyer, Milford, N.H.; William F. Somers, Nashville, Tenn.

[73] Assignee: Flash Technology Corporation of America, Brentwood, Tenn.

[21] Appl. No.: 766,192

[22] Filed: Dec. 12, 1996

[51] Int. Cl.$^6$ ................................. A01K 61/00
[52] U.S. Cl. ............................................. 119/219
[58] Field of Search .................... 119/174, 219, 119/200, 201, 215, 216

[56] References Cited

U.S. PATENT DOCUMENTS

| | | | |
|---|---|---|---|
| 4,186,371 | 1/1980 | Torbkin et al. | 367/109 |
| 4,392,236 | 7/1983 | Sandstrom et al. | 378/45 |
| 4,626,992 | 12/1986 | Greaves et al. | 364/420 |
| 4,744,331 | 5/1988 | Whiffin | 119/3 |
| 4,876,565 | 10/1989 | Tusting | 354/403 |
| 4,888,905 | 12/1989 | Garr | 43/17.6 |

OTHER PUBLICATIONS

"Innovators with EPRI Technology" Jul. 1992.
Cost–Effective Approaches for Protecting Fish at Hydroelectric Projects HCI Publications 1992.
Evaluation of Study Technologies to Asses the Effectiveness the Strobe Lights . . . Mar. 1999.
"A Demonstration of Strobe Lights to Repel Fish".
Species of Fish Showing Avoidance Response to Strobe Lights.
Met Ed. News Shad Project at York Haven Show Results. Behavioral Barriers.
Guiding American Shad w/Strobe Lights.
Response of Juvenile Coho & Chinook Salmon to Strobe & Mercury Vapor Lights.
"Innovators with Epritechnology" Jul. 1992.
"Cost Effective Approaches for Protecting Fish at Hydroelectric Projects" HCI Publications 1992.
"Evaluation of Study Techniques to Assiss . . . ".
"A Demonstration of Strobe Lights to Repel Fish" Water Power '91.
"Species of Fish Showing Avoidance Response to Strobe Lights" EPRI May 1994 .
"Shad Project at York Havin Shows Results" Met–Ed New. Oct. 22, 1991.
"Guiding American Shad w/Strobe Lights" Hydro Review Jul. 1992.
"Response of Juvenile Coho and Chinook Salmon . . . "NAJM 1992.
"Fishing Behavior" Fishing Behaviors.

*Primary Examiner*—Thomas Price
*Attorney, Agent, or Firm*—Waddey & Patterson; Mark J. Patterson

[57] ABSTRACT

A system for directing fish away from danger points at an underwater structure includes multiple submersible flash heads operatively connected to a flash head control unit. The flash sequence, rate and intensity are adjustable by the system operator in real time using a system control unit which can be remotely located. The flash heads are strobed in a manner intended to alter the behavior of the fish. The system may include means to generate an air curtain near the flash heads to improve light dispersion and water jet means to clean the lenses on the flash heads.

21 Claims, 57 Drawing Sheets

| FIG. 2a1 | FIG. 2a2 | FIG. 2a3 |
|----------|----------|----------|
| FIG. 2a4 | FIG. 2a5 | FIG. 2a6 |
| FIG. 2a7 | FIG. 2a8 | FIG. 2a9 |

*FIG. 2a*

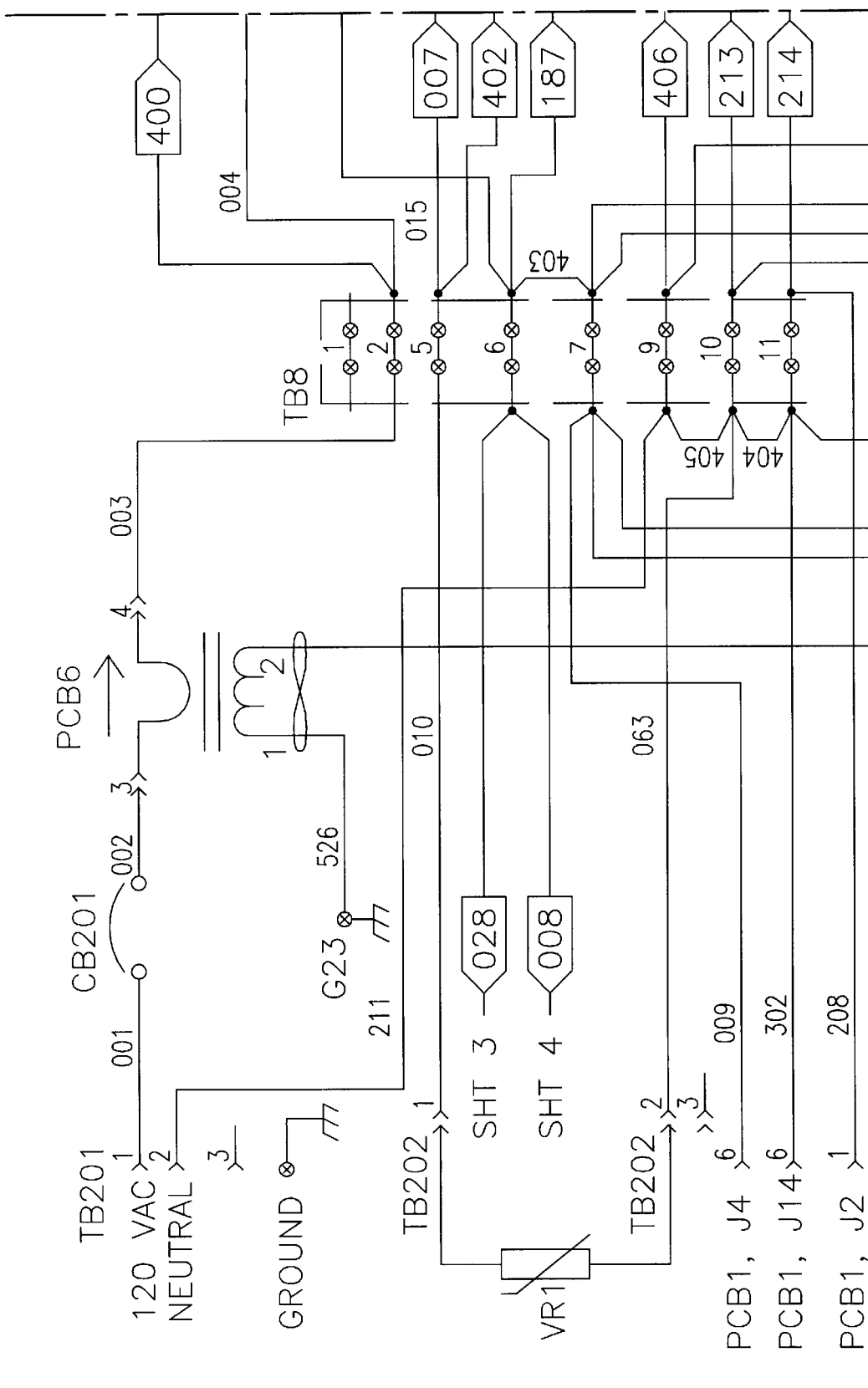
FIG. 2a1

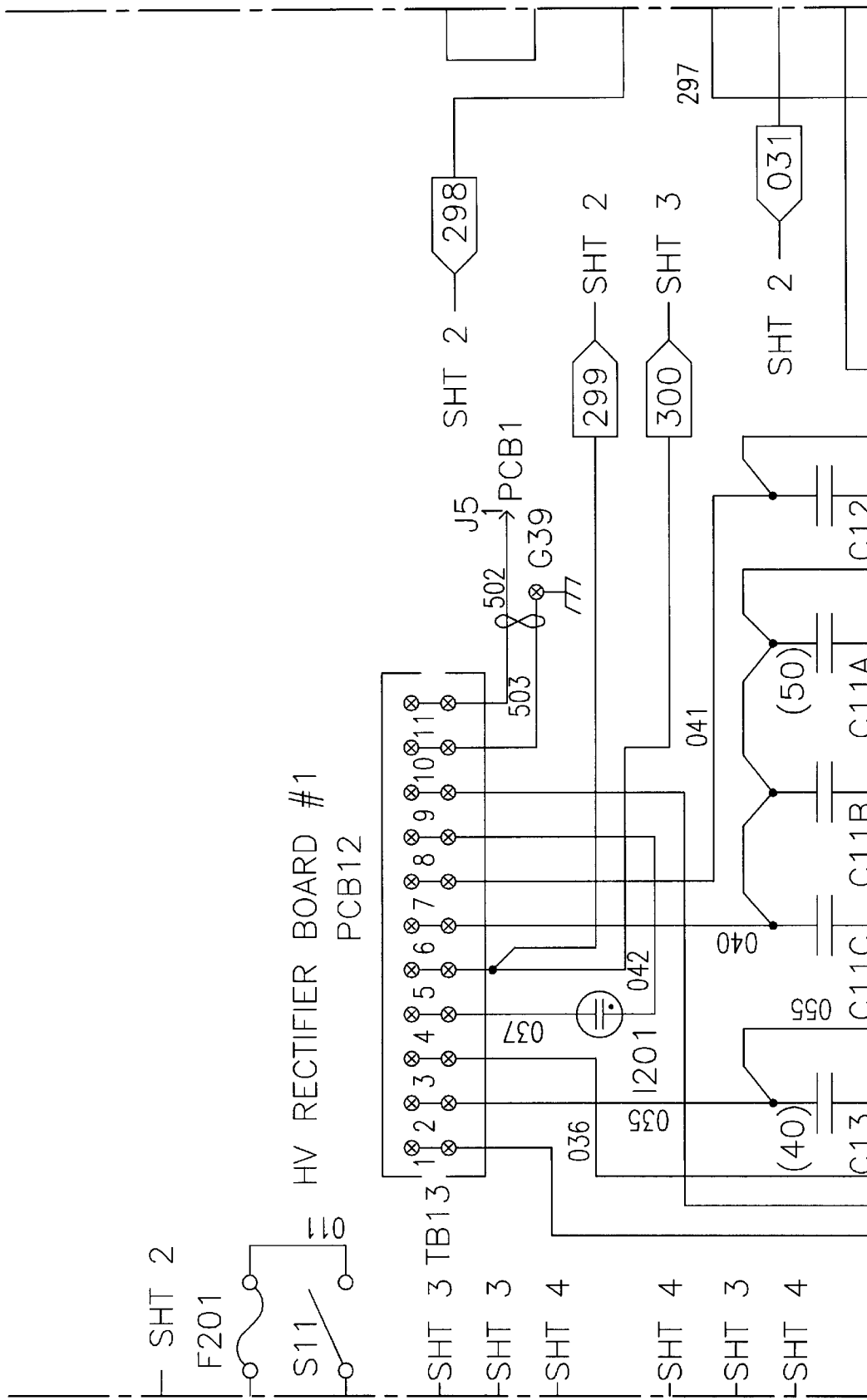
FIG. 2a2

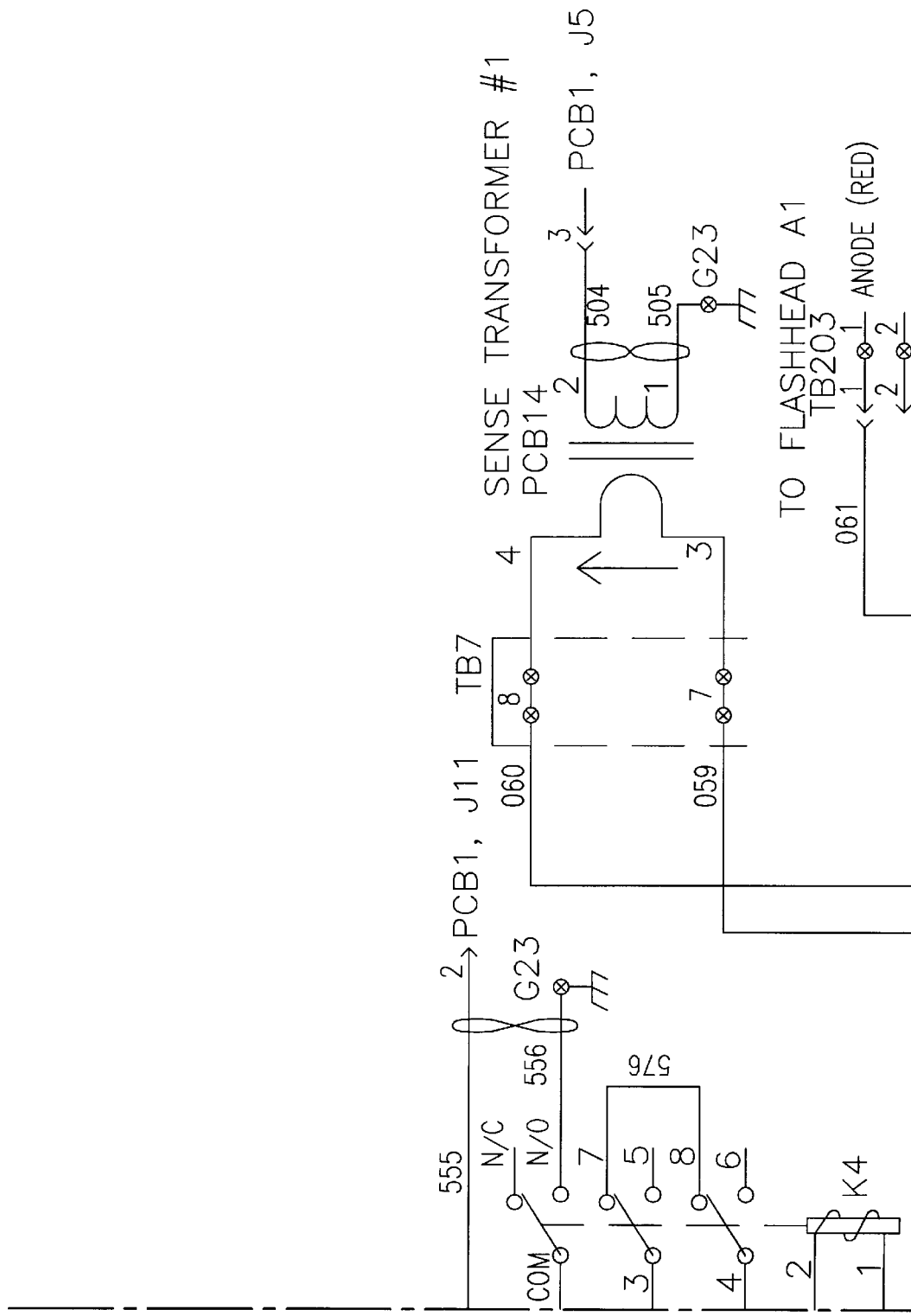
FIG. 2a3

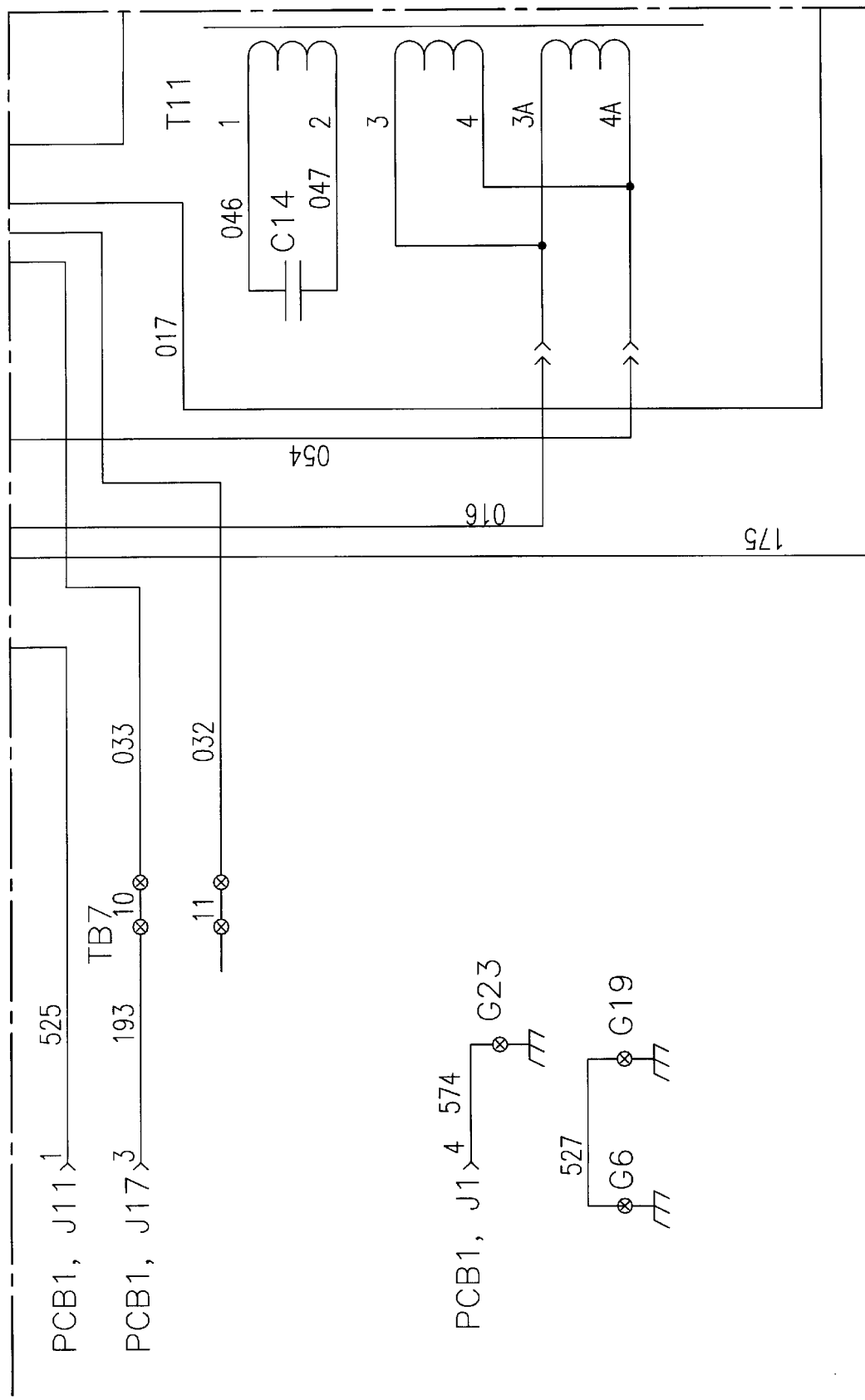
FIG. 2a4

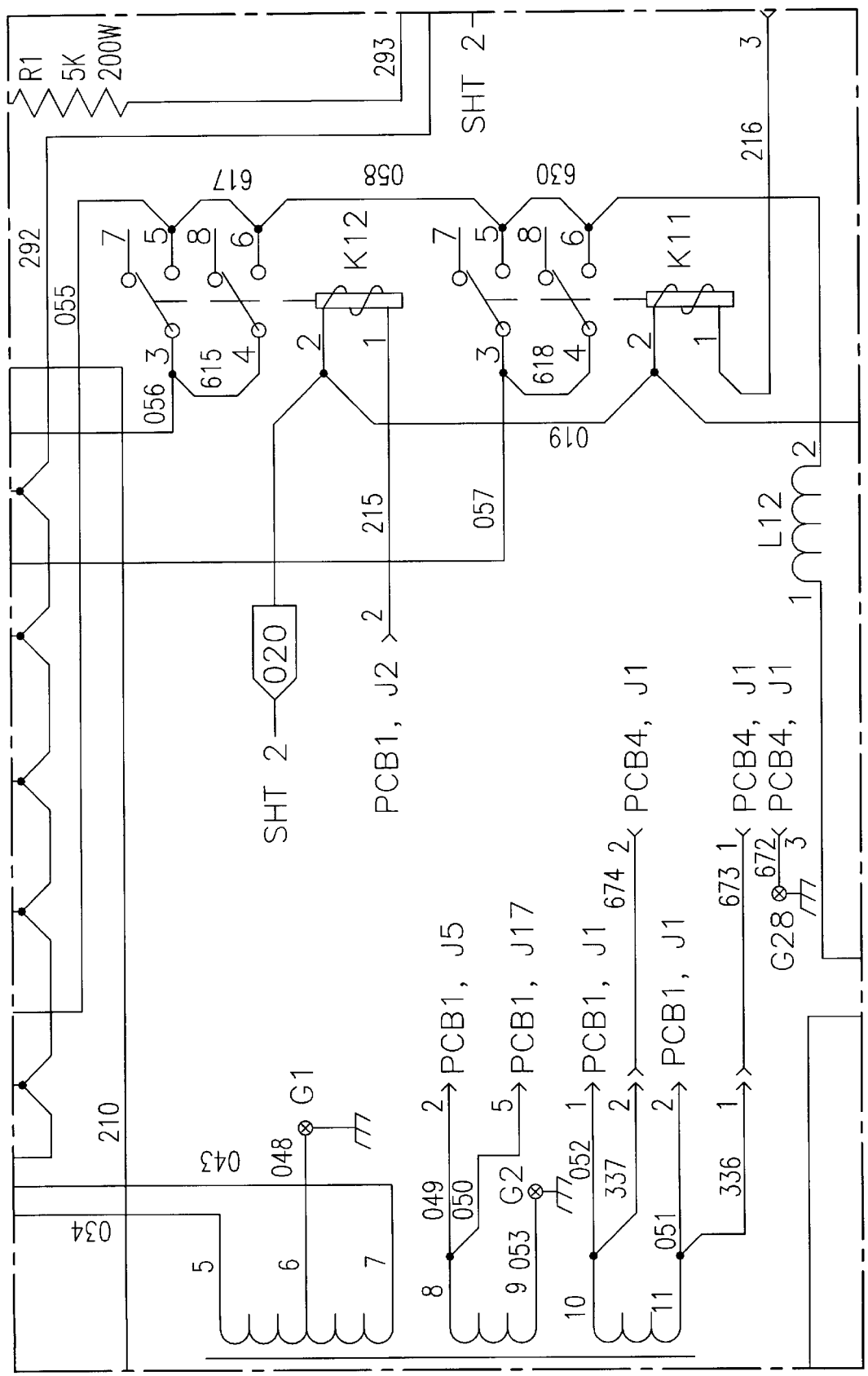
FIG. 2a5

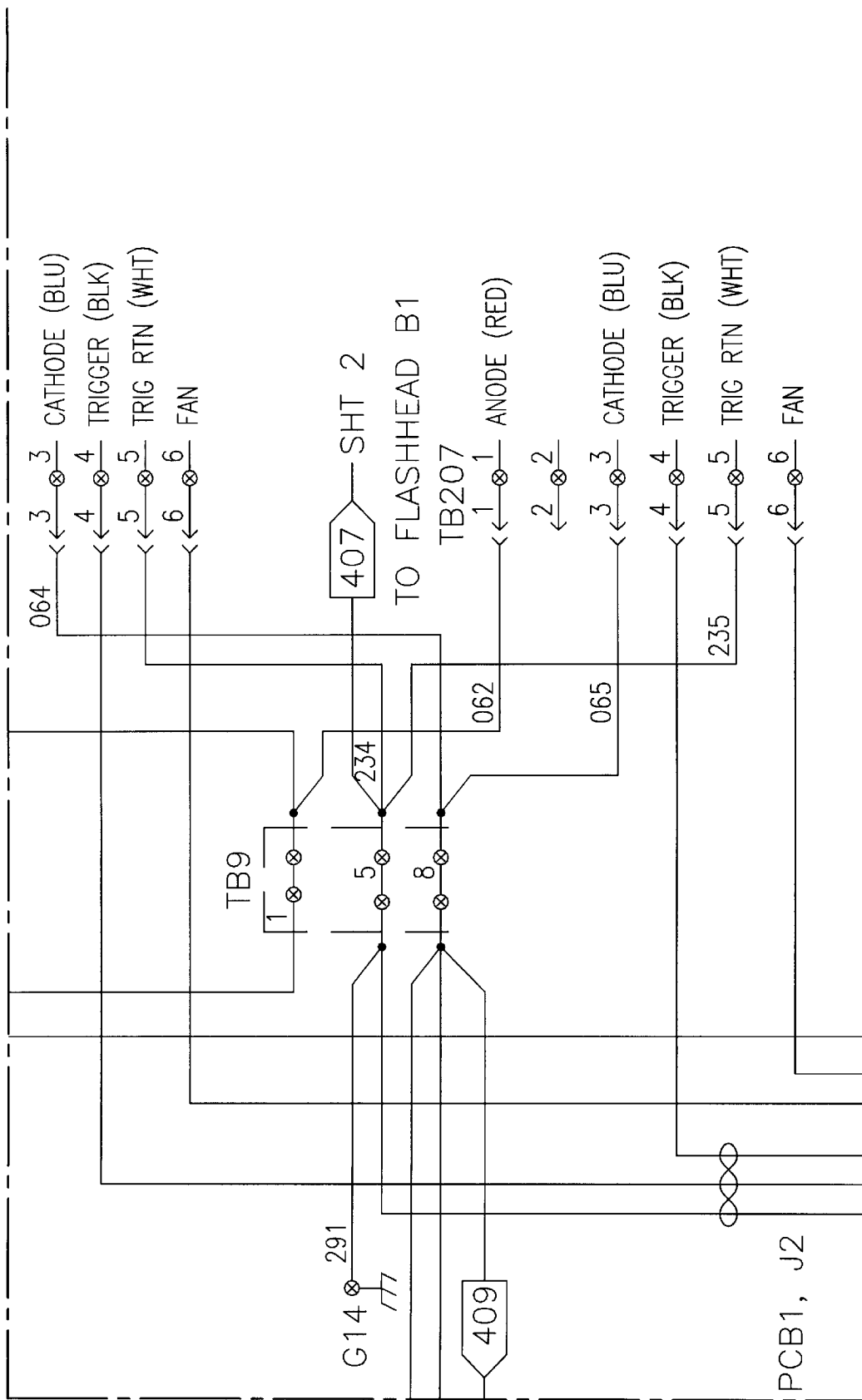
FIG. 2a6

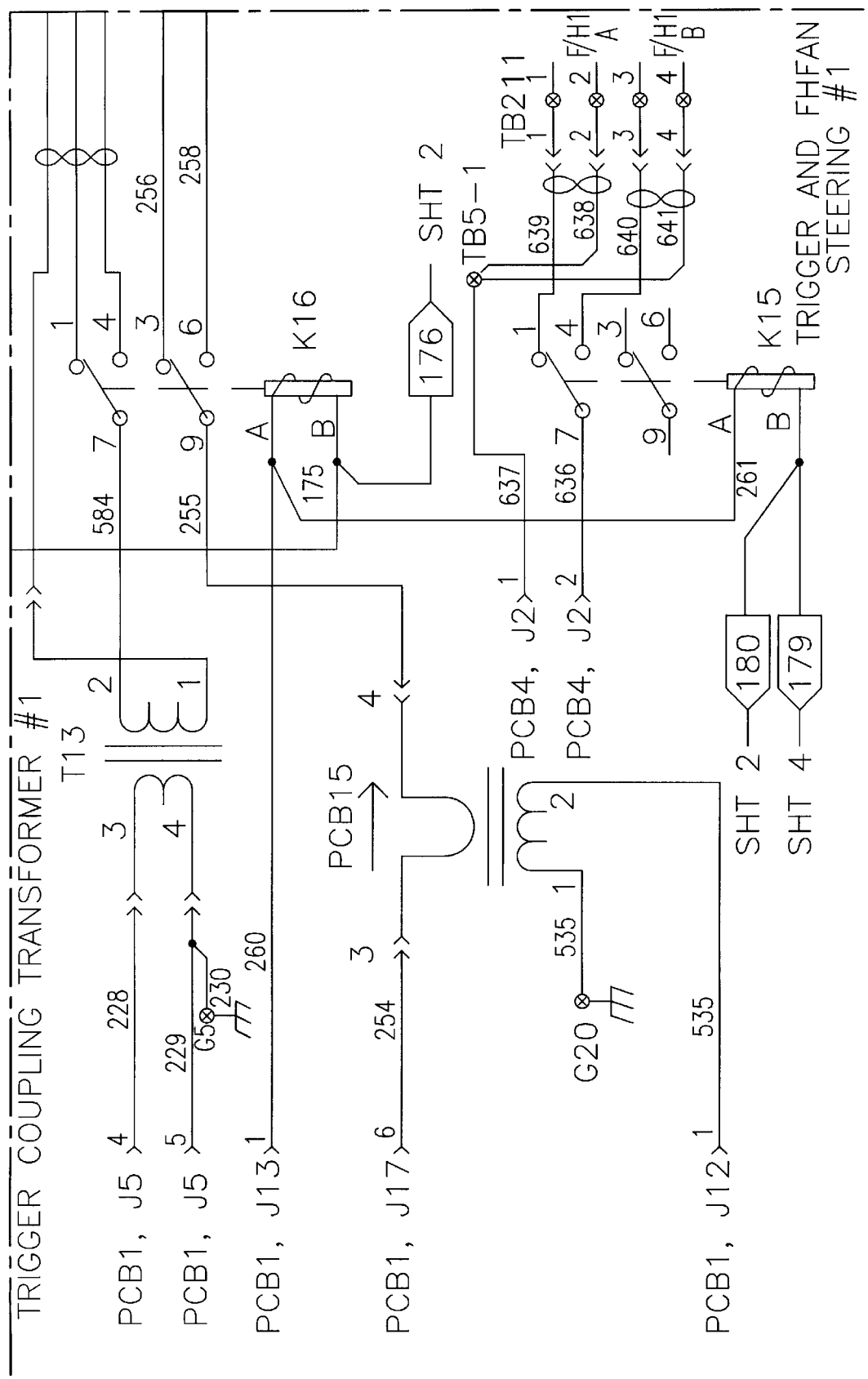
FIG. 2a7

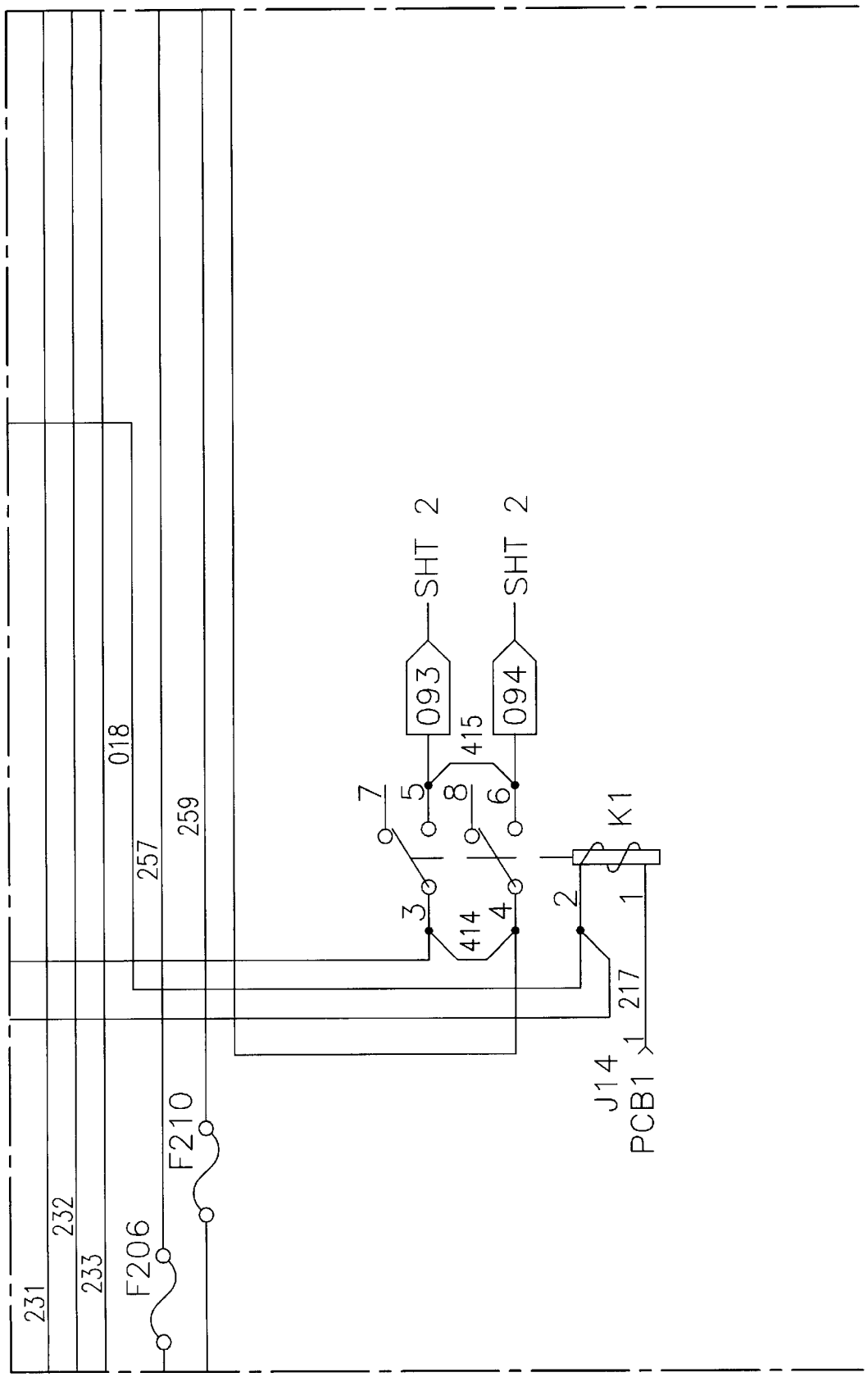

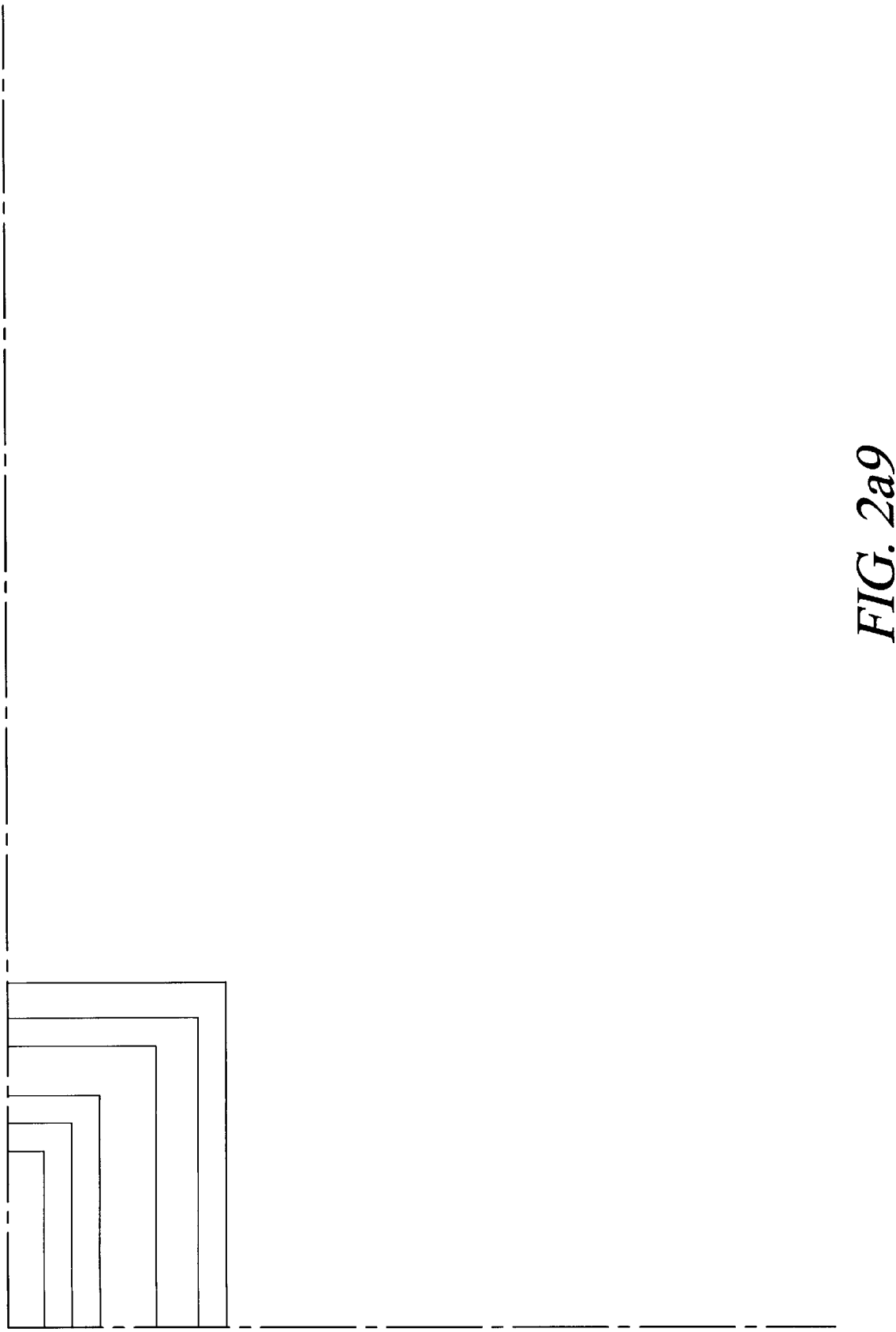

| FIG. 2b1 | FIG. 2b2 | FIG. 2b3 |
| --- | --- | --- |
| FIG. 2b4 | FIG. 2b5 | FIG. 2b6 |
| FIG. 2b7 | FIG. 2b8 | FIG. 2b9 |

*FIG. 2b*

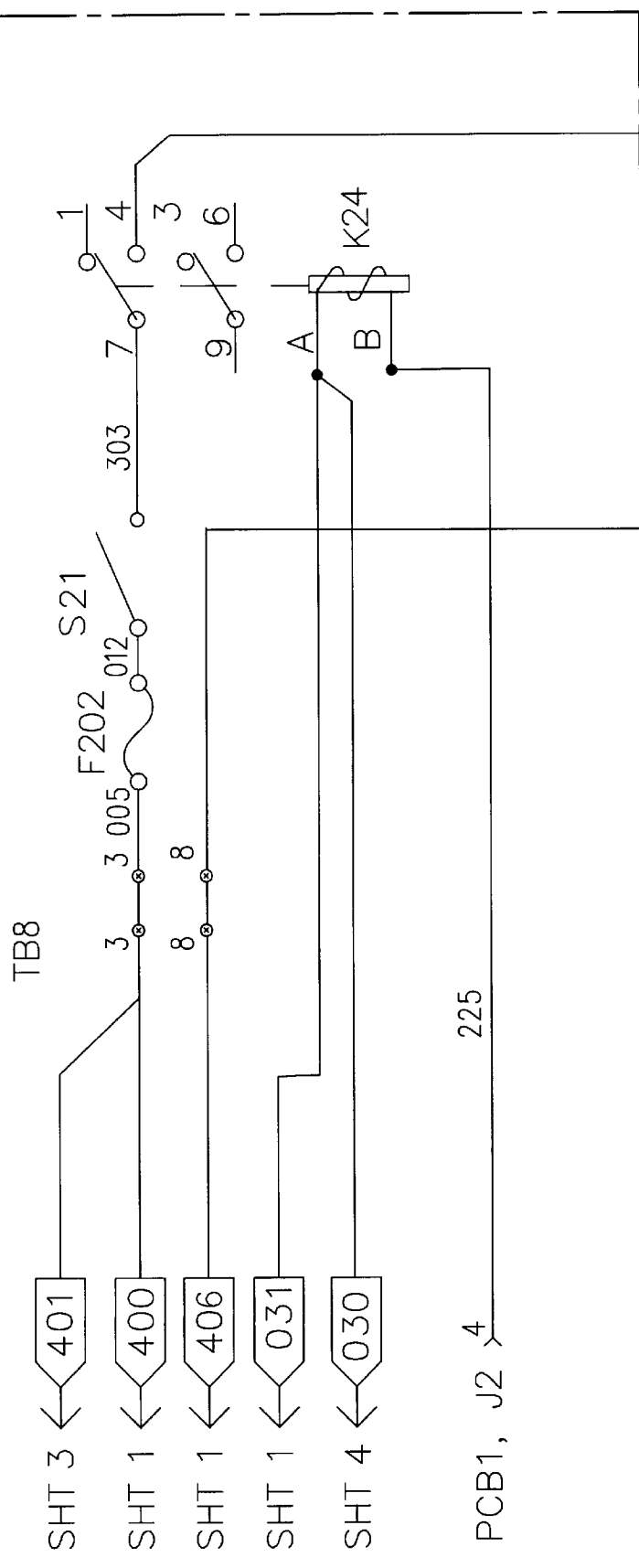

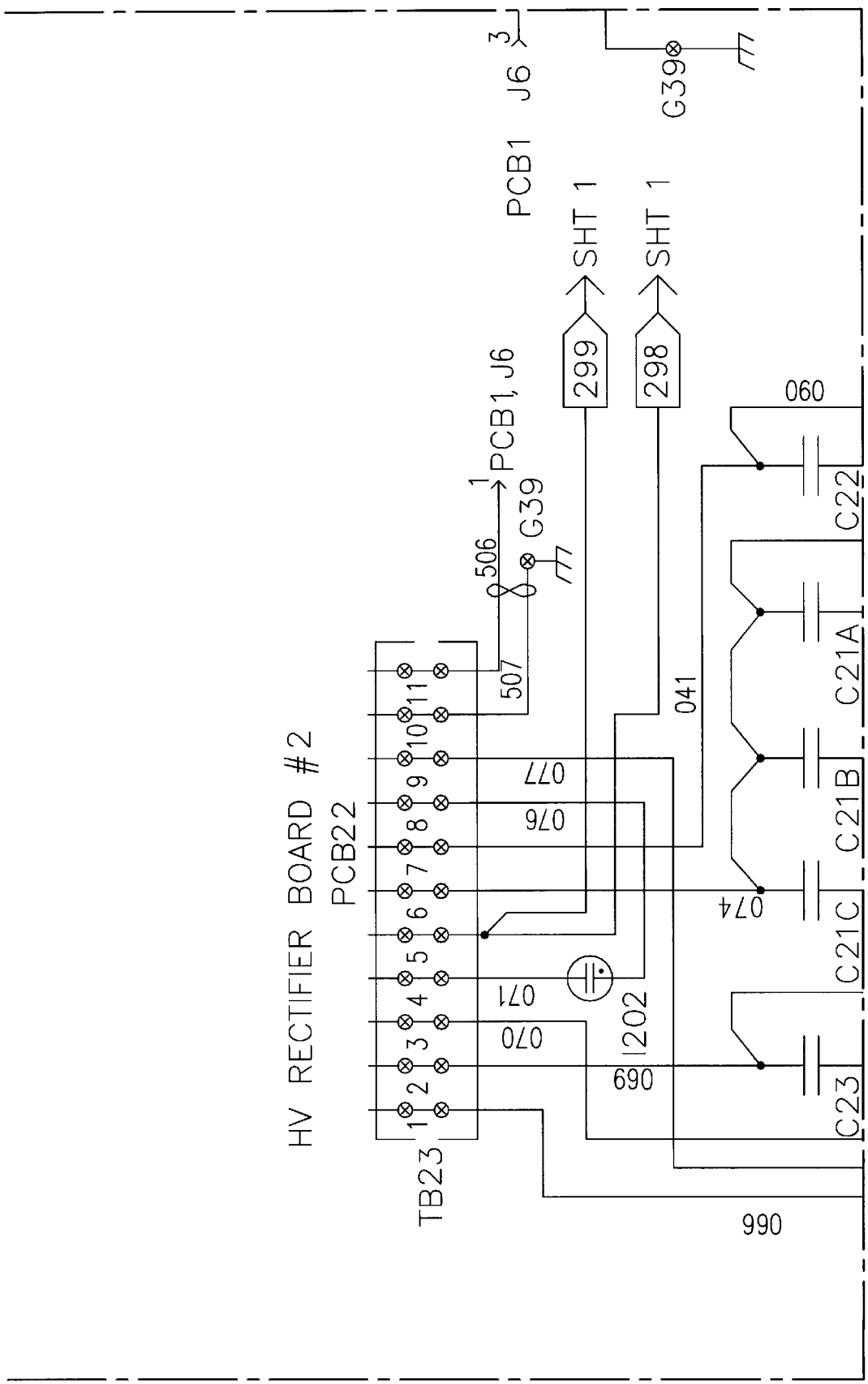
FIG. 2b2

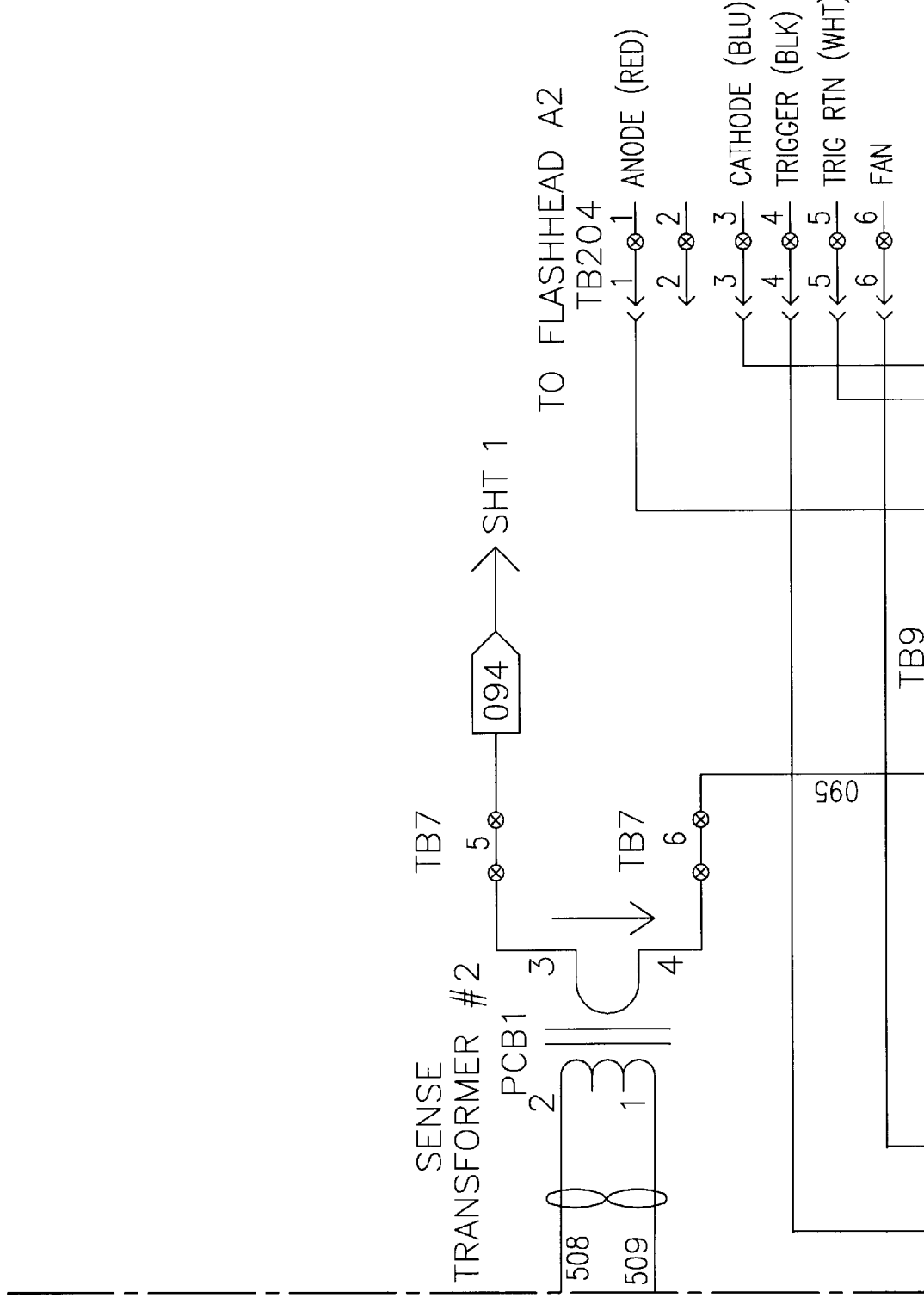
FIG. 2b3

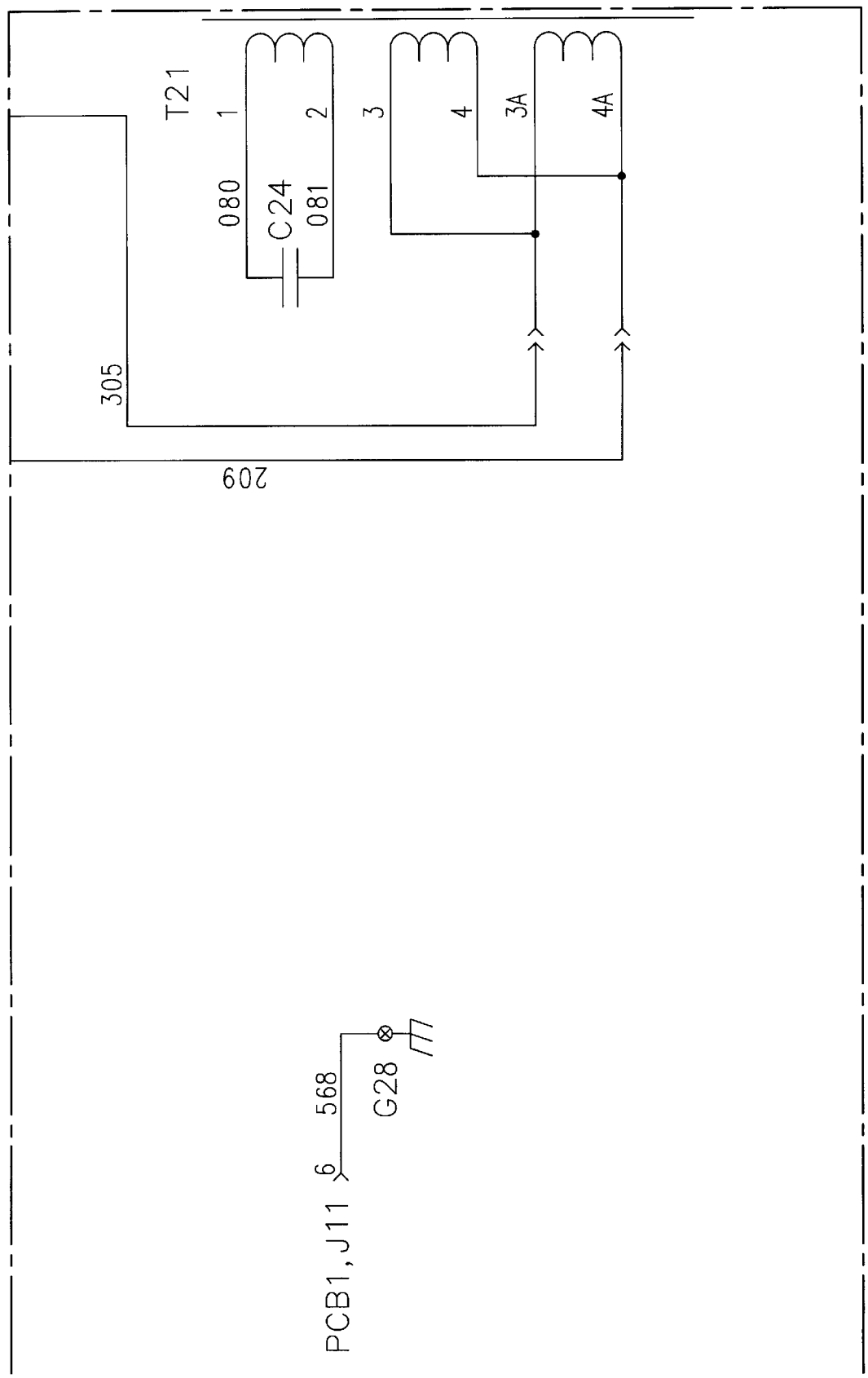
FIG. 2b4

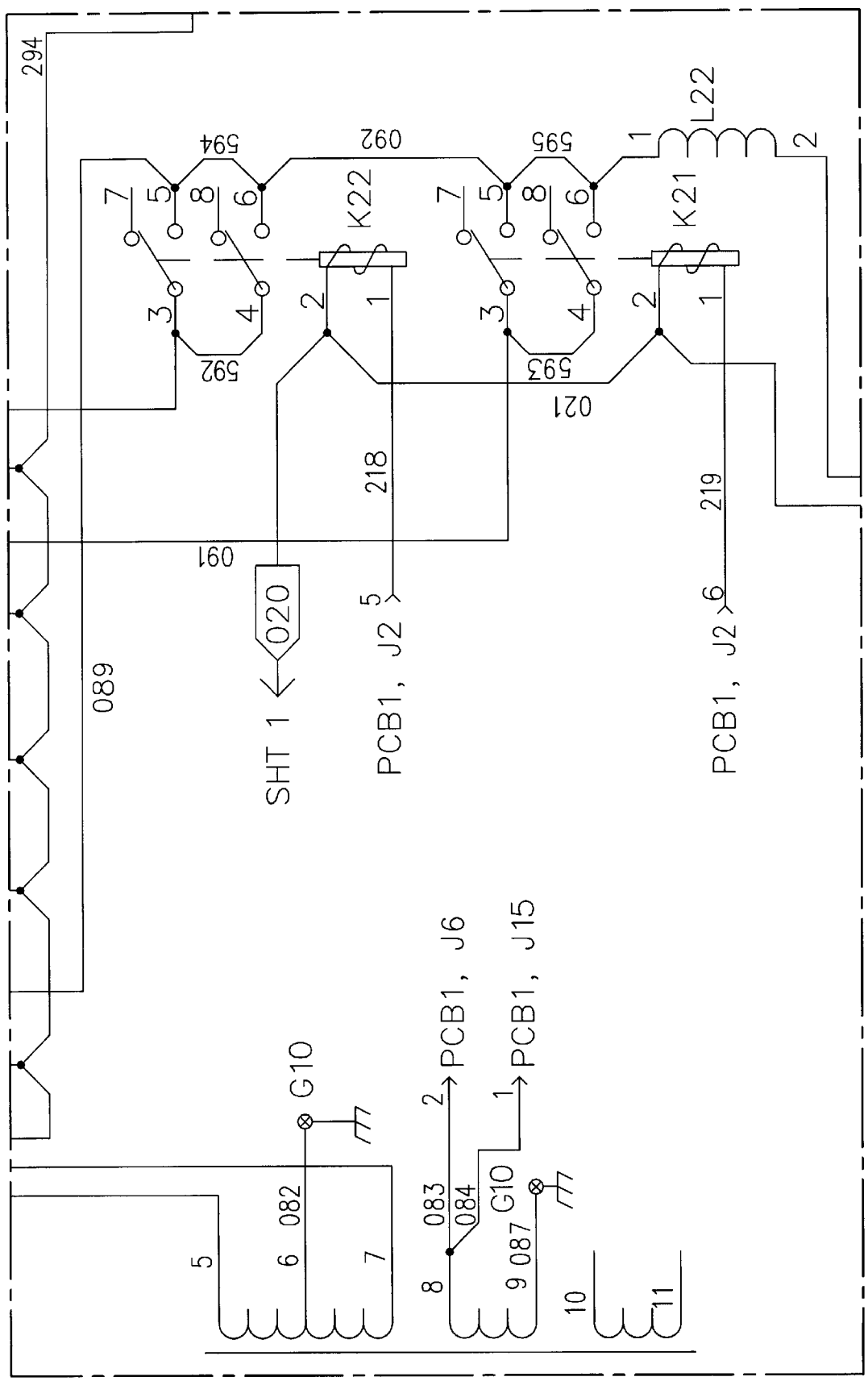
FIG. 2b5

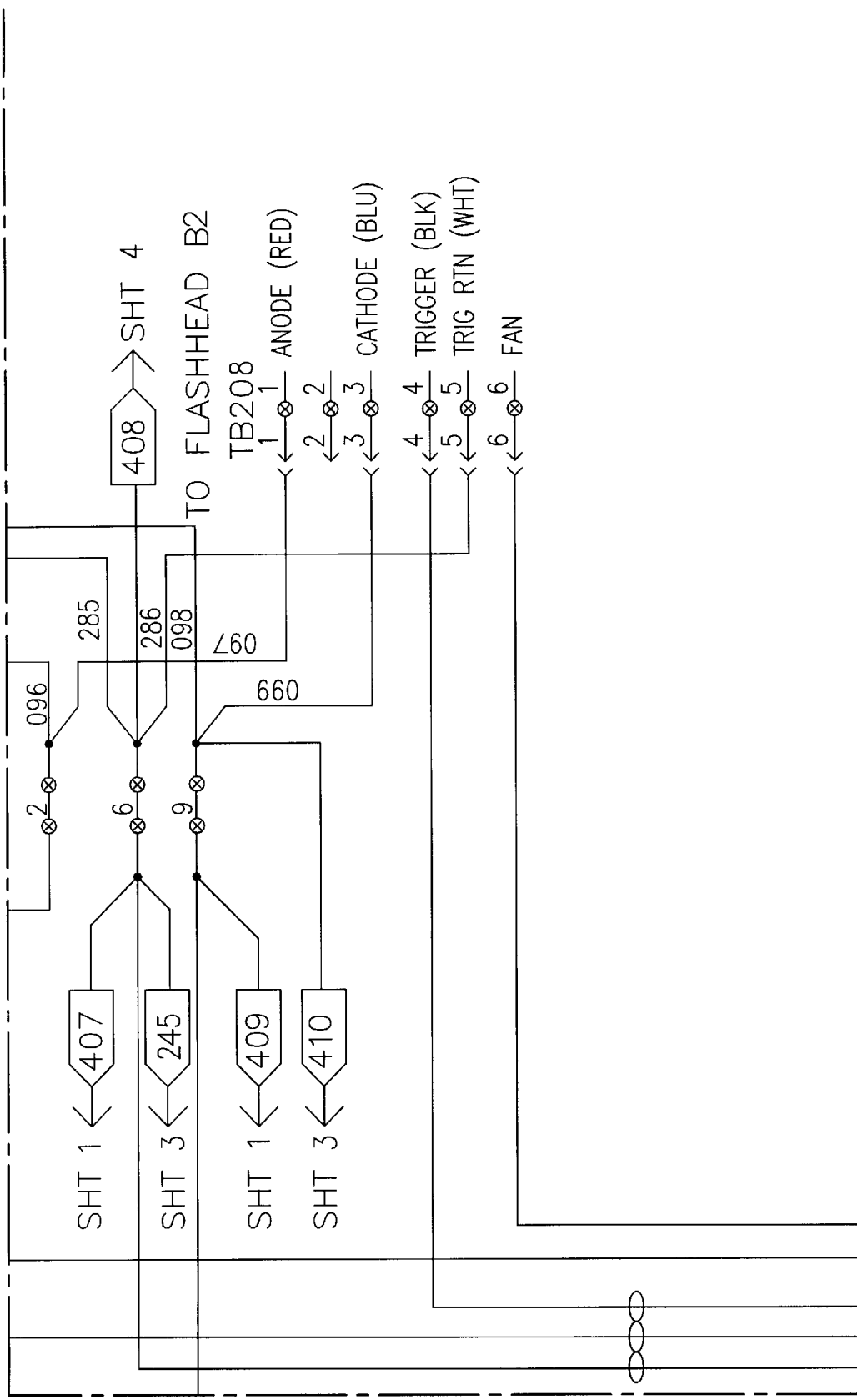
FIG. 2b6

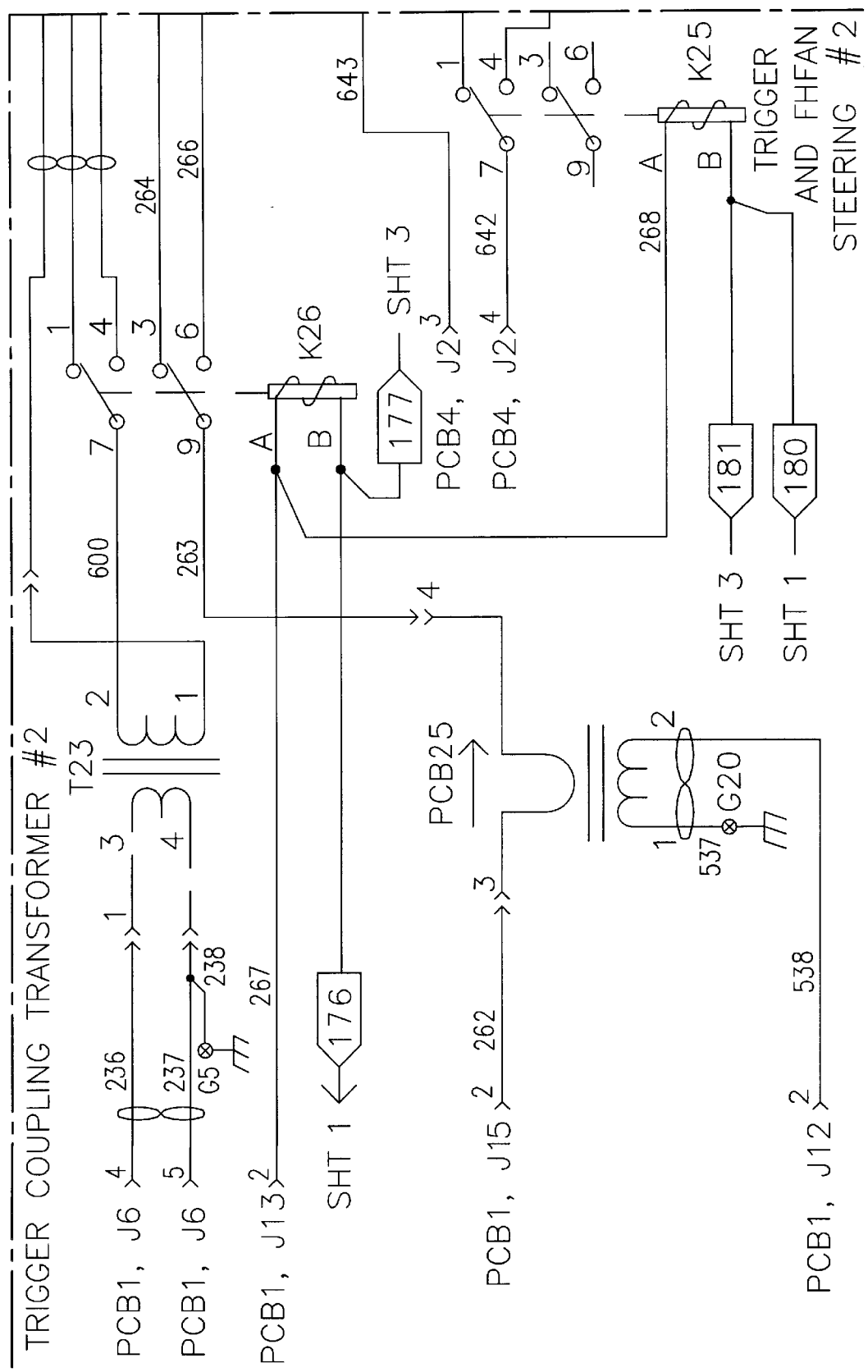
FIG. 2b7

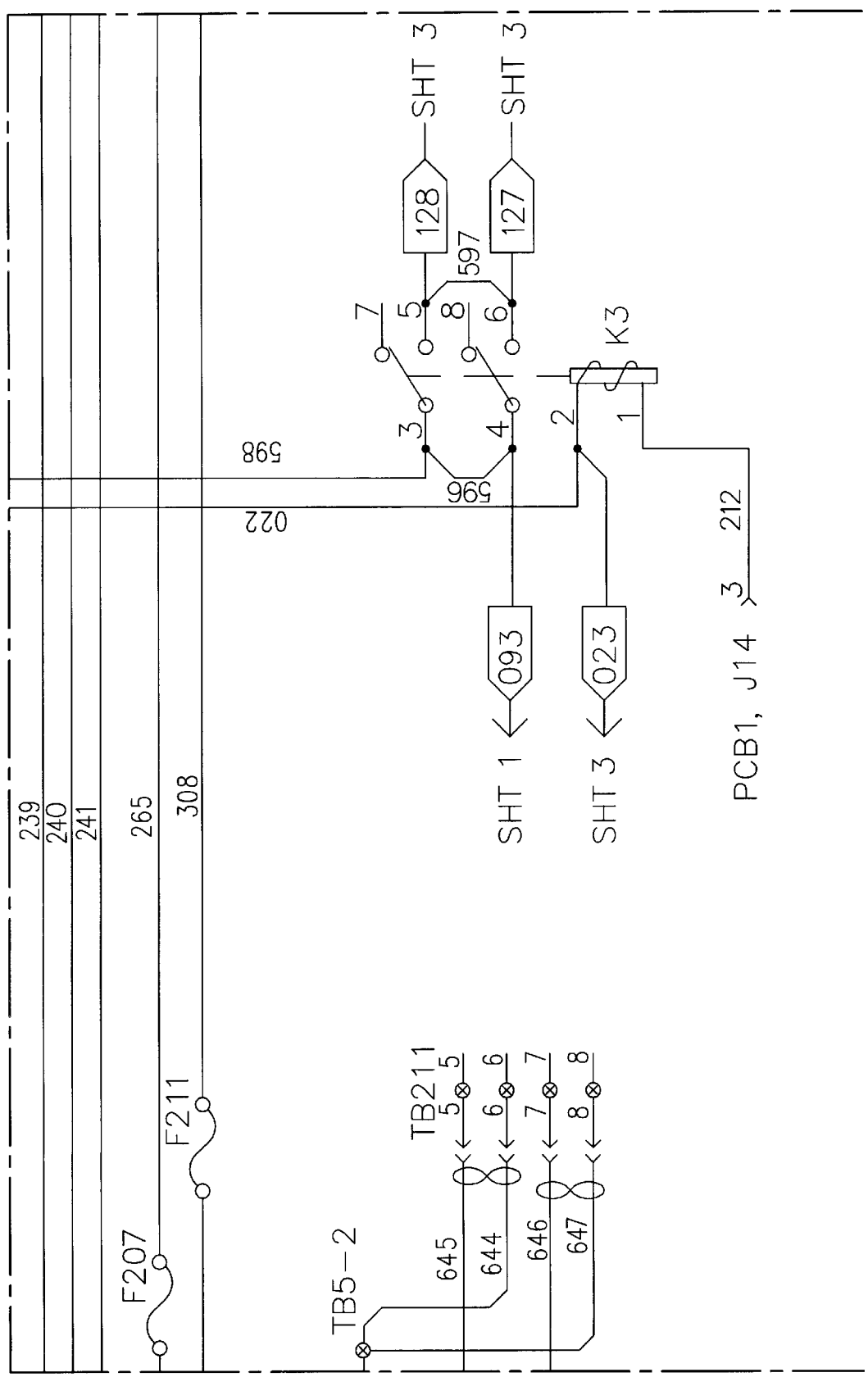
FIG. 2b8

FIG. 2b9

| FIG. 2c1 | FIG. 2c2 | FIG. 2c3 |
|---|---|---|
| FIG. 2c4 | FIG. 2c5 | FIG. 2c6 |
| FIG. 2c7 | FIG. 2c8 | FIG. 2c9 |

*FIG. 2c*

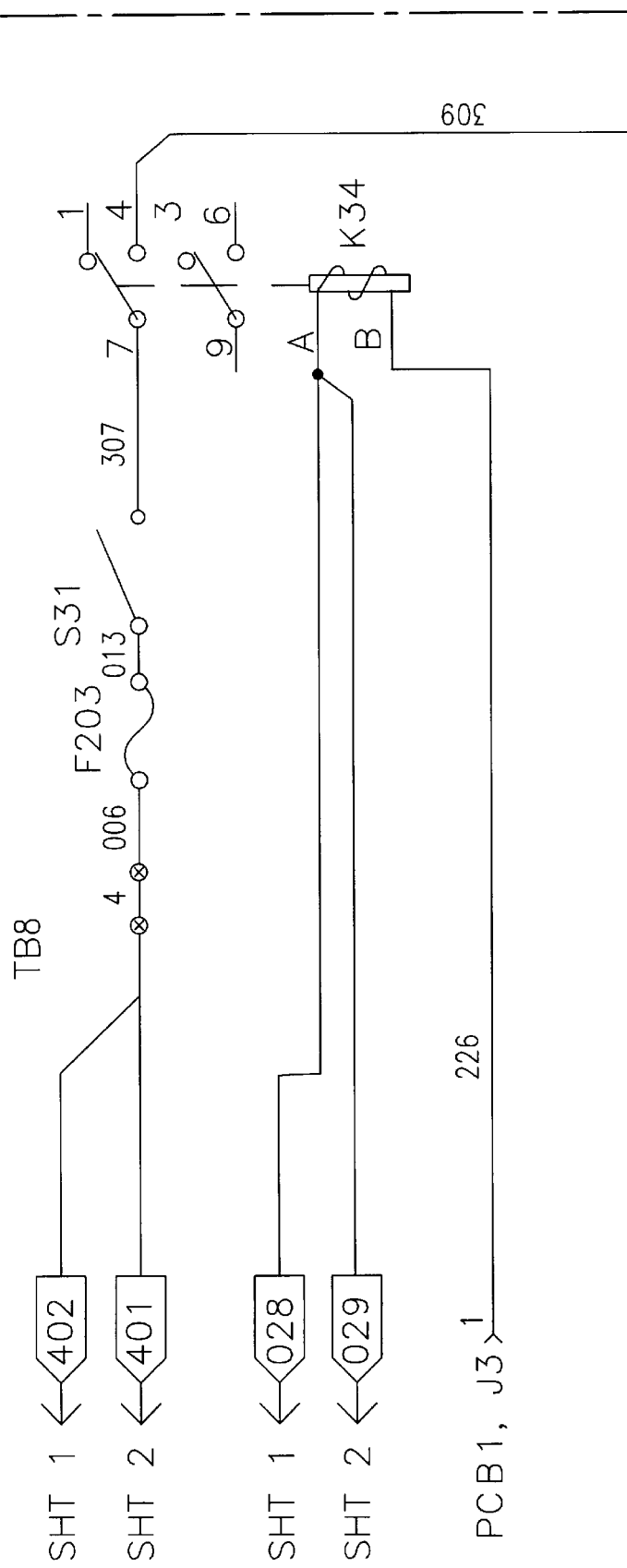
FIG. 2c1

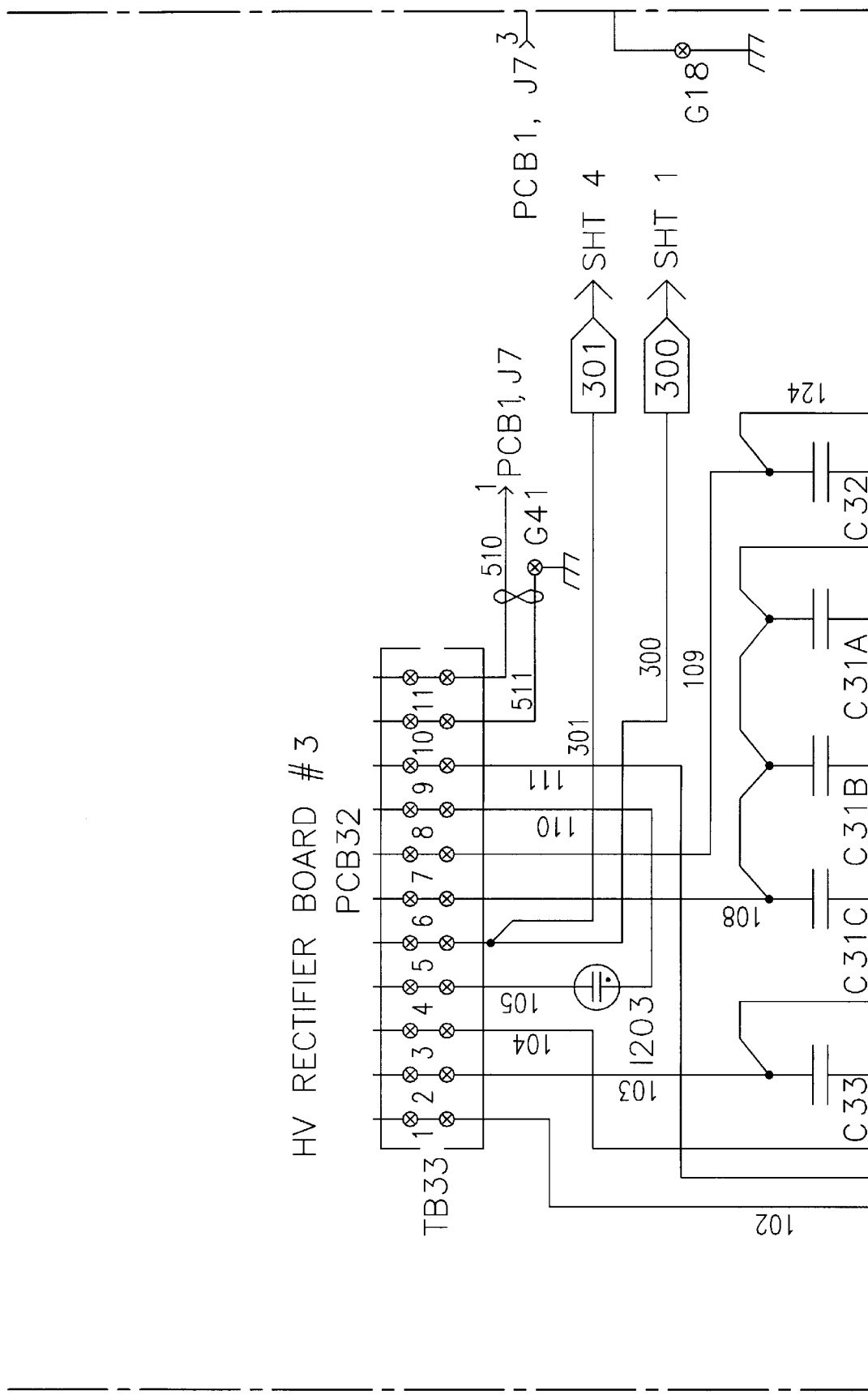
FIG. 2c2

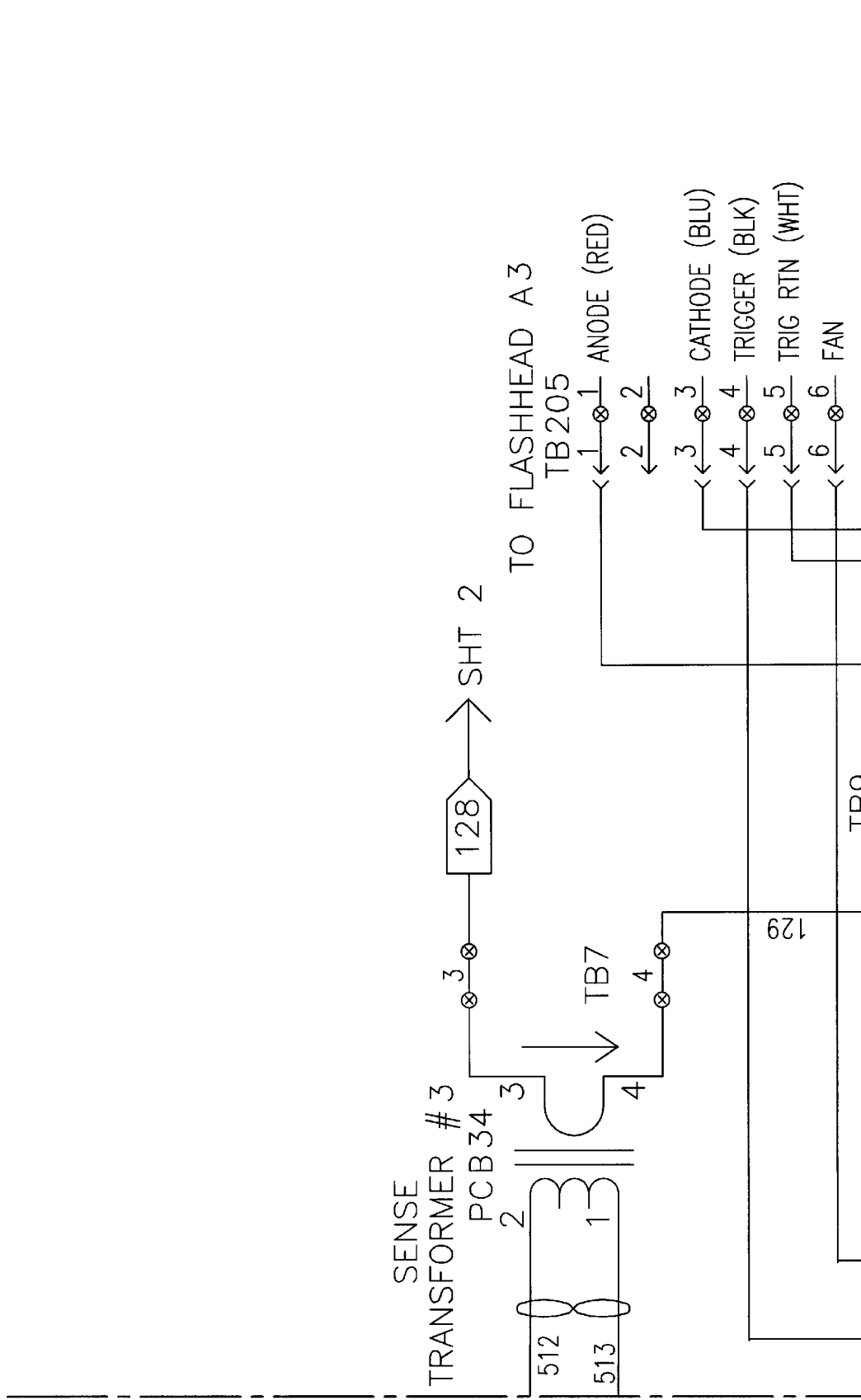
FIG. 2c3

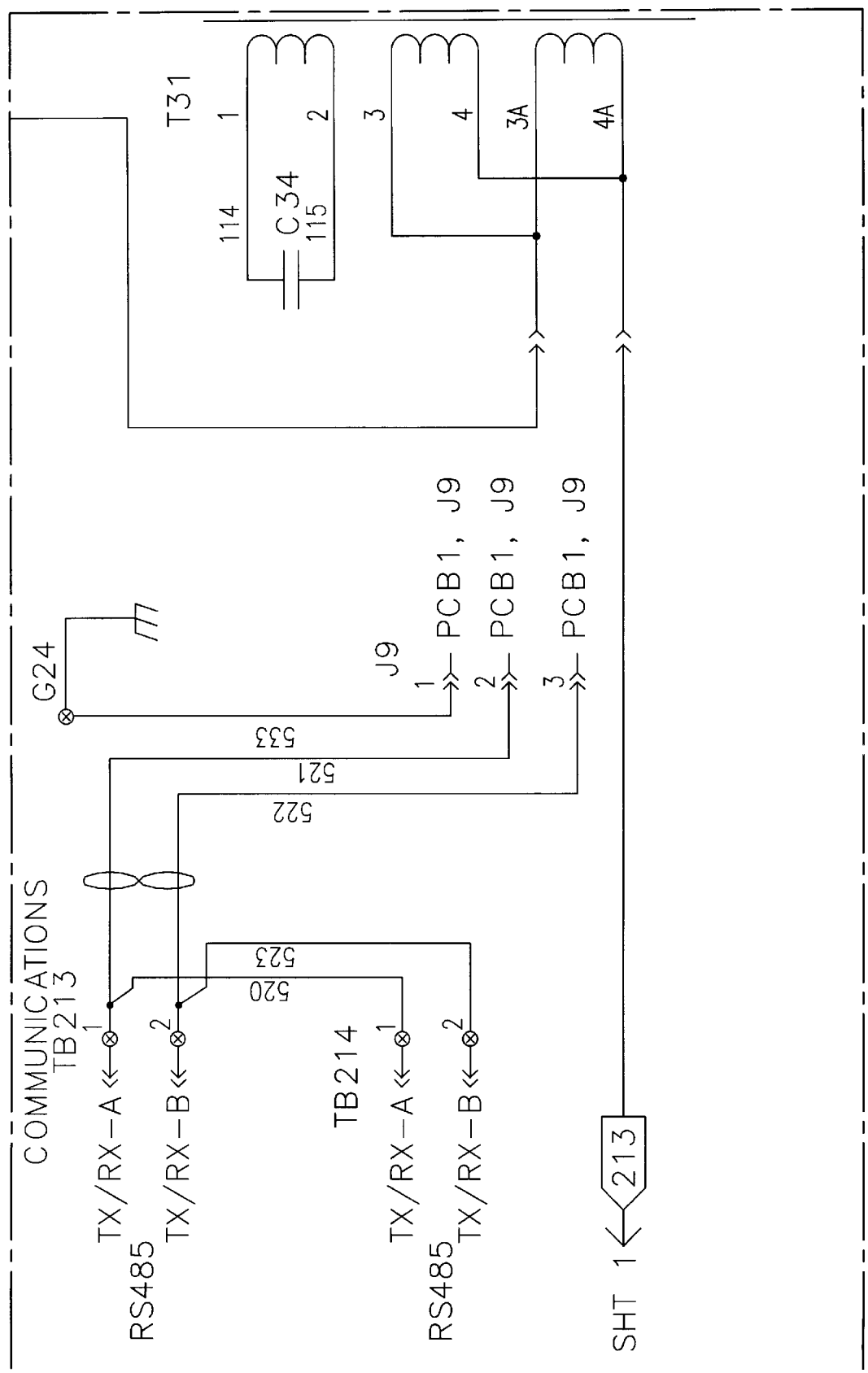
FIG. 2c4

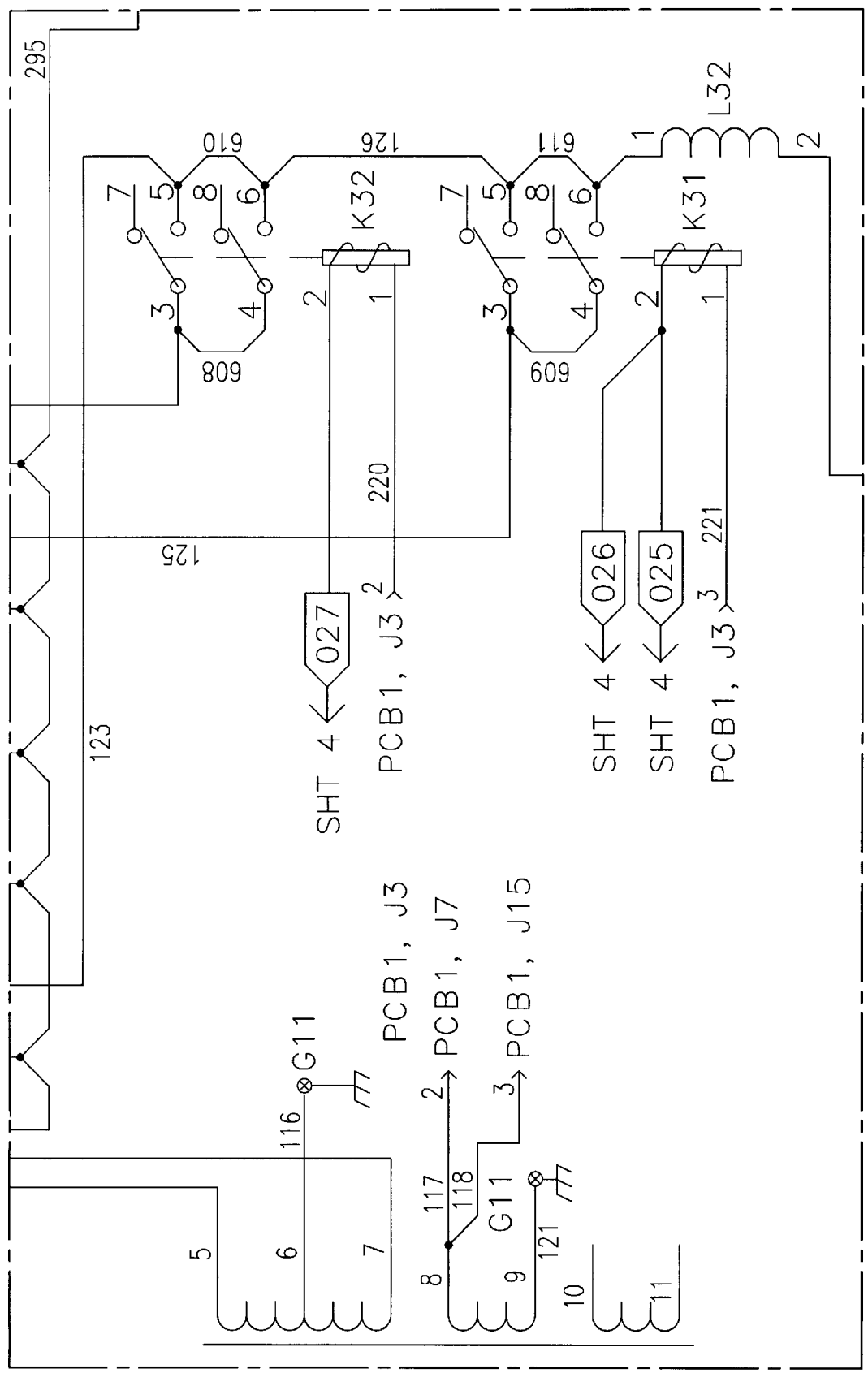
FIG. 2c5

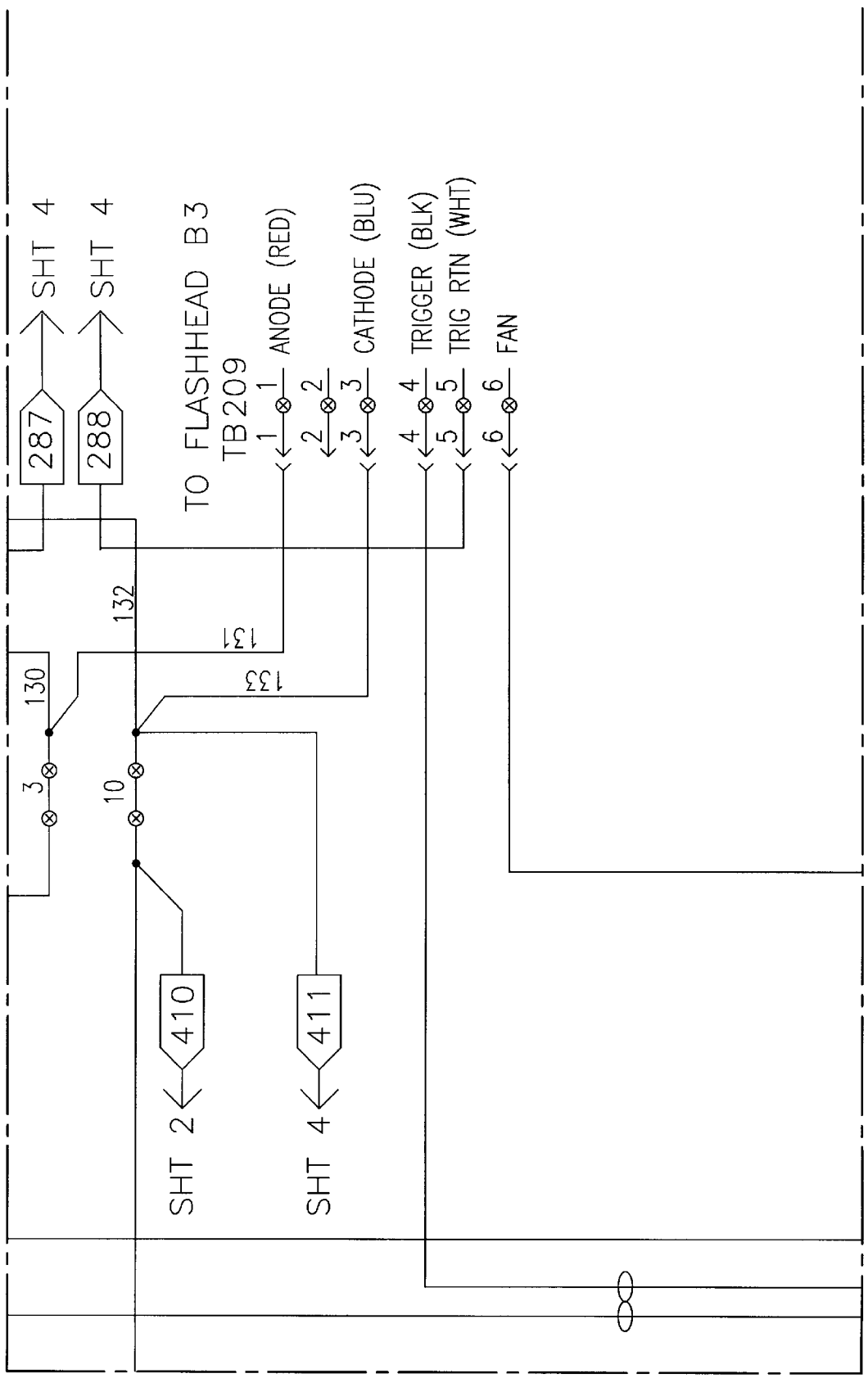
FIG. 2c6

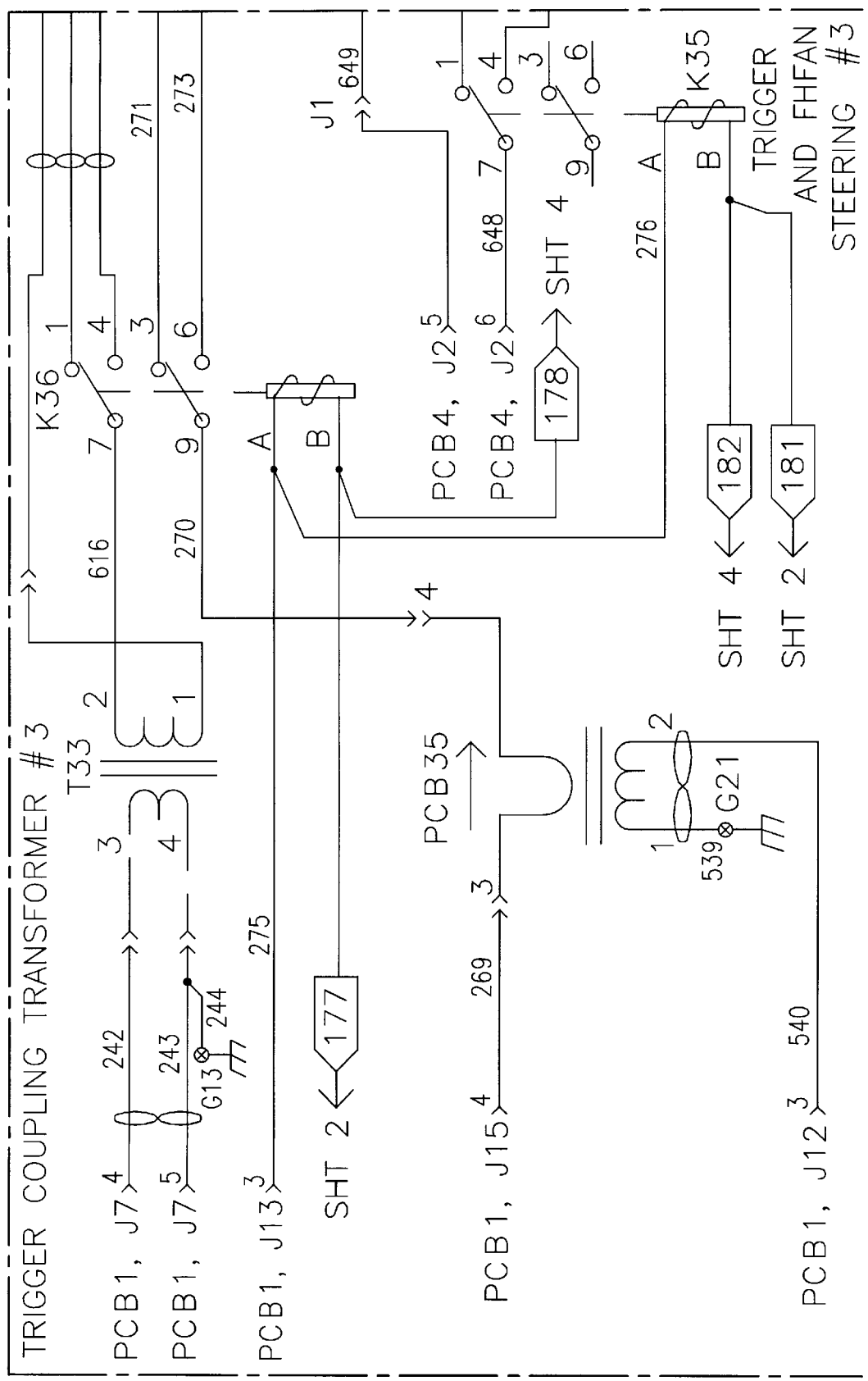
FIG. 2c7

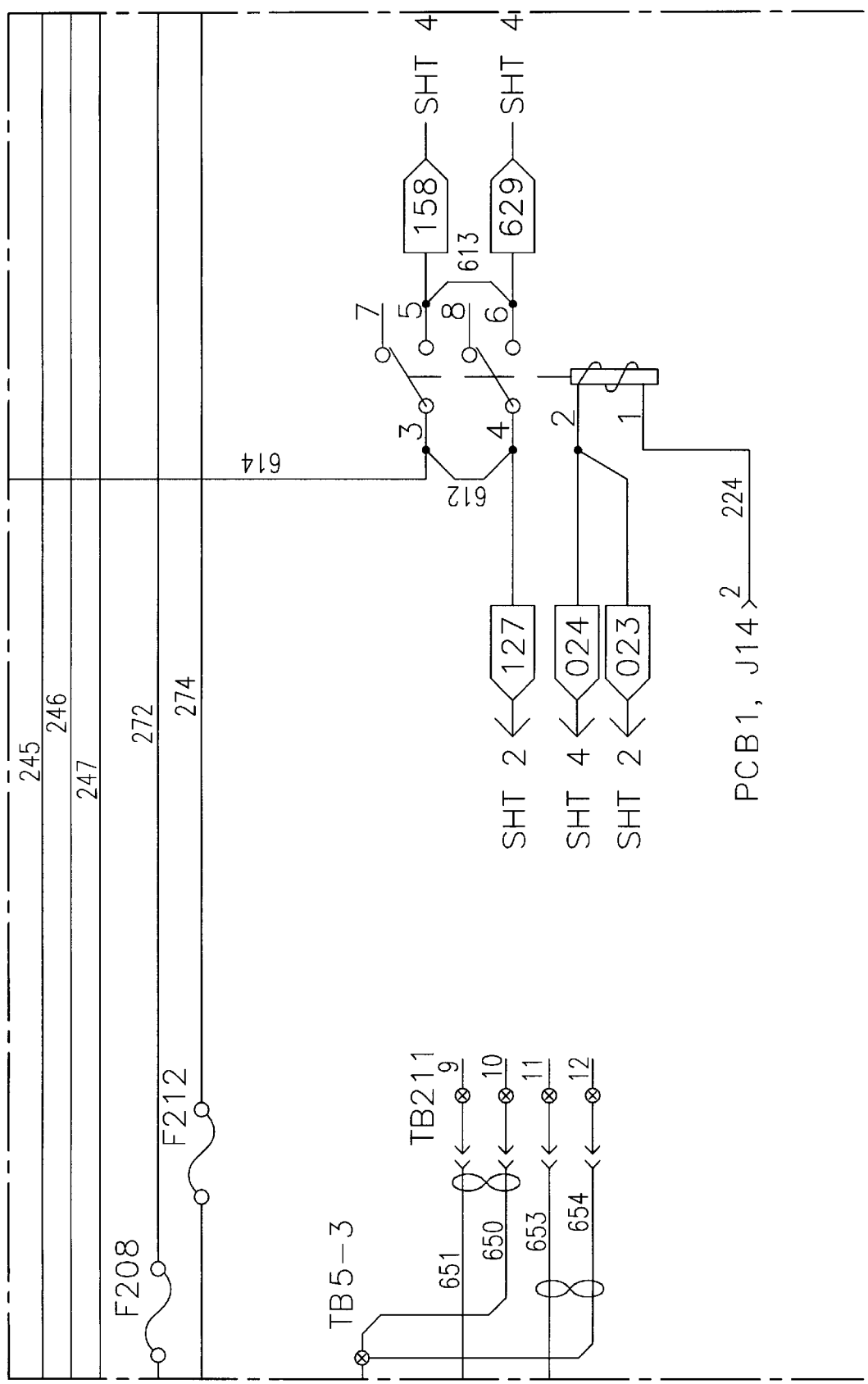
FIG. 2c8

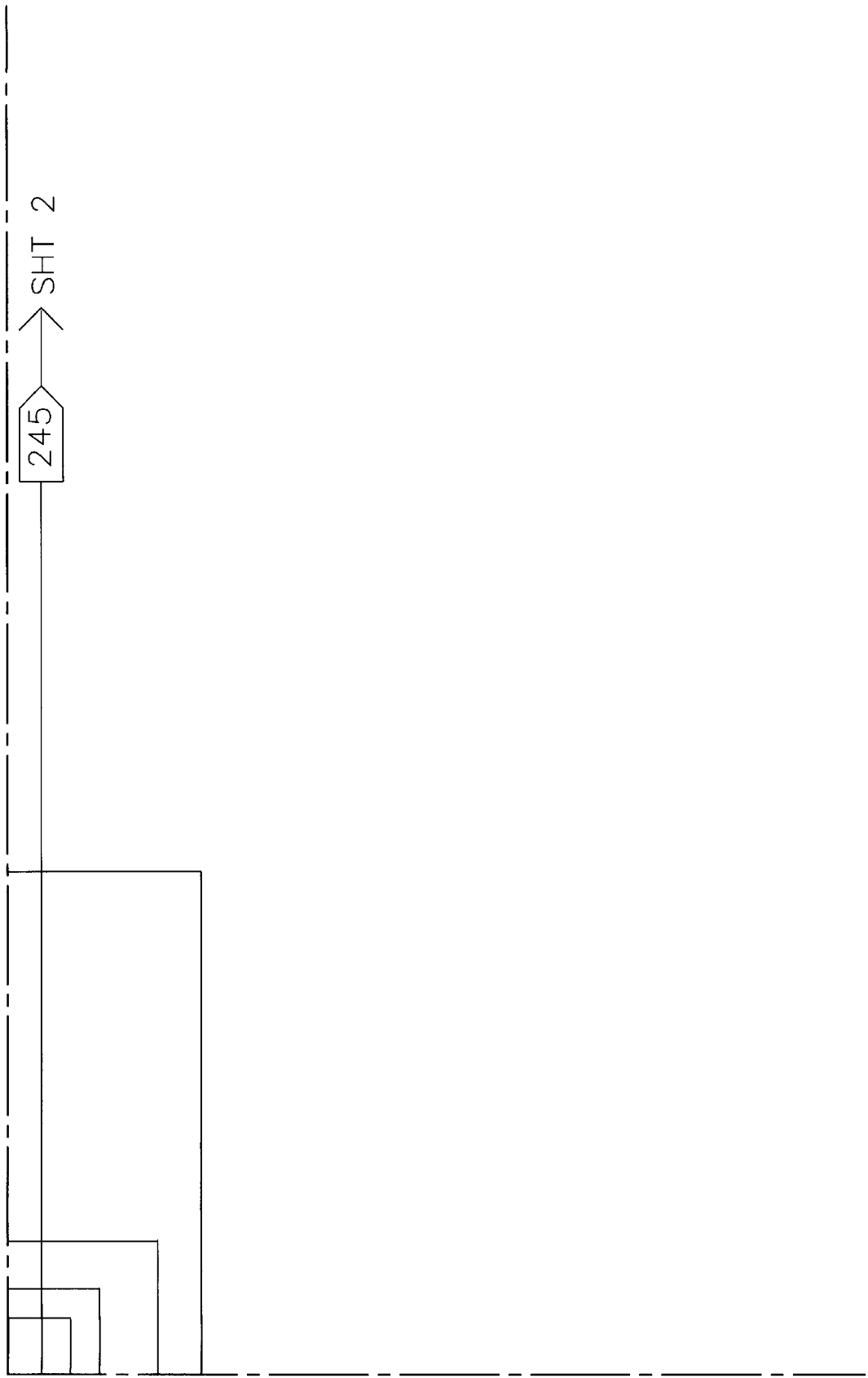
FIG. 2c9

| FIG. 2d1 | FIG. 2d2 | FIG. 2d3 |
| --- | --- | --- |
| FIG. 2d4 | FIG. 2d5 | FIG. 2d6 |
| FIG. 2d7 | FIG. 2d8 | FIG. 2d9 |

*FIG. 2d*

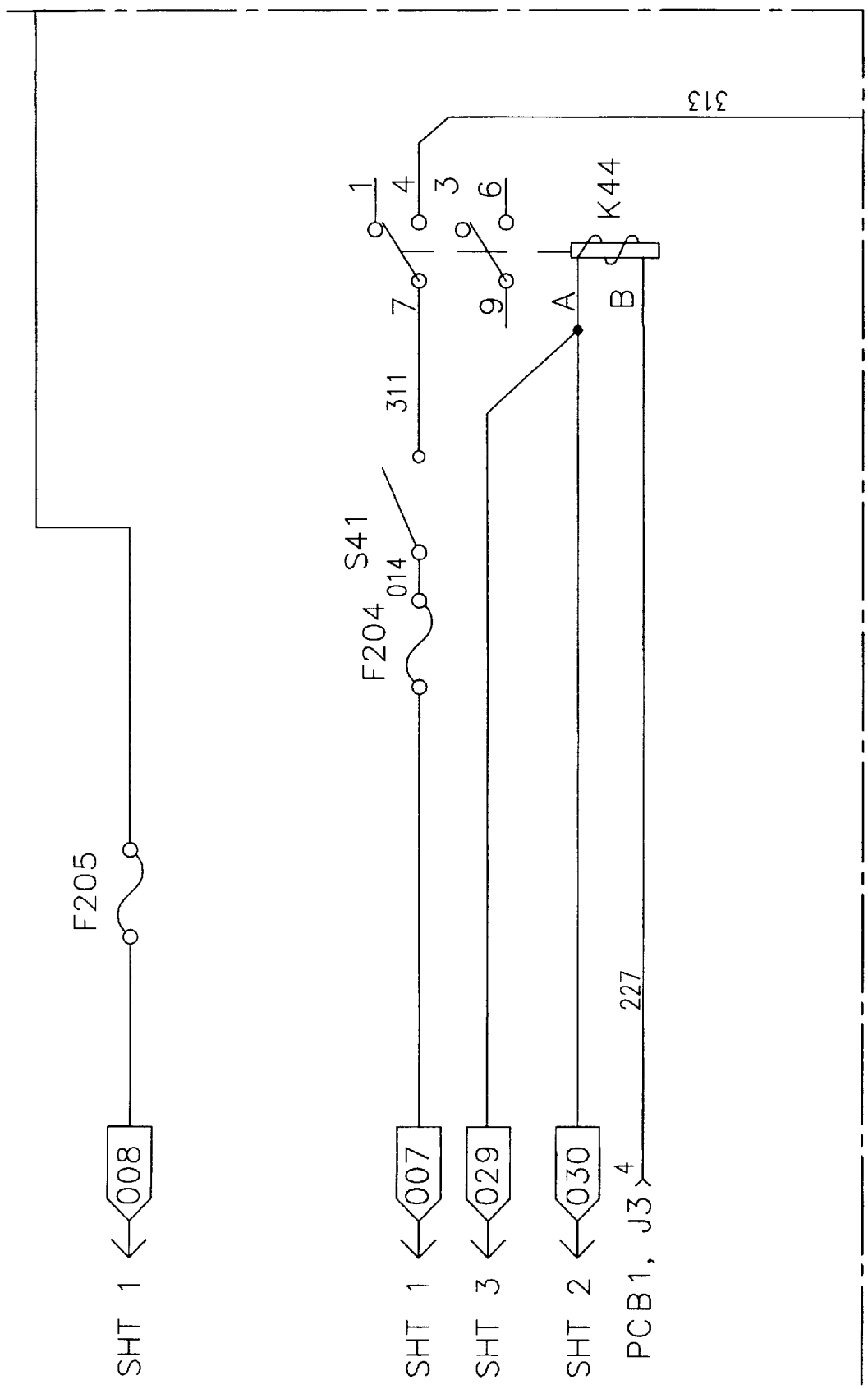
FIG. 2d1

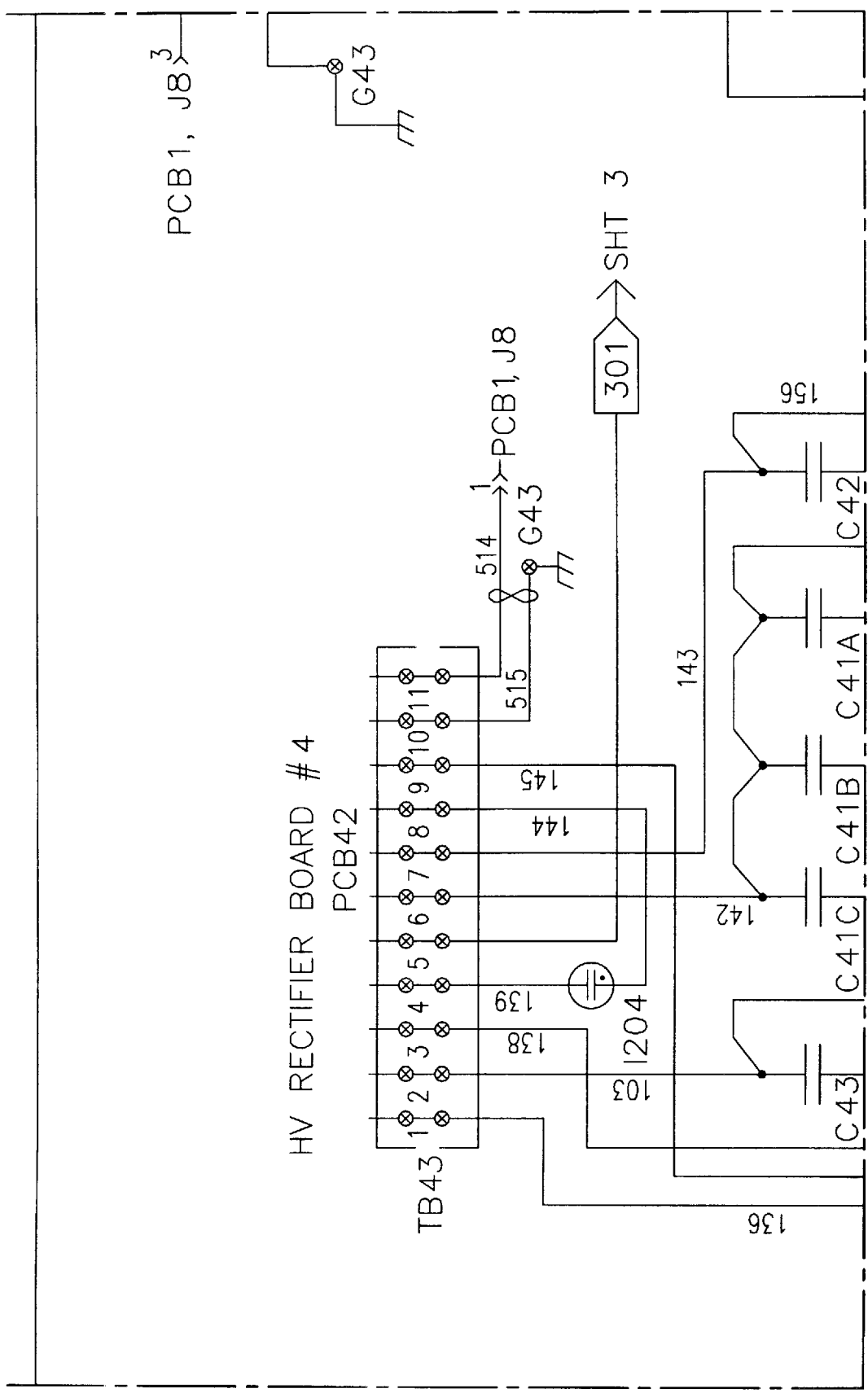
FIG. 2d2

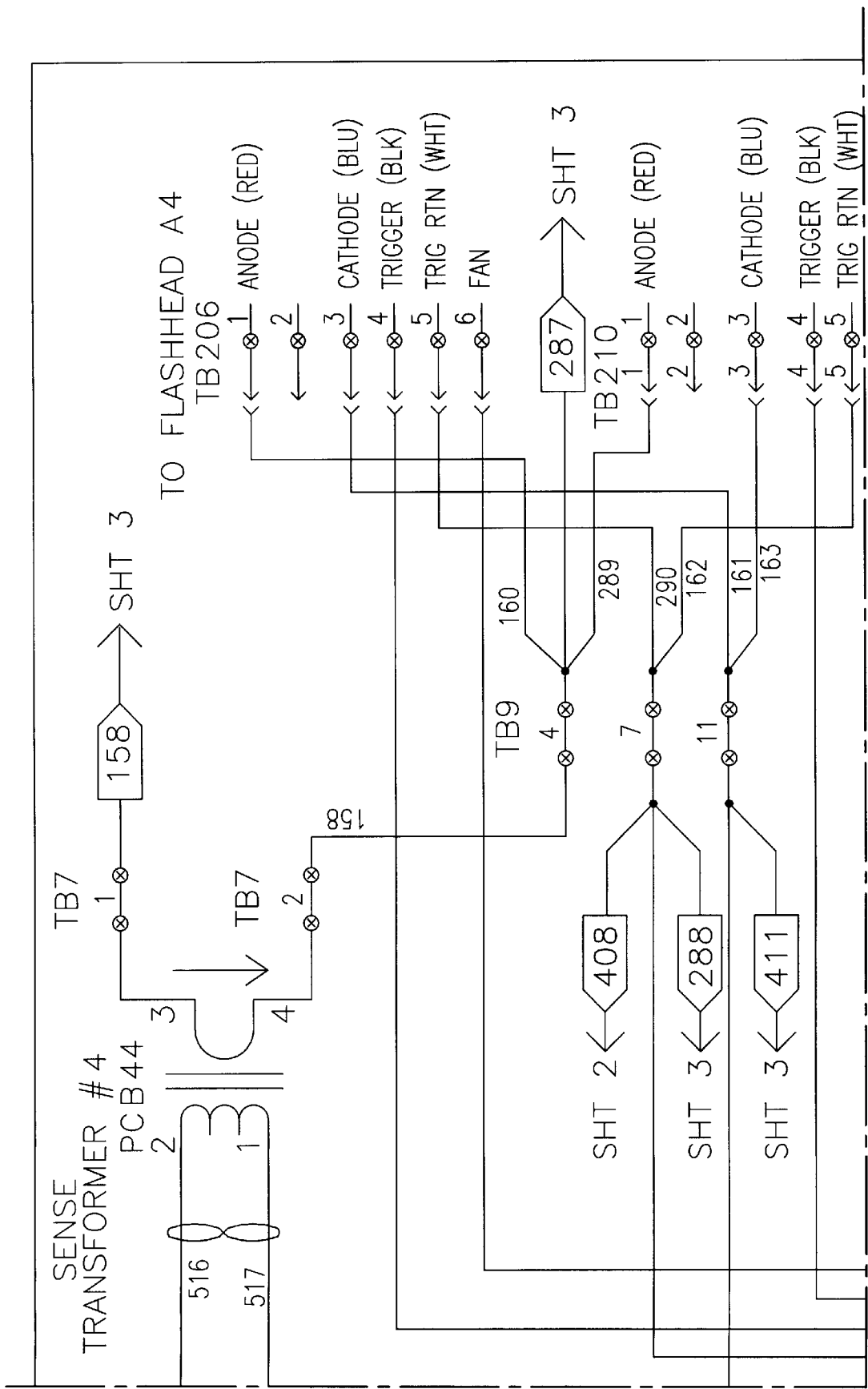
FIG. 2d3

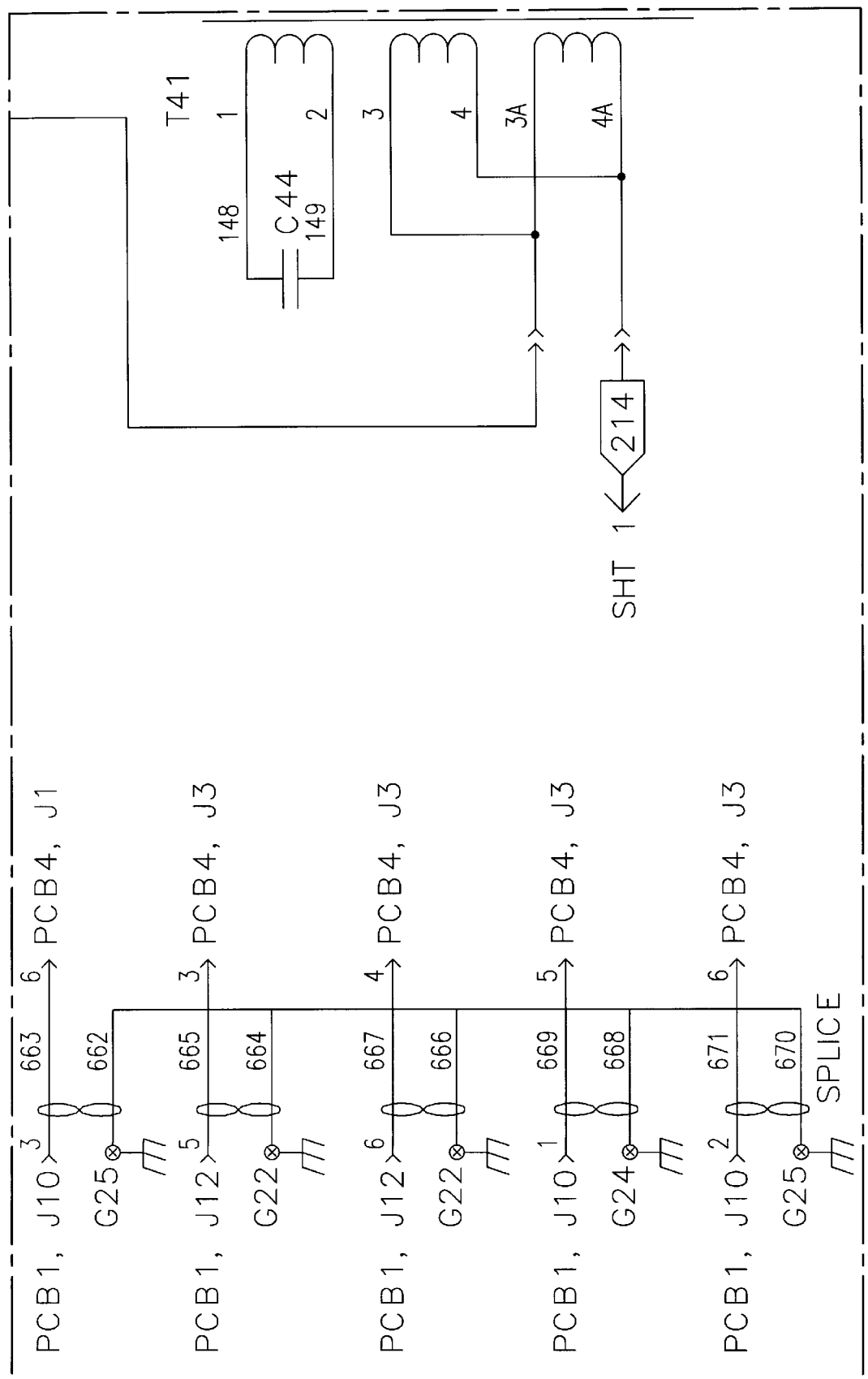
FIG. 2d4

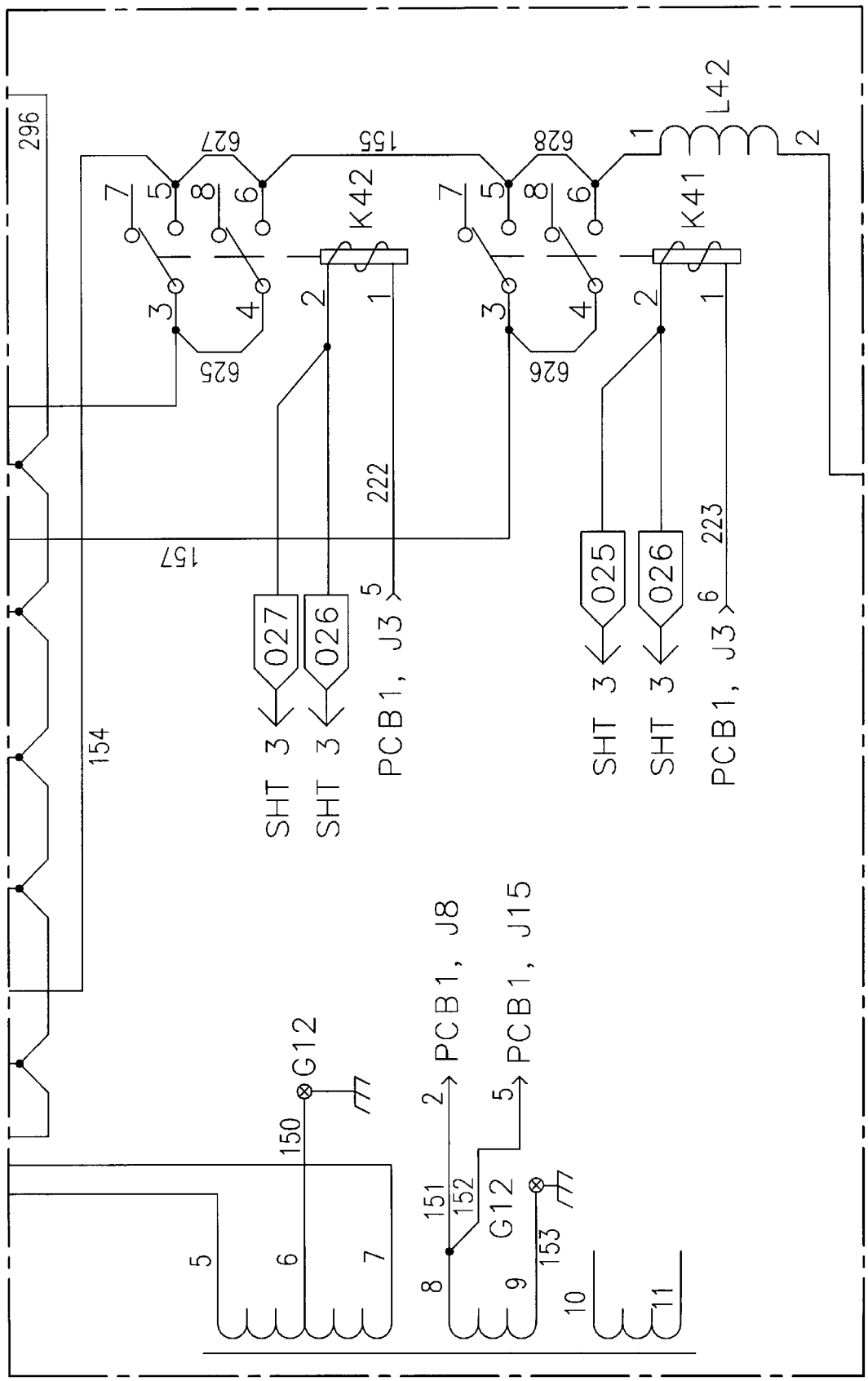
FIG. 2d5

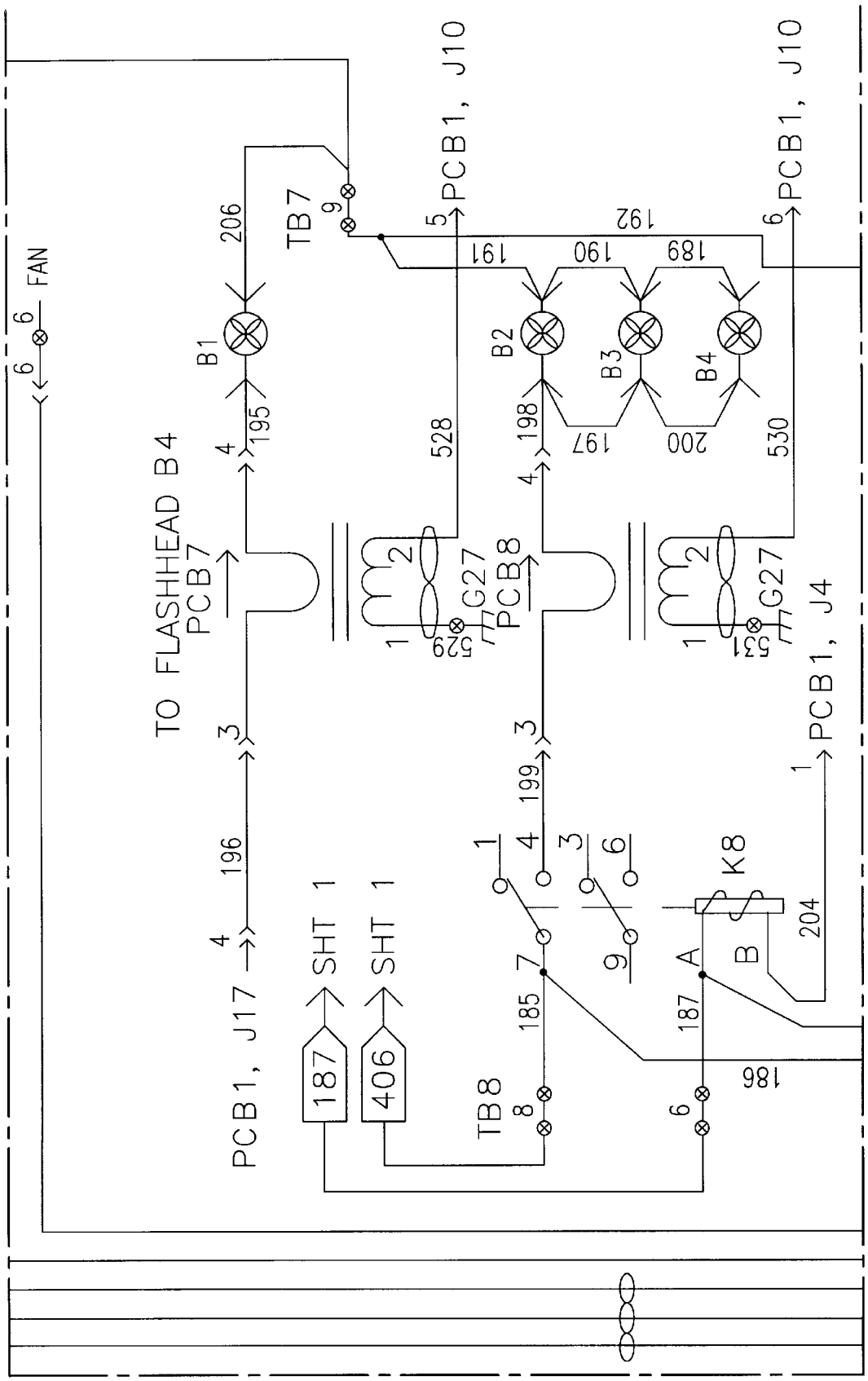
FIG. 2d6

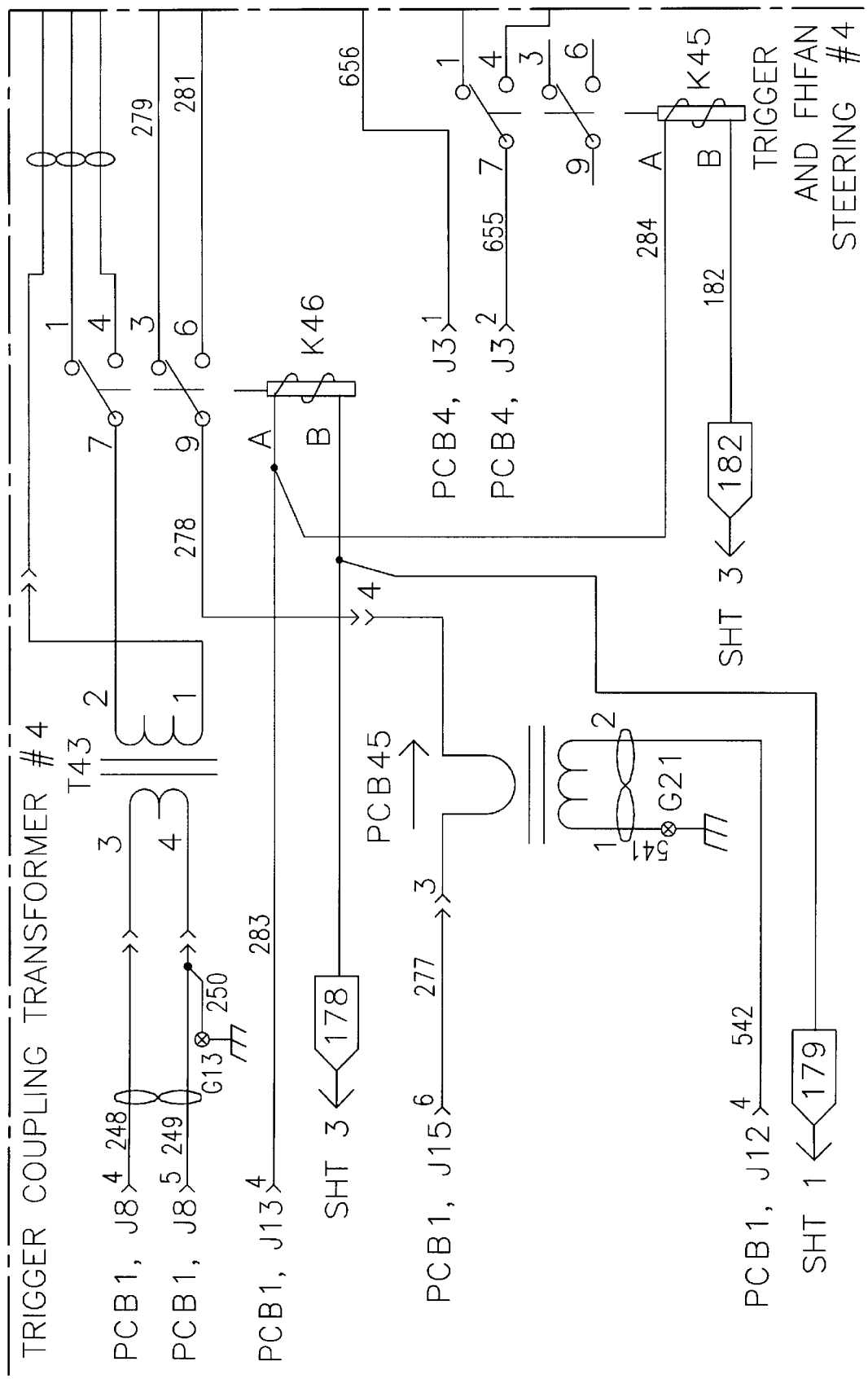
FIG. 2d7

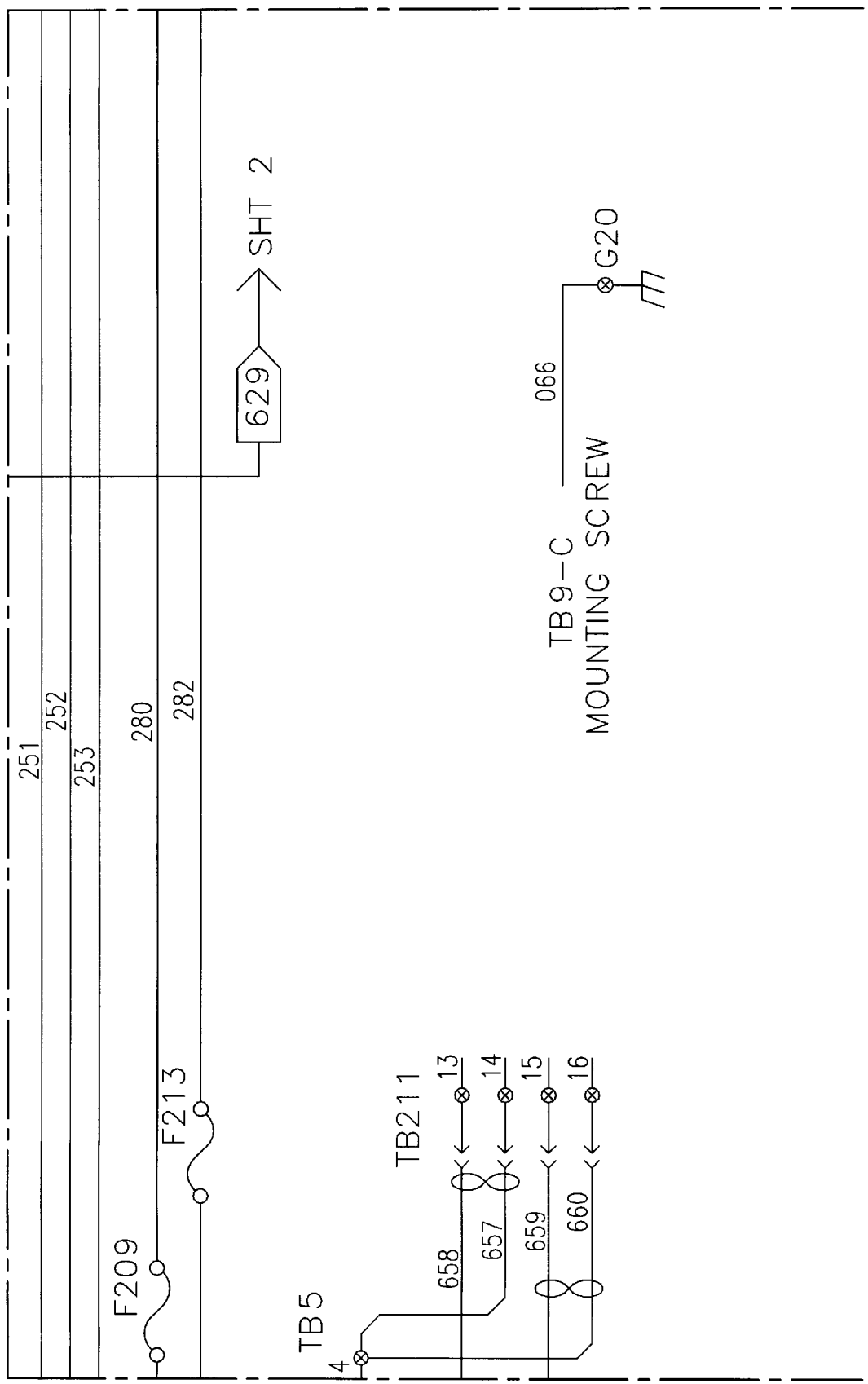
FIG. 2d8

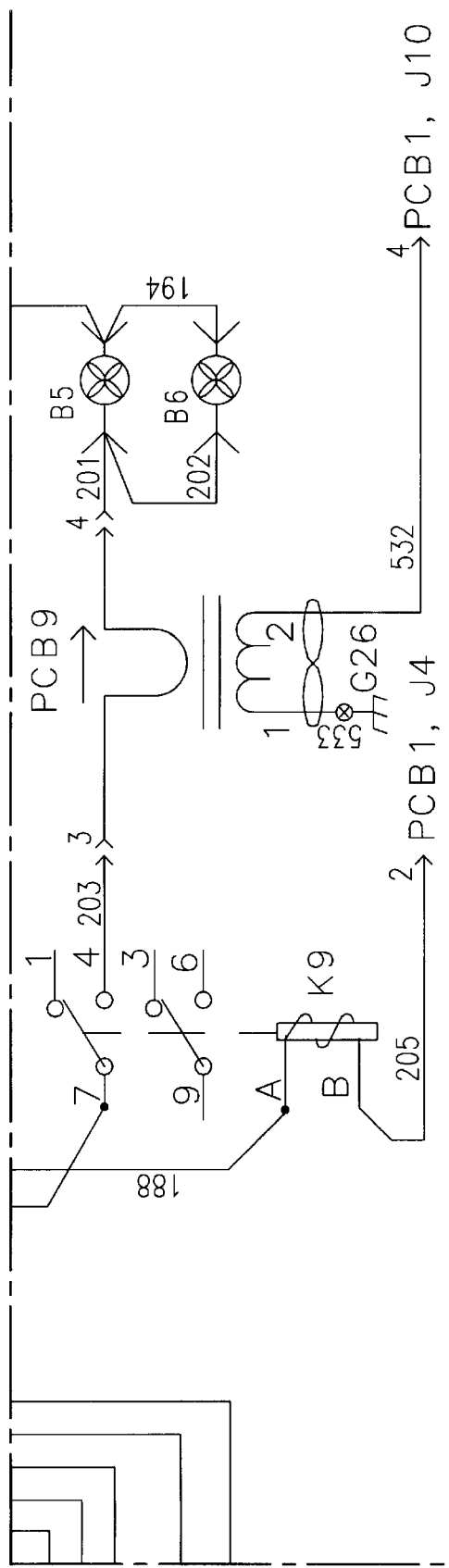
FIG. 2d9

FIG. 10

Flash Head Configuration

Serial Port: 2
Address: 16
Flash Head: A

Color: White
Flash Rate: 400 fpm
Sequence Delay: 2
Intensity: Cap 1

Position
X:Axis 0   Y:Axis 0   Z:Axis 0

System Override
◆ Use System Settings
◇ Override System Settings

Flash Head Trigger
☑ Enable Trigger
☐ Disable Trigger

Flash Head Fan Operation
◇ Manual On
◇ Manual Off
◆ Automatic

Fan is Currently On

OK   Cancel   Help

*FIG. 12*

CONTROLLABLE STROBE LIGHT SYSTEM AND METHOD FOR DIRECTING THE MOVEMENTS OF FISH

BACKGROUND OF THE INVENTION

The present invention relates generally to barriers and other devices used to repel or direct the movement of migrating fish away from turbine intakes and other danger points at dams, hydroelectric facilities, and water intakes in lakes and rivers. More particularly, the present invention describes a system for directing the movement of fish in which the system uses multiple underwater strobe lights strategically positioned and controlled to direct fish away from and towards desired locations.

Hydroelectric power plants and dams have been used throughout the United States and the world with great effectiveness in electric power generation, irrigation, and flood control schemes. However, the increasing use of obstructions across rivers and other navigable waterways has created problems of its own, including deleterious effects on fish populations. For example, hydroelectric dam turbine intakes are a natural attraction point for schooling and migrating fish. If fish are allowed to enter those intakes, large numbers of fish are killed in relative short periods of time. Such fish kills, in turn, can cause damage to the facilities themselves. Also, dams and other structures placed across rivers can interfere with the natural migratory patterns of fish that have been established over the years. If these fish are not allowed to pass the dam and are obstructed from following their natural migratory waterways, fish populations can be greatly impaired. Similar problems can occur at municipal and industrial water intake sites, where large numbers of fish can be drawn into the intake. Therefore, it is important that some means be provided to direct migrating fish around or through a dam, obstruction, or intake so that they can reach their natural spawning grounds.

In response to these issues, federal and state agencies have become increasingly active in establishing a regulatory scheme for the protection of fish in these environments. Accordingly, a variety of physical barrier technologies have been developed in the prior art. These prior art technologies include the use of barrier nets, fish lifts, racks, mesh screens, and louvered bypasses. Unfortunately, such physical barriers have not been optimally efficient in protecting or diverting fish. Moreover, the installation of physical barriers can be extremely expensive, in that custom barrier designs must be developed for each location. Ongoing maintenance costs are also a significant negative factor in the use of physical barriers to control fish.

As an alternative to the use of physical fish barriers, experiments have been conducted in the prior art in the use of strobe lighting as a means to repel fish or otherwise control or direct their movement as they confront or approach a dam or other water intake. These experimental studies have demonstrated that strobe lights produce strong avoidance behavior in a variety of fish species on a consistent basis. In addition, the fish who show this avoidance behavior do not show a tendency to become acclimated to strobe light stimuli, even after prolonged exposure.

The strobe light systems used in the prior art experiments for the control of fish behavior have been deficient in a number of respects, particularly in regards to the development of a commercially useful system which can be easily adapted, installed, and used in a wide variety of physical and aquatic environments and that can be used, without significant modification, to control the behavior of one or more of multiple fish varieties. Thus, for example, variations in ambient water turbidity, water flow rate, flow direction, and water temperature, can directly impact the efficiency of fish control using strobe light systems. In addition, experimentation relating to the development of the present invention has shown that adjustment of flash intensity, flash frequency, and flash sequence is necessary in order to optimally adapt a strobe light fish control system to a particular environment and to a particular species of fish. Prior art systems have not allowed this degree of flexibility and control leading, to the conclusion that such systems can only be considered to be experimental rather than commercially useful.

For behavioral control of fish during a short migration season, there is only a very narrow window of opportunity to adapt a strobe light control system to that species of fish and to the particular environmental conditions encountered. Therefore, real time reaction and control of the system to varying ambient conditions and fish behavior is an important factor. Such control is not found in any of the prior art experimental systems.

Another problem found with prior art strobe light fish control systems relate to the longevity of the crucial underwater portion of the system, that being the multiple strobe light flash heads. Much of the prior experimentation with such systems has been used in conjunction with flash heads mounted at or near the water surface, attached to floating structures. However, a universally adaptable, commercially useable fish control system using multiple strobe flash heads must be capable of installation at significant depths below the water line, up to perhaps one hundred-fifty feet. This produces a set of problems of its own, particularly in heat management. The preferred means of generating illumination from a strobe flash head is the xenon tube which is both durable and highly efficient. However, the heat generated by the xenon tube and related components must be carefully controlled, particularly in an underwater location, so that the flash head will not fail prematurely because of excessive heat buildup. Experimental prior art strobe light fish control systems have relied on relatively crude adaptations of strobe light devices which have not fully met the needs for deep water submersion, durability, and high flash intensity.

What is needed, then, is a system for the control of fish movement using strobe lights which can be easily installed and adapted to a wide variety of physical environments, can be controlled and adjusted to influence the behavior of a wide variety of fish species, and which carefully deals with flash head heat management in order to prolong the durability of the system.

SUMMARY OF THE INVENTION

One object of the present invention is to provide a system to direct the movement of fish near man-made structures that is reliable, efficient, flexible, easy to install, and easy to maintain.

Another object of the present invention is to provide a strobe light fish movement control system in which operational control and functioning of the system can be adjusted easily and in real time to adapt the system to changing water and other conditions near the structure.

Yet another object of the system of the present invention is to provide flash heads in a multiple flash head strobe light fish movement control system which can operate efficiently and continuously while submerged.

These and other objects of the invention which will be apparent to those skilled in the art are met by a strobe light fish movement control system in which multiple flash heads are linked through one or more flash head control units to a personal computer based system control unit. The system control unit and flash head control units include data communication services, status monitoring devices, and control links which allow an operator of the system to change and monitor the flash sequence, flash rate, and flash intensity. In addition, an air bubble curtain and water jets installed at or near the flash head allow the system to adapt to changing water conditions and fish varieties so that the system can be easily optimized for a particular environment.

The flash heads used in the system are configured for long life while submerged through the use of novel heat management features. An internal cooling fan and temperature sensor sends signals to the system so that appropriate heat control measures can be undertaken. An air plenum is formed around the flash tube inside the waterproof flash head housing so that air can be easily circulated, with an air passage way formed between the outside of the air plenum and the inner wall of the housing. A parabolic reflector enhances radiated light from the flash head and forms a top surface of the air plenum. Forced air is brought to the flash tube through an opening in the central portion of the parabolic reflector, thereby minimizing light loss.

Constant monitoring of flash rate, flash intensity, and flash head temperature prevents overheating of the flash tube in each flash head.

BRIEF DESCRIPTION OF THE DRAWINGS

FIGS. 2a, 2b, 2c, and 2d collectively are a schematic diagram of a flash head control unit as used in the present invention, with each flash head control unit including four flash head control circuits which are separately illustrated on each drawing page.

FIG. 10 is a drawing of a typical video display screen generated by the software used in the system control unit, allowing the user to configure operation of a flash head control unit.

FIG. 12 is an illustration of a typical video display screen presented to an operator of the system at the system control unit when configuring an individual flash head.

DESCRIPTION OF THE PREFERRED EMBODIMENT

System Overview

Figure 1:
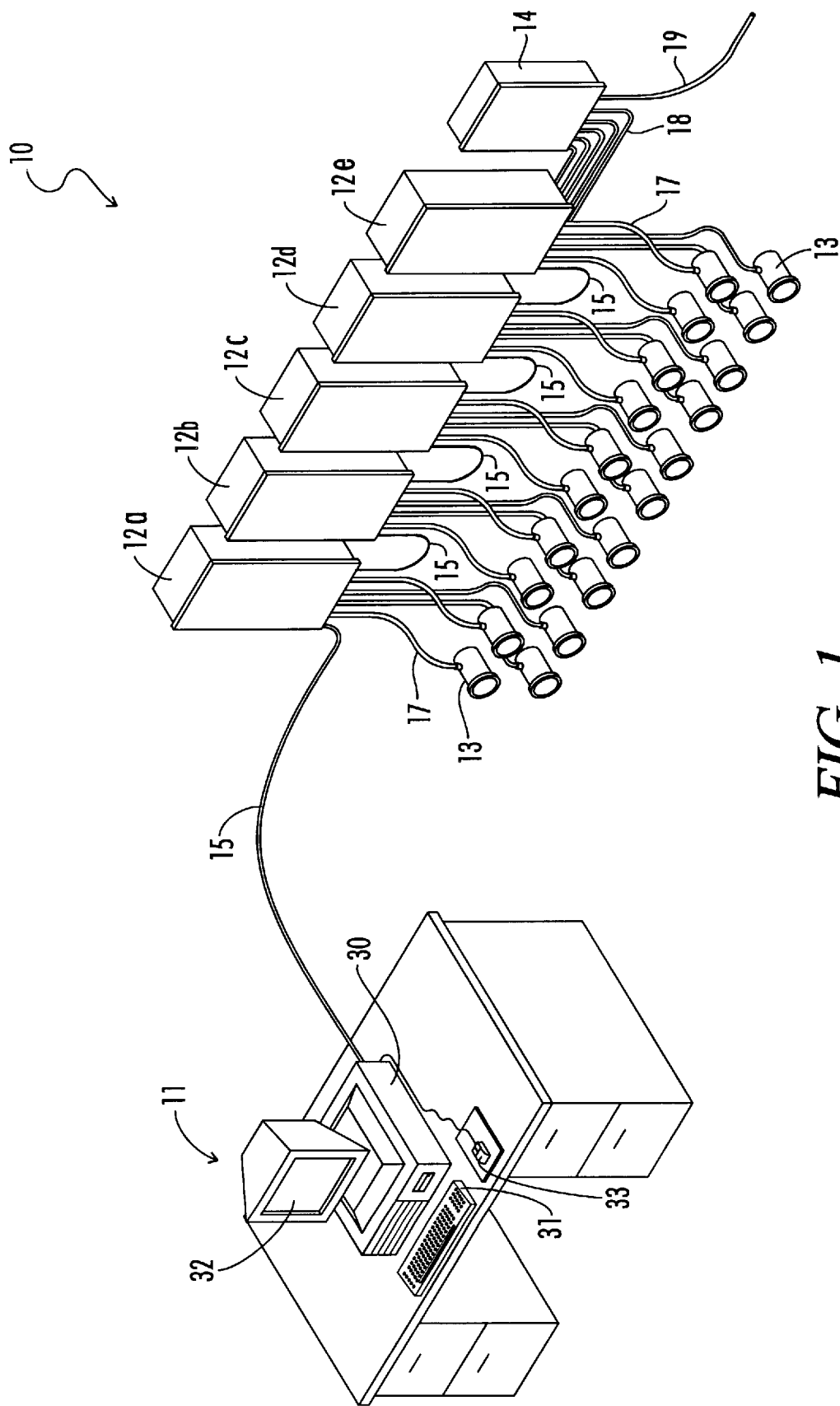
FIG. 1 is a perspective view showing the general arrangement of the system of the present invention, including the system control unit, multiple flash head control units, and multiple flash heads.
Figure 3:
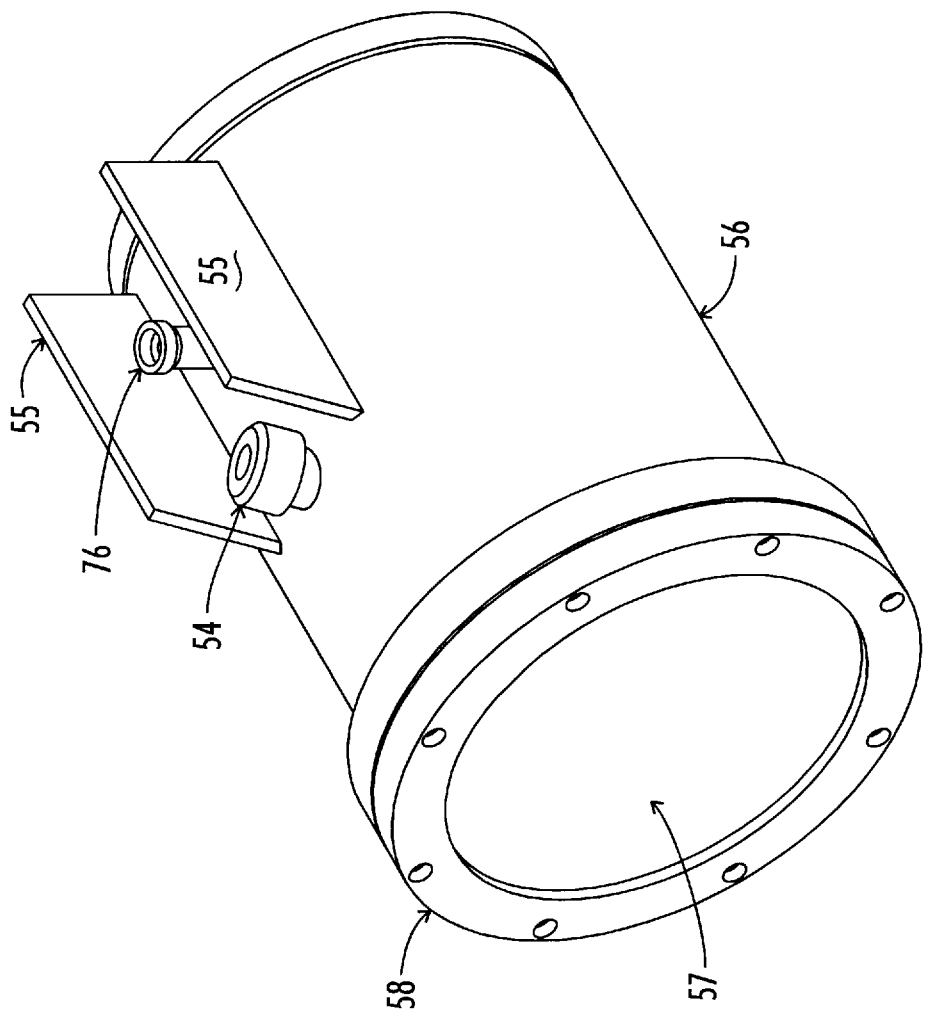
FIG. 3 is a perspective view of a single flash head as used in the system of the present invention.
Figure 4:
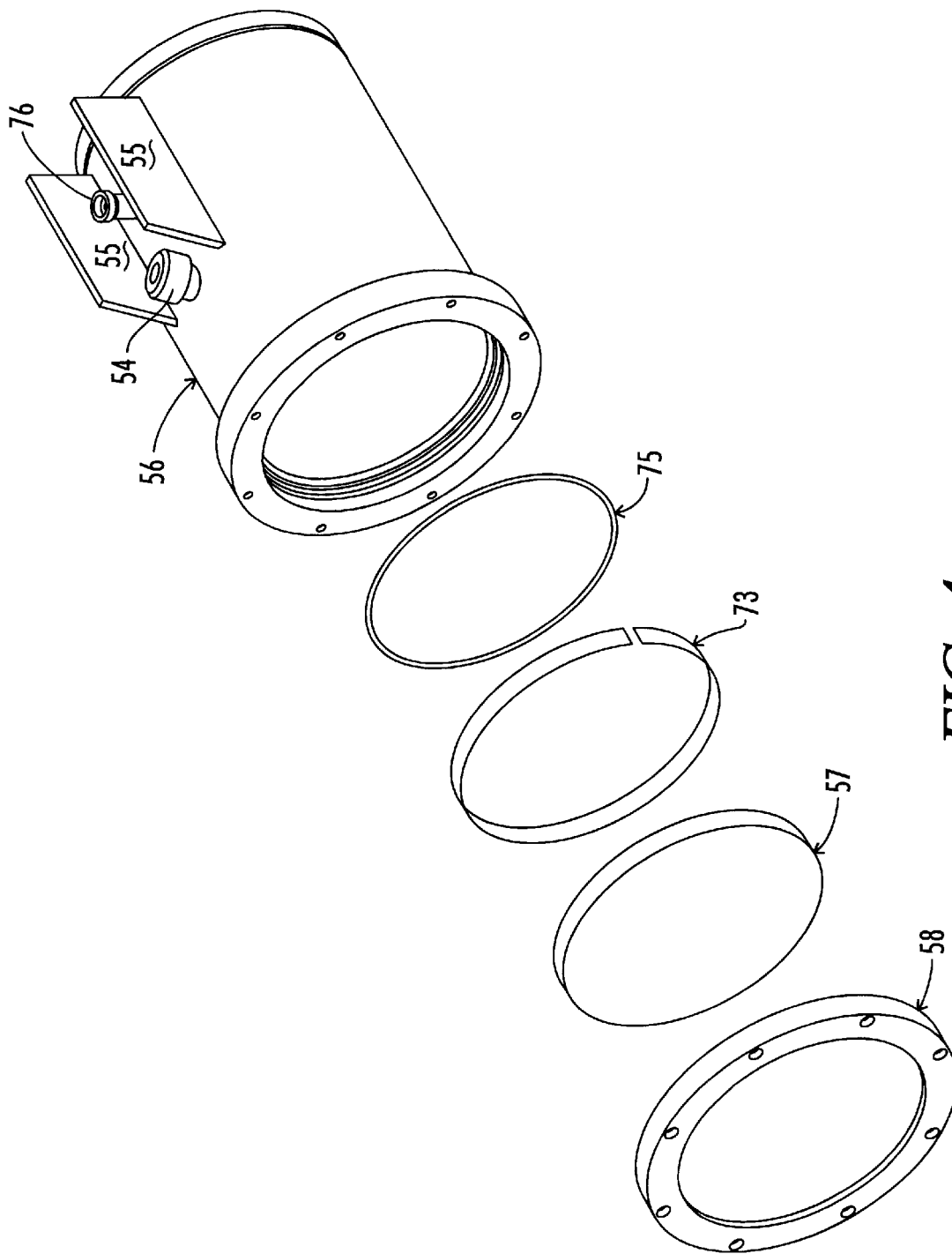
FIG. 4 is a perspective view of a single flash head, partially exploded to show the lens and lens clamping ring.

The fish movement control system is designed to provide an improved solution to the problem of entrainment of aquatic life in hydroelectric power plant intakes, pump-back station intakes, spillway intakes, and the like. FIG. 1 shows a general arrangement of the system 10 prior to installation near the structure where fish control is desired. A set of multiple flash heads 13 operated in a pre-determined sequence provide the strobed illumination used to direct movements of fish when the flash heads 13 are installed underwater near a structure. Each flash head 13 is connected by a power and control cable 17 to a flash head control unit 12. Preferably, to minimize component redundancy and increase the efficiency of installation, multiple flash heads 13 are controlled by a single flash head control unit 12. Thus, in FIG. 1, a total of twenty flash heads 13 are controlled by five flash head control units 12a, 12b, 12c, 12d, and 12e, with four flash heads 13 controlled by a single flash head control unit 12. Accordingly, each flash head control unit 12 will have multiple flash head control circuits. Signal processing, timing, and trigger control functions are provided by a timing and trigger board associated with each flash head control unit 12, as shown on FIG. 18.

Figure 5:
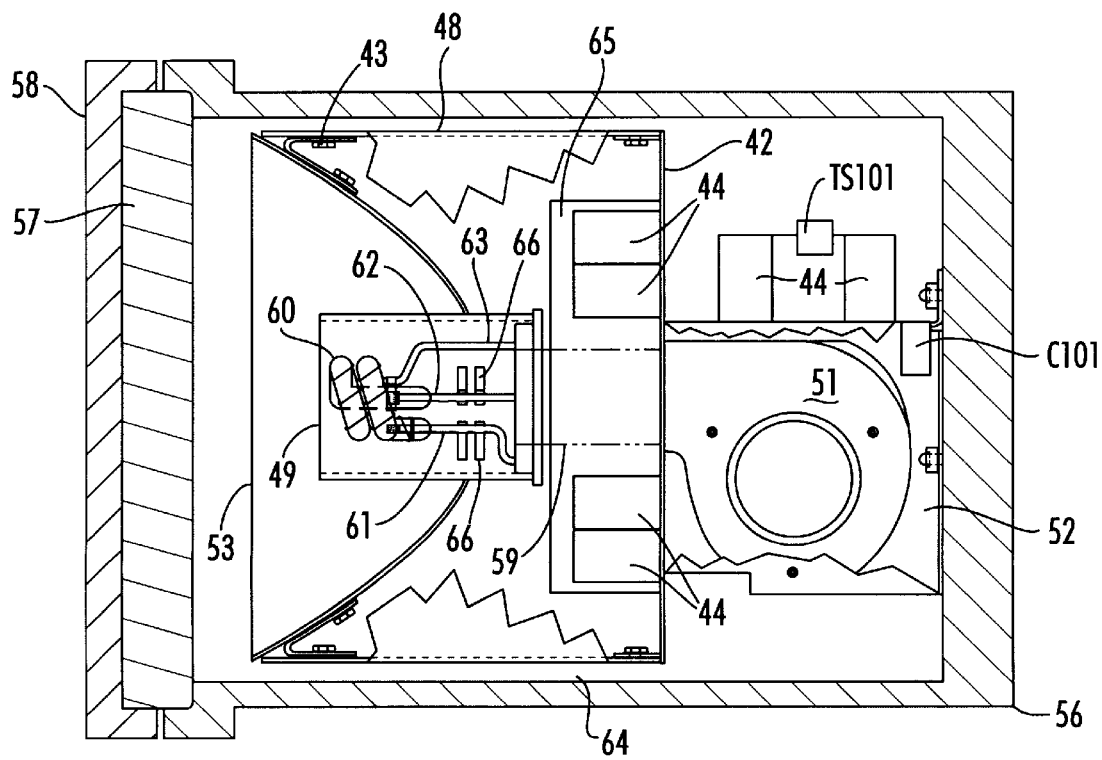
FIG. 5 is a cut-away side view of a single flash head.

In some aquatic environments, it may be desired to provide illumination wavelengths at each flash head 13 which are selectable by the system operator, after the flash heads are installed. In those situations, a flash head 13 may have two or more illumination devices and associated trigger circuits, with the flash head control unit allowing the system operator to switch between illumination devices and circuits to vary the flash wavelength. The respective illumination devices (xenon tubes 60 on FIG. 5) will have different color filters associated with them so that flash wavelength is selectable.

Overall control functions for system 10 are performed by system control unit 11, which preferably includes a personal computer 30 operatively combined with keyboard 31 and a mouse 33 to allow the operator of system 10 to enter system commands. The operator can monitor the operation of system 10 by viewing at video display 32 information that is displayed by the software being executed by personal computer 30. Data communications to and from system control unit 11 and each flash head control unit 12 are implemented by a serial data communications interface, including communications I/O cable 15.

Electrical power is provided to each flash head control unit 12a, 12b, 12c, 12d, and 12e from a power interface panel 14 having a power input cable 19 connected to a conventional A/C power supply at the location of the structure, with operational power then being delivered to each flash head control unit 12 by power output cables 18.

System 10 also includes, in a preferred embodiment, a conventional air compressor (not shown) which has an "on/off" control input, connected to an output relay in a flash head control unit 12 with an air line 71 (FIG. 20) extending into the water around the system 10. This gives system 10 the capability of generating an underwater air bubble curtain near one or more flash heads 13 as installed. The air bubbles 72 enhance light dispersion and reflection, making the strobed lights more visible to the fish.

A conventional water pump (not shown) can also be used in conjunction with system 10, the purpose of which is to supply high pressure water to a water jet 74 (FIG. 20) directed at the lens area of each flash head 13. The water jets can be used to remove scum that may build up on the surface of lens 57.

Figure 20:
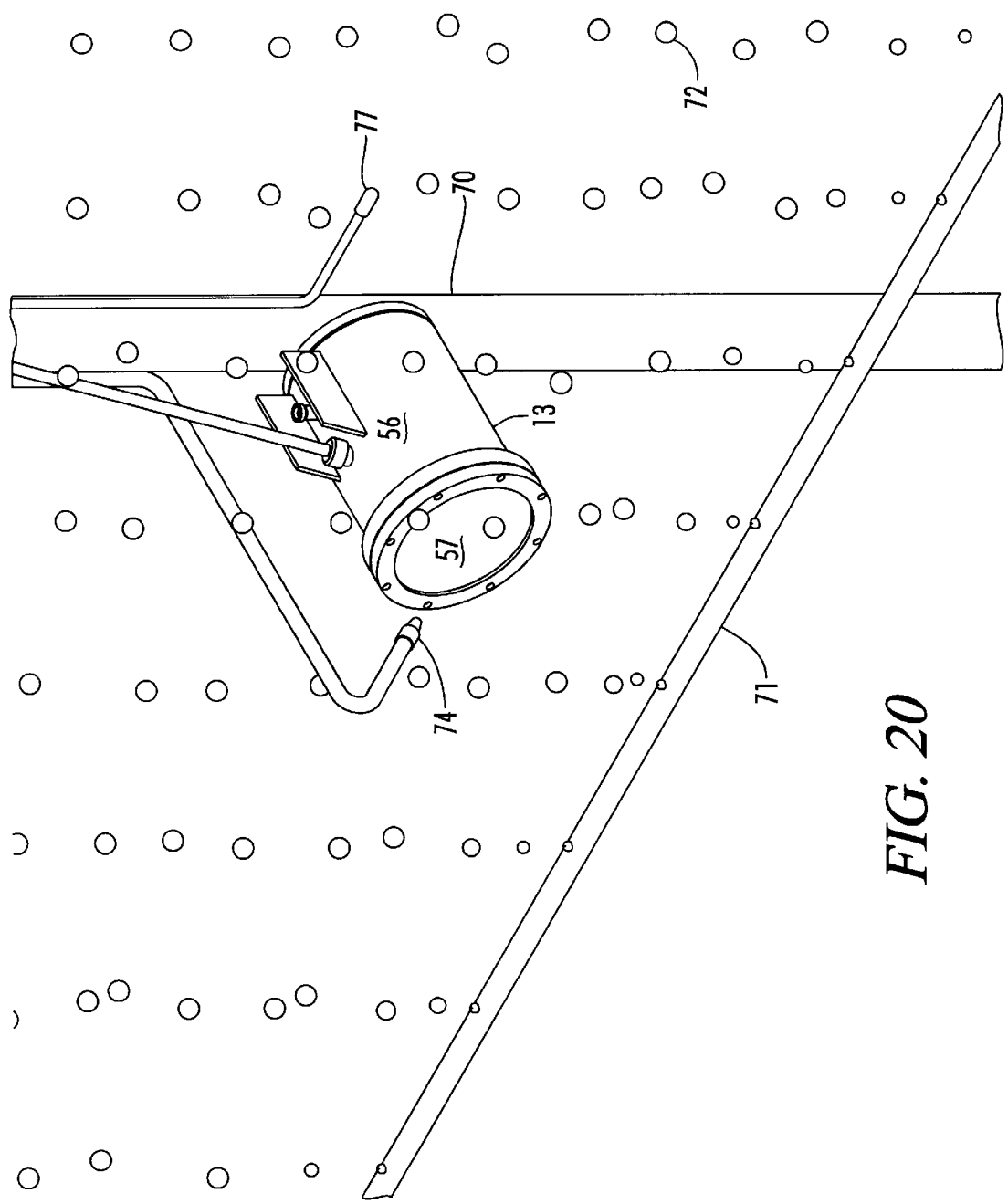
FIG. 20 is a perspective view of a single flash head as installed in the system underwater, showing a preferred arrangement of the air bubble curtain and a corresponding water jet.

Also looking at FIG. 20, a temperature probe 77 is shown positioned in the water near mounting rack 70 and a flash head 13. Probe 77 provides ambient water temperature data to system control unit 11 for use as described below.

System Control Unit

An important aspect of the system 10 is the high level of control and monitoring provided by system control unit 11. Coordinating and controlling communications to and from all subsystems, the system control unit 10 provides both overall control and complete monitoring of all aspects of system operation. At least one system control unit is required per system 10. The system control unit 10 performs the following functions:

a. monitor and control serial data communication to and from each flash head control unit;

b. monitor and control communications from a remote control station using the remote control and monitoring software, via a data modem and conventional phone line;

c. generate and implement a user interface via the video display 32 to enable the entry of system commands and to report system status;

d. provide on/off control signals to an air compressor for generation of a bubble curtain at each flash head 13;

e. generate on/off control signals to a water pump to provide for water jet output at each flash head 13;

f. generate control signals for flash head cooling devices;

g. provide control signals to enable/disable flashing of each flash head 13;

h. configure and control flash head strobe sequence, including sequential ordering, flash spacing, and flash timing;

i. provide control signals to vary the flash intensity of one or more flash heads 13;

j. monitor and report water temperature proximate to each flash head;

k. monitor and report flash intensity at each flash head;

Each system control unit 11 includes the following external inputs: communications with up to 128 flash heads 13; communications with remote control/monitoring software via modem and analog phone line; input from one or more temperature probes 77; computer keyboard 31 and mouse 33.

In addition, each system control unit 11 has provisions for the following external outputs: communications with up to 128 flash heads 13; communications with remote control/monitoring software; a video display 32; a printer (not shown); and relays (or similar device) to turn on/off an air compressor and water pump.

The system control unit 11 is under the control of software designed for system 10 that, subject to system commands entered by the operator, includes routines to provide the following control services: print/display status report; log system activity to a printer; and enable/disable flashing on one, multiple or all flash heads 13; allow the configuration and initiation of flashing lights on separate flash heads 13 in a operator selected sequence; change flash intensity on one, multiple or all flash heads 13; turn air compressor on/off for bubble curtain output at flash heads 13; turn water pump on/off for water jet output at flash heads; turn flash head cooling fan on/off on one, multiple or all flash heads 13; and generate alarms/warnings (including communications errors) for all parts of the system 10.

The system control unit software also preferably includes monitoring routines to provide the following monitoring and reporting services: water temperature at each flash head; flash intensity at each flash head 13; and internal flash head 13 temperature.

Flash Head Control Units

Each flash head 13, in conjunction with its corresponding flash head control circuit in a flash head control unit 12, contains an illumination device and related hardware used to attract and deter fish. In most cases, an installed system 10 will contain multiple flash heads 13 to adequately cover the area being serviced. The exact number of flash heads 13 used is dependent on many system parameters including the width and depth of the body of water, the system orientation to the body of water, and the relative locations of the areas where fish are to be directed away from and towards.

A flash head 13 is electrically connected via power and control cable 17 to its respective control circuit in a flash head control unit 12, and operatively connected to system control unit 11, to coordinate its activities with other flash heads and to provide operational monitoring feedback.

Each flash head 13 will preferably include the following external inputs: communications with its flash head control unit 12 (via cable 17, and including cooling fan control signals, and flash tube A and B trigger signals); water temperature; and internal flash head temperature. Each flash head 13 has provisions for the following external outputs: communications with a flash head control unit 12 (cable 17, including flash head temperature and water temperature).

Figure 18:
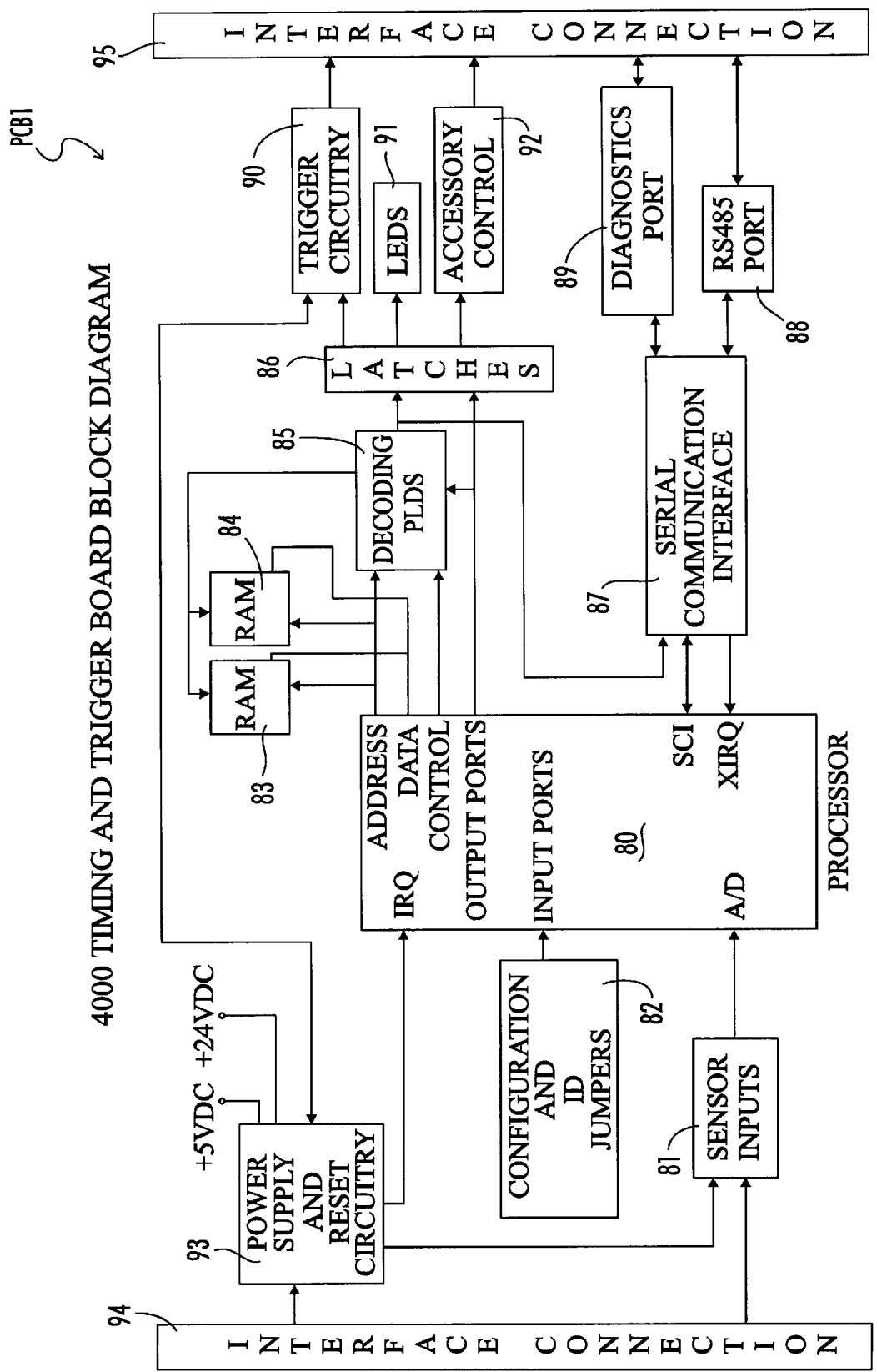
FIG. 18 is a block diagram of the electrical subsystems associated with the flash head control unit of the system, including the timing and trigger board.

FIGS. 2a, 2b, 2c, and 2d collectively are an electrical schematic of the analog circuitry in single flash head control unit 12. FIG. 18 is a block diagram of the digital section of the flash head control unit, also referred to as the timing and trigger board PCB1. The connections to the timing ands trigger board PCB1 are labeled on FIGS. 2a, 2b, 2c, 2d as "PCB1, Jx", where x corresponds to a connector pin. In the preferred embodiment of system 10 shown in FIG. 1 and FIGS. 2a–2d, a single flash head control unit 12 is configured to provide power to and communications with up to eight attached flash heads 13, represented in FIGS. 2a–2d as flash heads A1, B1, A2, B2, A3, B3, A4, and B4. In this embodiment, a single flash head housing 56 will enclose one flash tube 60 with related triggering circuitry. Thus, looking at FIG. 2a, a flash head 13 will include one flash tube 60 having its own flash head control circuit within flash head control unit 12. Therefore, there will be a total of eight flash head control circuits, selectable between four flash heads A or four flash heads B, in a single flash head control unit 12 of FIGS. 2a, 2b, 2c, and 2d. Applicant herein will describe the interconnection and functioning of a single flash head control circuit, as illustrated on FIG. 2a, with the understanding that the same description will apply as well to the flash head control circuits illustrated also on FIGS. 2b, 2c, and 2d. Optionally, multiple flash tubes 60 with associated trigger circuitry can be installed in a single housing 56 and controlled in a similar manner.

Looking now at FIG. 2a, conventional 120 VAC electrical power is supplied to each flash head control unit 12, from power interface panel 14, through a power cable 18, connected at terminal block TB201. Input power sense board PCB6 (FIG. 18) senses the presence of input power being supplied to flash head control unit 12 and sends a signal accordingly to system control unit 11. Input power is then distributed to various points as shown throughout flash head control unit 12, beginning with interconnections at terminal block TB8. Thus, for those circuits and components requiring a DC supply voltage, AC power is sent to first high voltage rectifier board PCB12 which is connected at terminal block TB13. Lamp 1201 provides visual indication of power being energized. For devices and components needing AC supply voltage, timing board PCB1 and temperature sense board PCB4, for example, the 120 VAC supply is stepped down as needed at power transformer T11. Fuse F201 provides current overload protection and switch S11 is a safety interlock device that removes power when the front panel of the flash head control unit 12 is opened.

A bank of capacitors C11A, C11B, C11C, C12, and C13 are provided, in conjunction with capacitor select relays K11 and K12, as a means for selectably adjusting the flash intensity of the corresponding flash head 13. Table I shows the range of selectable flash rates, corresponding to different capacitor selections and power settings.

TABLE I

SELECTABLE FLASH RATES, CAPACITOR SETTINGS AND
POWER SETTINGS SHOWING POWER OPERATING RANGES

| Flashes per Minute | Max Number of Capacitors Selectable | Range of Operational Power (Watts) |
|---|---|---|
| 60 | 4, 3, 2, or 1 | 640 to 20 |
| 72 | 3, 2, or 1 | |
| 75 | | |
| 80 | | 833 to 24 |
| 90 | | |
| 100 | | |
| 120 | 2 or 1 | 733 to 40 |
| 144 | | |
| 150 | | |
| 180 | | |
| 200 | | |
| 225 | 1 only | 300 to 800 |
| 240 | | |
| 300 | | |
| 360 | | |
| 400 | | |
| 450 | | |
| 600 | | |

CAP4 AT 800 W=1280 mF
CAP4 AT 200 W=320 mF
CAP3 AT 800 W=1000 mF
CAP3 AT 200 W=250 mF
CAP2 AT 800 W=440 mF
CAP2 AT 200 W=110 mF
CAP1 AT 800 W=160 mF
CAP1 AT 200 W=40 mF

Thus, the system operator can enter a system command at system control unit 11 a particular flash intensity as part of the flash head configuration routine. The flash intensity selection is implemented by a corresponding flash intensity select signal being sent to relays K11 and/or K12.

The software in system control unit 11 is pre-programmed with the parameters set forth in Table I which determine the safe operational limits of the particular flash head 13, to avoid overheating of the flash tube. Accordingly, system control unit internally monitors the configuration of each flash head 13, to prevent selection of flash head operational parameters which would expose the flash tube to an overheating condition. Subject to these limits, in a preferred embodiment of system 10, each flash head can be operated from between 20 to 800 watts with the flash rate adjusted on real time basis from between 60 to 600 flashes per minute. Depending on local ambient and operating conditions, on-site adjustment of the system may be needed to deal with heat management issues. If overheating of the flash heads becomes a problem, a preferred method of solving the problem is to reduce flash head duty cycle by increasing the number of flash heads.

A trigger coupling transformer T13 receives flash trigger signals from timing and trigger board PCB1 (FIG. 18). The flash trigger signals are transmitted to either flash head A1 (flash head 13A) connected at terminal block TB203 or to flash head B1 (flash head 13B) connected to terminal block TB207. Selection of either flash head A1 or flash head B1 on FIG. 2a is made by trigger and fan steering relays K15 and K16 which are responsive to flash head select signals received from timing and trigger board PCB1.

A flash tube current sense transformer PCB14 has its primary winding connected to the anode of each flash tube within flash head A1 and flash head B1. The secondary winding of flash tube current sense transformer PCB14 is connected to timing and trigger board PCB1 so that an appropriate signal can be sent to system control unit 11, verifying functioning of the flash tube.

Steering relays K15/K16 also control the switching of data from corresponding temperature sensors TS101 associated with flash head A1 or B1, which is electrically connected at terminal block TB211. This data, preferably generated from a conventional thermistor type sensor, is then sent to temperature sensing board PCB4. Also, flash head fan sense module PCB15 confirms operation of a corresponding flash head fan (blower 51 on FIG. 5), sending a confirming signal to timing and trigger board PCB1.

Power selection relay K1, in response to a signal from timing and trigger board PCB1, varies the operating power in response to flash rate and intensity selections.

A tuning capacitor C14 is connected across a primary winding of power transformer T11 to assist in regulation of the secondary output voltage.

Discharge relay K4, unless closed by a signal from timing and trigger board PCB1, enables flashing of each flash head 13 connected to flash head control unit 12, by allowing discharge of current from a corresponding flash tube 60 through discharge resistor R1.

FIG. 2c also schematically illustrates the serial data communications connections to the flash head control unit 12. In this embodiment, the data is transmitted and received using an industry standard RS485 serial communications link and protocol, connected at terminal blocks TB213 and TB214, with the data being sent to and received from timing and trigger board PCB1.

FIG. 2d schematically shows a series of six blowers B1, B2, B3, B4, B5, and B6 which work together to internally circulate and exhaust air from flash head control unit 12. Operation of blowers B1–B6 is controlled by blower control relays K8 and K9 in response to signals received from timing and trigger board PCB1. Blower sense modules PCB7, PCB8, PCB9, sense operation of blowers B1, blowers B2, B3, B4, and blowers B5 and B6, respectively, and send corresponding signals indicating proper operation of the blowers to timing and trigger board PCB1.

FIG. 18 illustrates the various functional blocks of timing and trigger board PCB1 and their interconnection. Basic flash head control is provided by a conventional microprocessor 80 which receives analog data input from the system 10, shown as block 81, and performs a multiplexed analog-to-digital conversion of that data (flash head temperature, capacitor bank voltage, line voltage, trigger voltage, and flash sensing) of the system 10 to configure and adapt processor 80 to perform the functions required by the system. A random access memory chip 83 provides static memory for use of processor 80 while a read only memory chip 84 (EPROM) contains the software which provides the basic operating system functions for the processor 80.

The outputs from processor 80 to system 10 are provided through decoder block 85 and latch block 86. These in turn provided trigger signals through trigger circuit 90 to trigger operation of flash tubes 60 in the various flash heads 13, through the circuitry shown on FIGS. 2a–2d. Visual indication of operation of the system is also provided through a light emitting diode block 91. Finally, control of the various system signals for operation of system accessory devices, specifically the air compressor and water pump, are provided through accessory control block 92. Serial communications between the timing and trigger board PCB1 and the system control unit 11 are provided through a serial communications interface 87, which includes both a system diagnostics port 89 and a conventional RS45 serial port 88. Interface output connector 95 mechanically and electrically connects the outputs from timing and trigger board PCB1 to the other corresponding sections of system 10. Power for timing and trigger board PCB1 is provided through a power supply and reset circuit 93 which sends power reset and interrupt signals to the processor 80 at start up and reset of system 10. Analog input signals are provided to timing and trigger board PCB1 through input interface connector 94.

Flashheads

FIGS. 3, 4, 5, and 6 illustrate the structure and internal arrangement of components used in flash head 13. Because in a typical installation of system 10, each flash head 13 will be submerged in a body of water associated with a fixed structure to be protected by the system 10, each flash head 13 includes a water proof protective outer housing 56 having an opening at one end covered by a light transmissive lens 57 sealed with a circumferential retaining ring 58, a lens shim 73, and o-ring seal 75. In a preferred embodiment of the flash head 13, the housing 56 will be fabricated from type 6061 Aluminum. The lens 57 is made of tempered borosilicate glass. A water tight cable fitting 54 (FIGS. 3 and 4) extends from and through housing 56 to allow for entry of the power and control cable 17. Two parallel plates 55 are welded to housing 56 as trash shields and to protect cable fitting 54. A gas fitting 76 is also provided to allow for air/gas injection and evacuation if desired.

Figure 6:
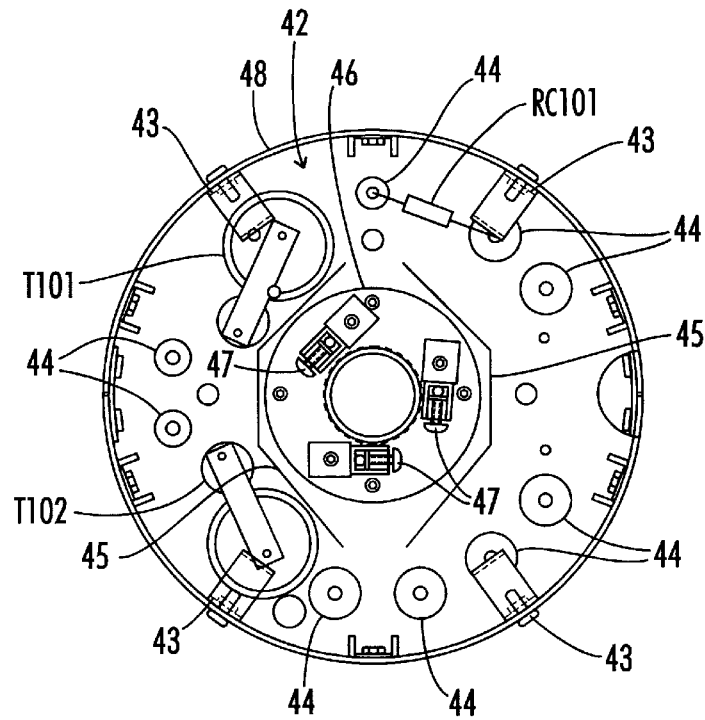
FIG. 6 is a plan view of the flash head showing the plenum shroud and components internal thereto.

The selection and arrangement of components internal to flash head 13 illustrates some of the novel features of system 10, as implemented in flash head 13, which optimally adapts the flash heads 13 for extended use in a submerged environment. The flashed illumination from flash head 13 is provided by a flash tube 60, preferably a xenon flash tube, supported by a flash tube mount 46 (FIG. 6.) and enclosed within a protective Pyrex glass cylinder 49. Each flash tube 60 will include three rigid electrical connections attached to flash tube mounting lugs 7 supported by flash tube mount 6 (FIG. 6). The electrical connections are anode 61, cathode 62, and trigger input 63.

Because of the tremendous energy and heat generated by flash tube 60 when triggered, special novel heat management precautions have been taken in the design of flash tube 13. First, an electrically powered blower 51 is mounted below flash tube 60 to force air around flash tube 60 through a Pyrex glass air duct 59. Blower 51 is mounted to the inner portion of the bottom wall of enclosure 56 by blower base plate 52. An annular parabolic reflector 13 circumferentially surrounds flash tube cylinder 49 to maximize the amount of light directed outward of flash head 13 through lens 57. Because of the desire to maximize flash intensity in a submerged location, parabolic reflector 53 includes a centrally disposed annular opening to allow passage of air duct 59, thus minimizing the loss of light due to impairment of the reflective surface.

Also, as compared to conventional flash tubes, anode and cathode leads 61 and 62 have an enlarged diameter, preferably approximately 0.100 inches. As seen on FIG. 5, a pair of heat sink fins 65 extend radially outward from leads 61 and 62. These structural features promote heat transfer away from flash tube 60.

Of course, the air being circulated internal to flash head 13 must be cooled and, because the air cannot be exhausted, a novel air recirculation and cooling system is provided within flash head 13. A shroud 48 and reflector 53 forms an air plenum around flash tube 60. However, the diameter of plenum shroud 48 is selected so that when installed, an air passageway 64 is defined between the outer surface of plenum shroud 48 and the inner surface of flash head enclosure 56. Accordingly, air circulated within flash head 13 by blower 51 is forced through air passageway 64 where it is cooled by coming into contact with housing 56. Enclosure 56 is itself cooled by the effects of ambient water temperature when flash head 13 is submerged. Mounting brackets 43 mechanically attach parabolic reflector 53 to plenum shroud 48. The blower 51 will preferably have a rating of at least 55 CFM at a static pressure of 0.4 inches of water.

Figure 19:
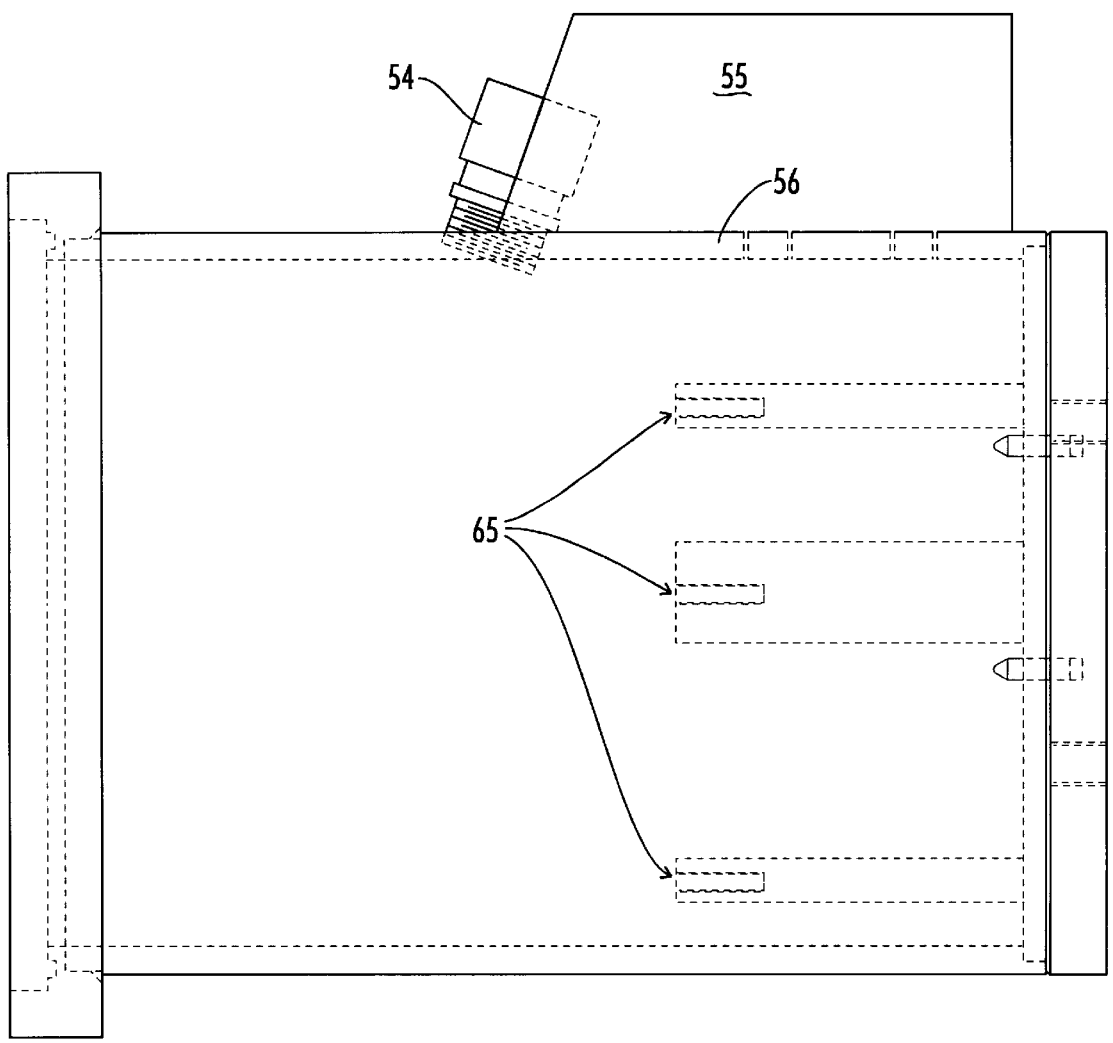
FIG. 19 is a cutaway side view of the flash head housing also showing the interior mounting posts.

Flash tube mount 46, shroud 48 and blower 51 are secured to a sheet metal weldment 42. The weldment 42 is attached to three support posts 65 (FIG. 19) welded to housing 56.

Figure 9:
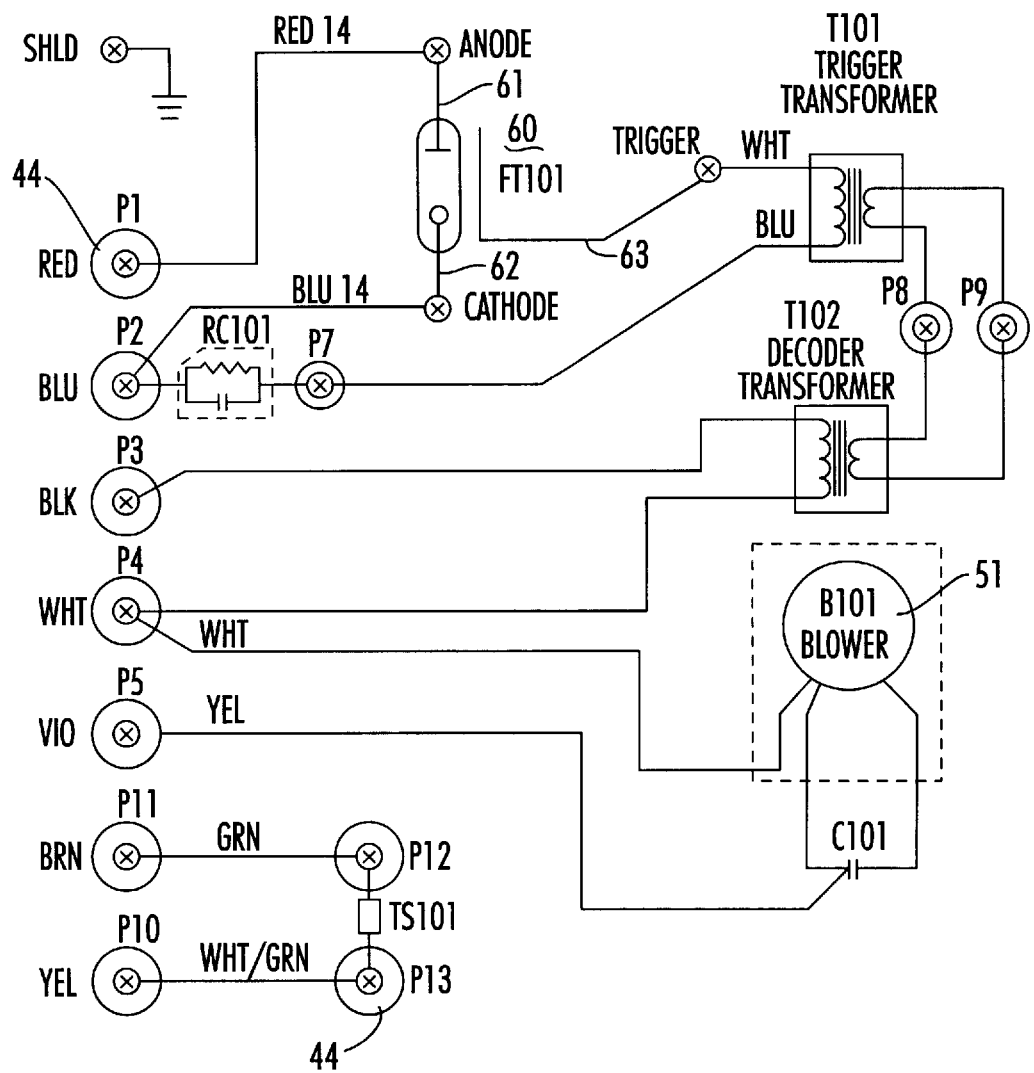
FIG. 9 is a schematic diagram of the flash head electrical system.

Flash head electrical components, shown in part on FIGS. 3, 4, 5, or 6, and schematically described with on to FIG. 9, are electrically connected to one or more ceramic posts 44 arranged around and attached to the bottom wall of plenum shroud 48.

One of the components mounted interior to flash head 13 but outside the space enclosed by plenum shroud 48 is a temperature sensor TS101. Temperature sensor TS101 provides electrical signals responsive to the internal flash head temperature for use by system control unit 10 in monitoring and regulating the operation of each flash head 13. In a preferred embodiment of flash head 13 as described, the safe internal temperature operating range is 14–122 degrees F.

To provide some level of thermal isolation of the electronic components of flash head 13 from the heat generating effects of flash tube 60, a pair of opposed heat shields 45 extend vertically from the lower wall of plenum shroud 48 and up along the outer wall of duct 59 to a distance above the upper margin of the installed electrical components.

FIG. 9 is a schematic diagram of the electrical components and interconnections in flash head 13. A series of wire terminals P1 through P11 (each of which corresponds to a ceramic post 44 on FIG. 6) provide a connection point for the individual flash head power and communication wires contained within flash head power and control cable 17 (FIG. 1). Thus, flash tube power is brought to the anode and cathode of flash tube 60 through terminals P1 and P2, respectively. The cathode power from flash head control unit 12 is also connected to the secondary winding on trigger transformer T101, through an R-C filter network RC101. The flash tube trigger signal is received from flash head control unit 12 at terminals P3 and P4 and, through de-coupling transformer T102, drives the primary winding of trigger transformer T101 connected at terminals P8 and P9.

Terminals P4 and P5 of flash head 13 provide power to blower 51, at blower motor start-up capacitor C101. Finally, temperature data is transmitted back to flash head control unit 12 from temperature sensor TS101 through wires terminating in terminals P10 and P11.

Figure 7:
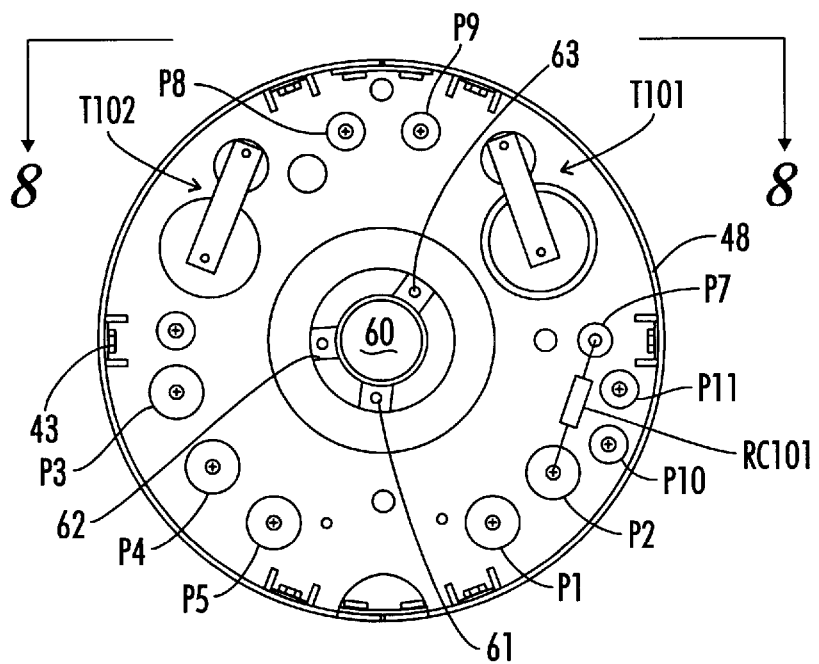
FIG. 7 is a plan view of the flash head interior to the plenum shroud, with the parabolic reflector removed, showing the location of electrical components and connection terminals.
Figure 8:
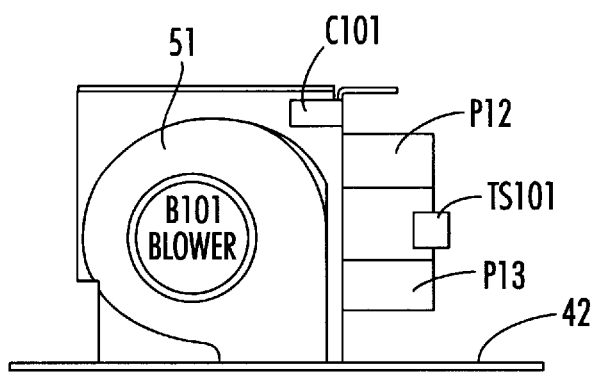
FIG. 8 is a view taken along lines A-A of FIG. 7, showing the blower portion of the flash head.

FIG. 7 shows the physical location within flash head 13 of the wire terminals P1 through P11 and the other electrical components of FIG. 9.

System Operation

The communications between the system control unit 11 and the flash head control units 12, one for each group of 1 to 32 flash heads 13, will consist of a standard RS-485 2-wire communications link. There will be a separate link for each flash head control unit 12.

The format of all messages passed between a system control unit 11 and the flash head control units 12 will be consistent. Address 0 is reserved for use in broadcast messages. Flash head control units 12 will use their addresses in both sending and receiving messages. The system control unit 11 will listen to all messages and therefore requires no specific address. It will use the address to determine which flash head control unit 12 is sending a message.

Each message will have the following Message Format:
Byte 0: Unit Address Message is for/from
Byte 1: Message Type
Byte 2–3: Message Length
Byte 4-(n–1): Message Data
Byte n: Checksum The communication scheme requires most messages to be acknowledged upon receipt. Messages requesting a response will accept the response as the acknowledgment. Other than broadcast or poll messages, messages not requesting a response require a separate ACK (message acknowledged) or NAK (message not acknowledged) to be sent. Broadcast messages are addressed to all devices so there is no use in one particular device responding. Poll Messages are sent by the system control unit 11 to a flash head control unit 12 to determine whether the flash head control unit 12 has new or changed information pending (i.e. an alarm or warning condition that has occurred). If a flash head control unit 12 has no information pending, it can ignore (not respond to) a Poll Message. If it has information pending, it should send the message when it receives a Poll.

ACK or NAK responses are based on several items: 1) correct checksum received; 2) correct #-of-bytes received (matches message length); 3) no communications errors detected (parity error, SW or HW overrun errors, etc.). ACKnowledging (or NAKing) the receipt of a message is performed regardless of whether the message type is processed by the receiving unit. This allows new messages to be created for other devices on the same communications link without modifying the software in all units. The capability to send variable length messages also allows new information required for one type of system control unit 11 to be added to an existing message without changing the software in all units. System control units 11 without upgraded software will only process the information they know about and will ignore new information added to the end of the message.

Communications messages from the system control unit 11 to the flash head control units 12 will include:

1. Set General Parameters (i.e. Date, Time, etc.);
2. Synchronize Now (begin flashing according to preset configuration parameter set up by flash sequence commands;
3. Set Current Flash Head Configuration for each flash head 13 including: a) Flashing or not; b) flash rate; c) flash intensity; d) Flash head A or B select, for flash wavelength/color selection; e) time delay from Sync signal used for sequencing flashes.
4. Set Present Flash Head configuration per flash head 13 including: a) Flashing or not; b) Flash rate; c) Flash intensity; d) flash head A or B select, for flash wavelength/color selection; e) time delay from Sync signal used for sequencing flashes.
5. Set Accessory Relays On/Off for: a) air bubble curtain; b) water jets; c) flash head/flash head control unit cooling fan.
6. Reset alarm and/or warning condition.
7. Request General Parameters (.e. Date, Time, etc.)
8. Request Software Version.
9. Request Current Flash Head Configuration per flash head 13.
10. Request Present Flash Head Configuration per flash head 13.
11. Request the status of Accessory Relays On/Off;
12. Request status of other inputs including water temperature (all depths).

The communications from each flash head control unit 12 to the system control unit 11 include:

1. General Parameters (i.e. date, time, etc.).
2. Software Version.
3. Alarm and Warning conditions.
4. Current Flash Head Configuration per flash head 13.
5. Present Flash Head Configuration per flash head 13.
6. Status of Accessory Relays On/Off.
7. Status of other inputs including water temperature.

Figure 10:
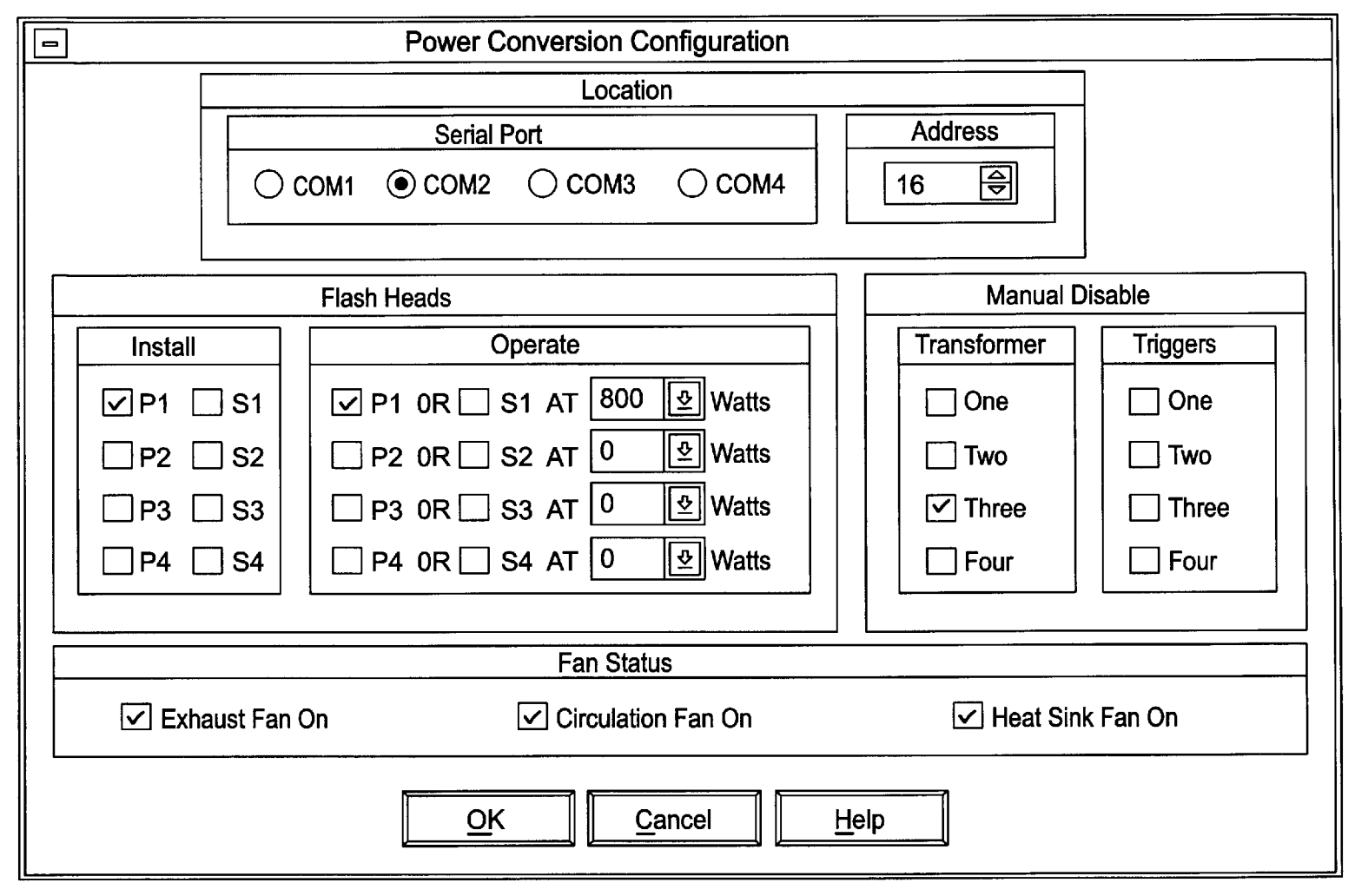

For operator convenience and flexibility at system control unit 11, the system application software loaded in personal computer 30 provides a user friendly graphical user interface (GUI) at video display 32, such as provided by the Windows operating system. FIGS. 10, 11, 12, and 13 illustrate typical GUI screens presented to the system operator at video display 32. Thus, FIG. 10 is the screen that would be used by the operator when configuring communications with an operation of a specific flash head control unit 12. The mouse selectable options available to the user on this screen include the enabling or disabling of a particular flash head 13 attached to that flash head control unit 12, establishing the communications port location for that flash head control unit 12, establishing the system address, enabling or disabling trigger and transformer monitoring functions, and enabling or disabling operation of the exhaust, circulation, and heat sense fans (blowers B1–B6).

Figure 11:
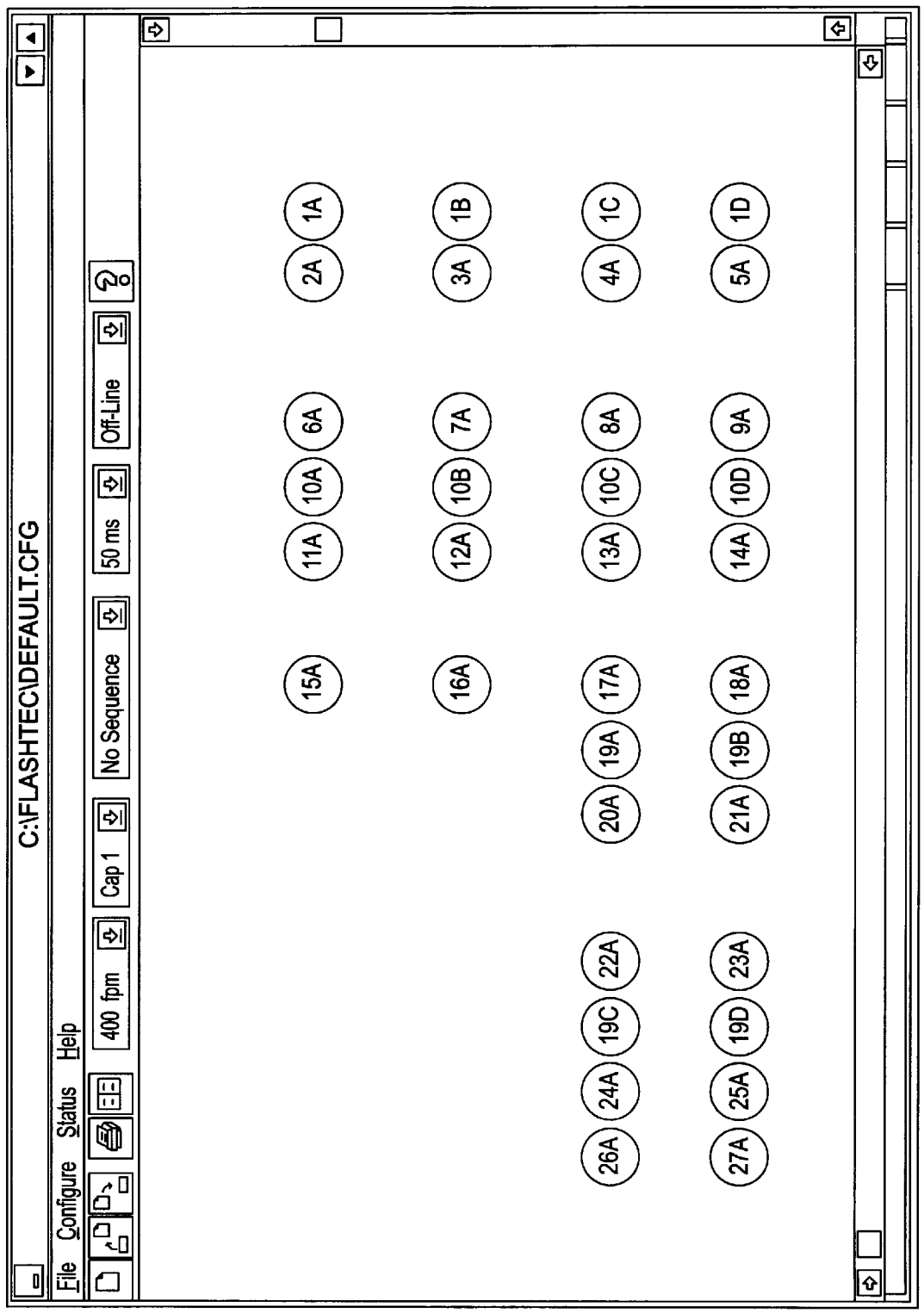
FIG. 11 is a typical video display screen generated by the software of the system control unit, illustrating a configuration of the system for all flash heads.

FIG. 11 is the GUI screen presented to the operator for configuration of the flash sequence involving all of the flash heads 13 attached to system 10. During this operation, the operator can set the flash order, flash timing, flash spacing, and similar sequence parameters.

FIG. 12 is the GUI screen presented to the operator at the time of configuration of a specific flash head 13, connected to a particular flash head control unit 12. Using the screen of FIG. 12, the operator can either use overall system settings for the flash head or override the system settings, including selection of flash color (flash head A or B), flash rate, flash sequence delay, flash intensity, and (optionally) flash head position, which is adjusted using water jets (not shown) associated with that flash head 13. Also, flash head triggering can be enabled or disabled as well as flash head cooling fan operation.

Figure 13:
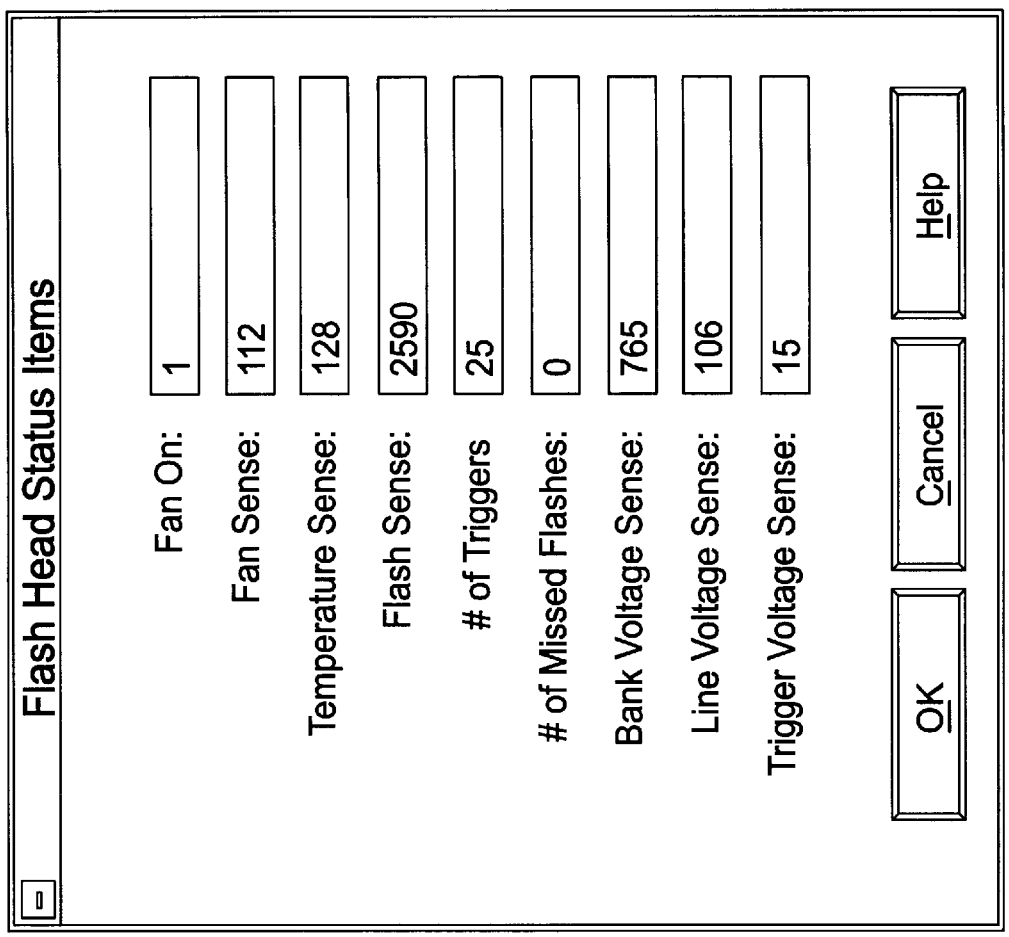
FIG. 13 is an illustration of a typical video display screen generated by the software of the system control unit when monitoring the operational status of a specific flash head.

Finally, FIG. 13 is the GUI screen presented to the operator at system control unit 11 (or at a remote control location) reporting the status and function history of a particular flash head 13 over a particular operational interval.

Remote Control Operation

Preferably, the system 10 and system control unit 11 will be configured for remote operation by use of remote control and monitoring software installed on a personal computer that allows a user to dial into (via modem and telephone line), control and monitor system 10 from a remote location. This program can be used in place of or in addition to on-site personnel located at a system control unit 11 located at the system site.

The remote control and monitoring software handles the same communications and provides the same level of control and monitoring as the software used at system control unit 11.

Typical System Installation

Figure 14:
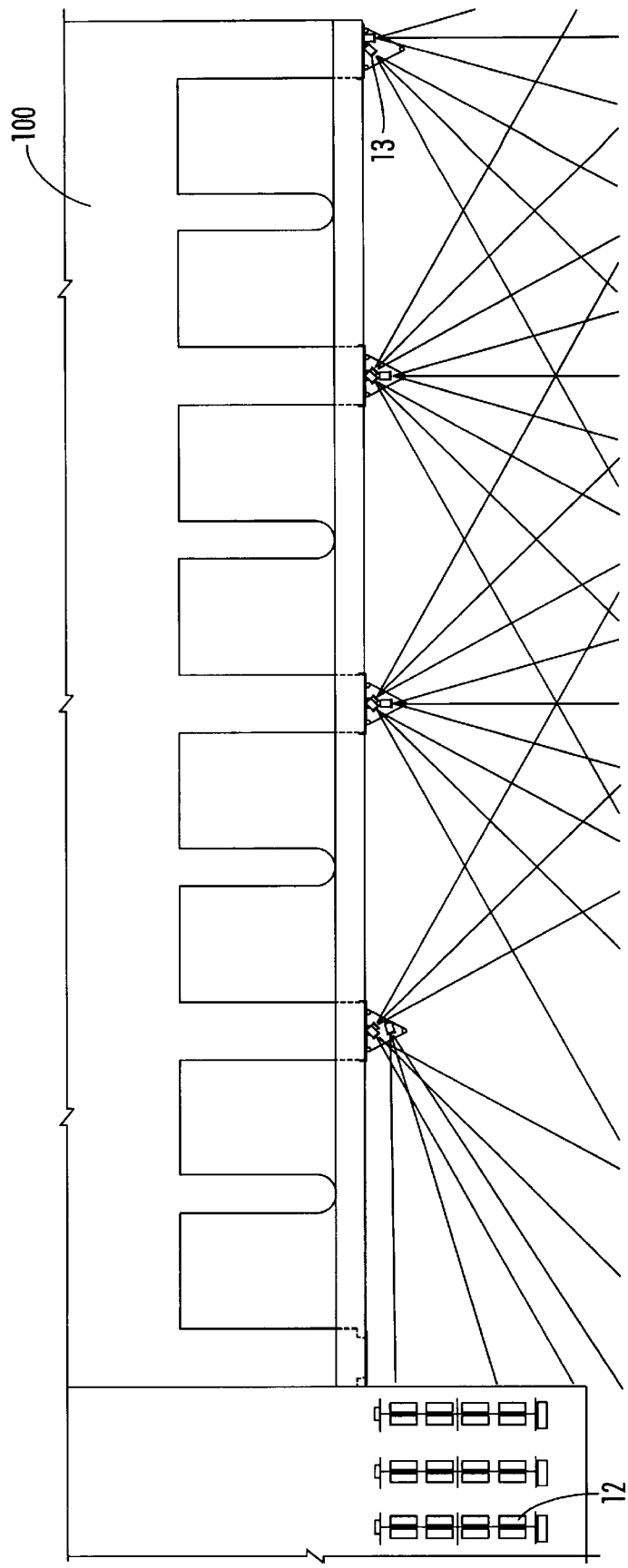
FIG. 14 is a plan view of the system of the present invention showing a typical installation adjacent to an hydroelectric facility having multiple turbine intakes.
Figure 15:
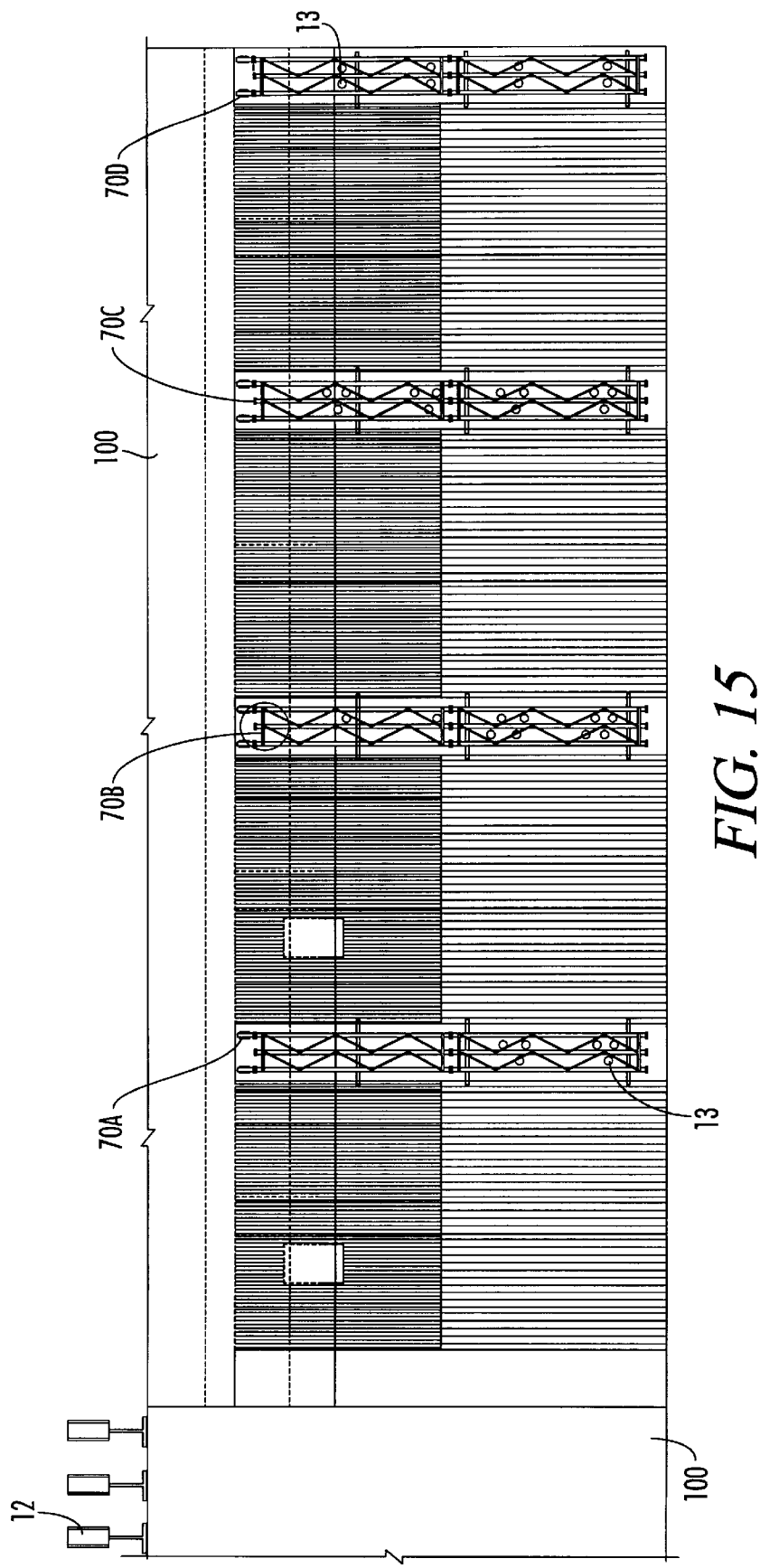
FIG. 15 is a front or side view of the system installation of FIG. 14, showing placement of the flash heads below the water line.
Figure 16:
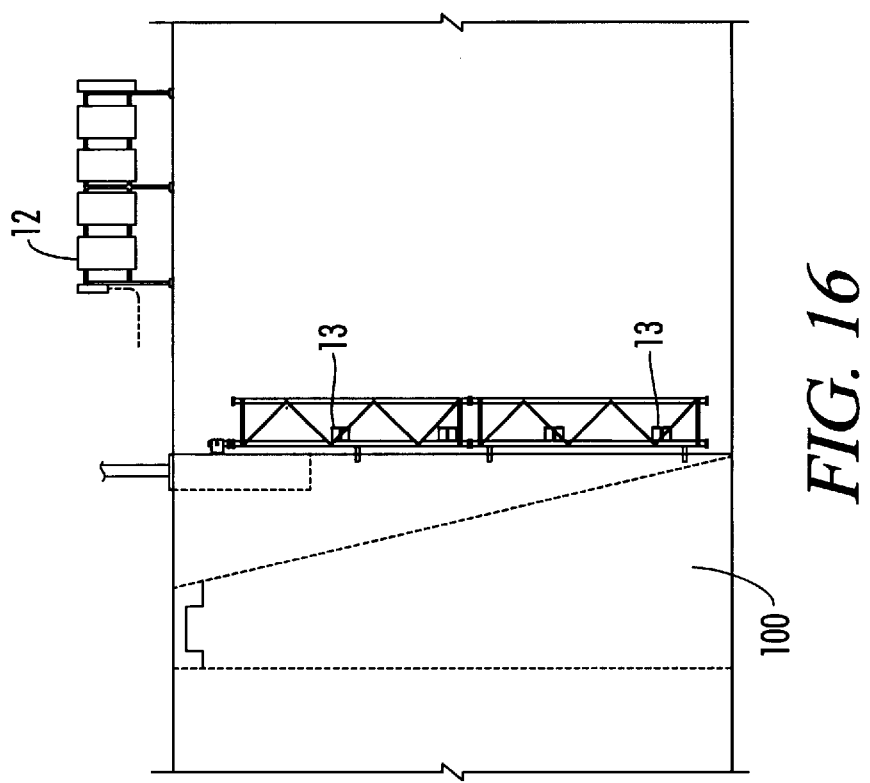
FIG. 16 is an end view of the installed system of FIGS. 14 and 15.

FIGS. 14, 15, and 16 illustrate a typical installation of system 10 near the underwater portion of a hydroelectric facility 100, including four turbine intakes. Four flash head mounting racks 70a, 70b, 70c, and 70d extend vertically down the side wall of the structure 100. Each flash head mounting rack 70 supports multiple flash heads 13 to provide a preferred pattern of flash illumination for fish who may approach the structure. A plurality of flash head control units 12 are attached on top of the structure 100 proximate the flash head racks 70 and connected by cables 15 and 17 (FIG. 1). Preferably, the end portions of racks 70 are not submerged are attached to structure 100 in a hinged arrangement flash heads 13 can be accessed above water for any maintenance needed.

Figure 17:
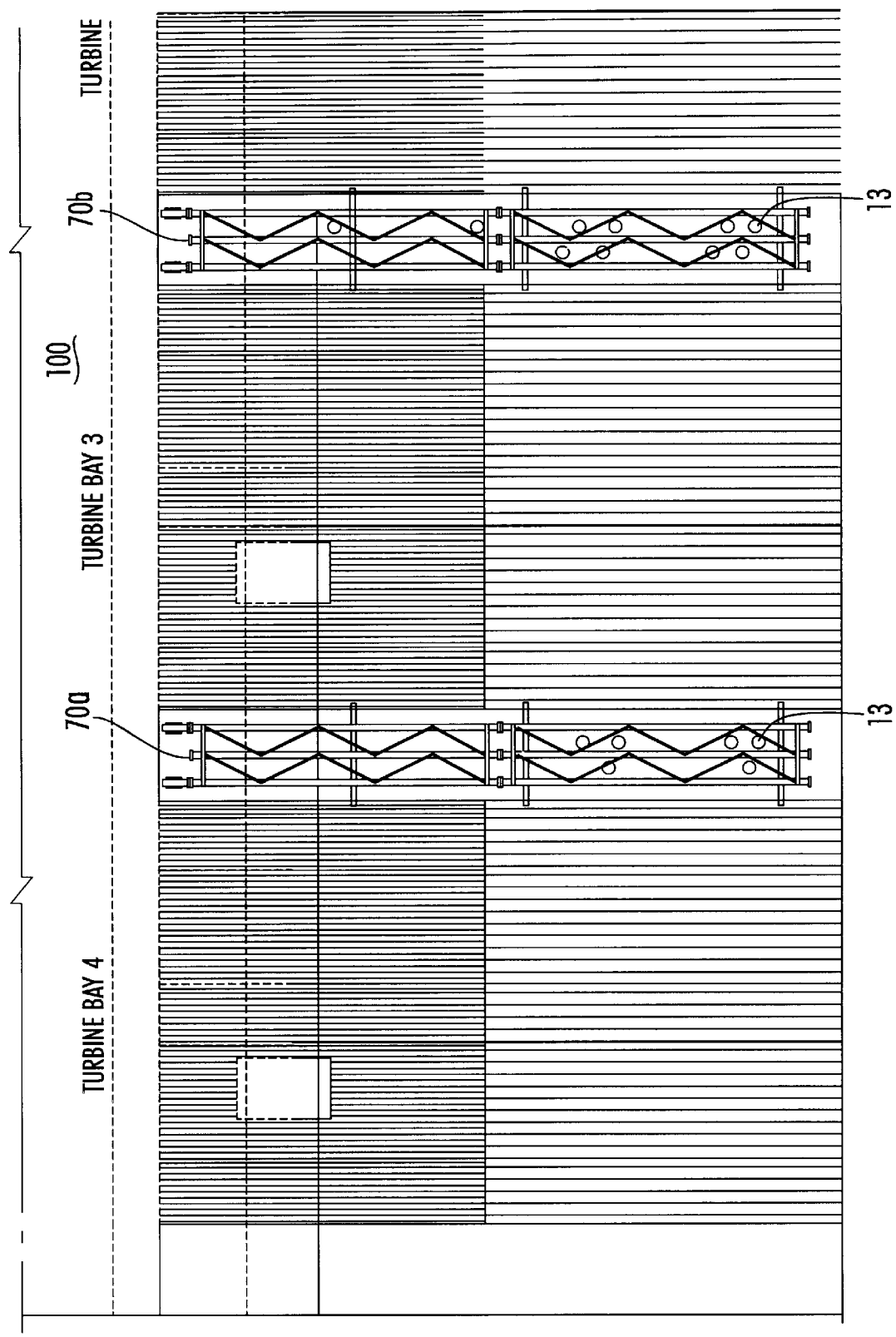
FIG. 17 is an enlarged side view of the installed system of FIGS. 14, 15, and 16.

In a typical installation such as that shown in FIGS. 14, 15, and 16, the flash heads 13 are operated at three hundred forty (340) flashes per minute with a typical flash intensity of 400 watts. There are a total of thirty-six (36) flash heads. This creates a "wall of light" in front of the turbine intakes. Assuming that turbine intakes 3 and 4 on FIG. 17 have fish bypass areas that allow for safe passage, fish can be guided to those areas by flashing the flash heads on the flash head racks 70 adjacent to turbine intakes 1 and 2 together. In addition, the flash intensities of the flash heads 13 on the flash head racks adjacent to turbine intakes 3 and 4 can be gradually decreased as the depth is decreased, directing the fish upward towards the safe passage area.

Thus, although there have been described particular embodiments of the present invention of a new and useful controllable stroke light system for control of fish, it is not intended that such references be construed as limitations upon the scope of this invention except as set forth in the following claims. Further, although there have been described certain operational parameters used in the preferred embodiment, it is not intended that such dimensions be construed as limitations upon the scope of this invention except as set forth in the following claims.

What is claimed is:

1. A system for directing the movement of fish in water near a man made structure, the system comprising:
   a. a plurality of flash heads, each flash head including a flash tube means for generating one or more light pulses visible to fish proximate to the flash head, and a waterproof housing enclosing the flash tube means;
   b. a system control unit operatively connected to each flash head and including processor means for causing the flash tube means to generate the light pulses in a predetermined flash sequence; and
   c. the system control unit further comprising a command interface means for accepting system commands from an operator of the system, the system commands including flash sequence commands, the processor means including sequence command processing means for varying and executing the flash sequence in response to the flash sequence commands.

2. The system of claim 1, the system control unit further comprising system monitor means for providing system status signals to the operator, the system status signals including flash sequence status signals corresponding to the flash sequence being executed by the processor means.

3. The system of claim 2, wherein the processor means comprises a personal computer, the command interface means comprises a keyboard operatively connected to the personal computer, and the system monitor means comprises a video display operatively connected to the personal computer.

4. The system of claim 3, the system control unit further comprising flash head signal receiver means for receiving flash head status signals from each flash head, the flash head status signals including a signal indicating whether a flash head is flashing or not flashing, and wherein the video system monitor means includes means for displaying the flash head status signals.

5. The system of claim 4, the system commands entered by the operator including flash intensity commands, the system control unit further comprising flash intensity control means to adjust the intensity of the light pulses generated by each flash tube means in response to the flash intensity commands, and wherein the system status signals displayed on the video display include signals indicative of the flash intensity of each flash tube means.

6. The system of claim 5, the flash head signal receiver means comprising a current sense transformer.

7. The system of claim 5, the system commands entered by the operator including flash color commands, the system control unit further comprising flash color control means to adjust the color of the light pulses generated by each flash tube means in response to the flash color commands, and wherein the system status signals displayed on the video display include signals indicative of the flash color of each flash tube means.

8. The system of claim 5 further comprising flash head temperature control means to monitor and control the internal temperature of each flash head.

9. The system of claim 8 wherein the flash intensity control means is responsive to the flash head temperature control means.

10. The system of claim 9 wherein the flash sequence includes a flash rate for each flash tube means and wherein the personal computer includes means to adjust the flash rate for one or more flash heads in response to the flash head temperature control means.

11. The system of claim 9 wherein the flash head temperature control means comprises a blower internal to each flash head.

12. The system of claim 9, the system control unit further comprising at least one flash head control unit operatively connected to each flash head and to the processor means.

13. A system for directing the movement of fish comprising multiple flash heads and means to control the flash heads, each flash head comprising a waterproof flash head housing, a flash tube mounted inside the flash head housing, and cooling means mounted internal to the housing for cooling the flash head.

14. The system of claim 13, the flash head cooling means comprising a blower and each flash head further comprising an air plenum means for directing air around the flash tube.

15. The system of claim 14, each flash head further comprising an air passageway between the side wall of the air plenum means and the housing.

16. The system of claim 15, each flash head further comprising a light reflector, the light reflector forming part of the air plenum.

17. The system of claim 16, each flash tube having electrode leads, and the electrode leads including cooling fins extending therefrom.

18. The system of claim 16, the light reflector having a parabolic shape formed around and extending upward from the flash tube.

19. A system for directing the movement of fish proximate a structure located in a body of water comprising multiple flash heads submerged in the water and arranged in a pattern proximate the structure, control means operatively connected to each flash head to cause the multiple flash heads to produce through a flash head lens a sequence of flashes which are visible to the fish, and air curtain means to generate air bubbles proximate one or more of the flash heads.

20. The system of claim 19 further comprising submerged water jet means to remove scum from one or more flash head lenses by directing a stream of water at the lens.

21. The system of claim 20 further comprising temperature probe means positioned proximate one or more flash heads to provide a signal to the control means which is responsive to water temperature.

* * * * *